United States Patent
Yang et al.

(10) Patent No.: US 9,111,519 B1
(45) Date of Patent: Aug. 18, 2015

(54) SYSTEM AND METHOD FOR GENERATING CUEPOINTS FOR MIXING SONG DATA

(75) Inventors: Michael Yang, Princeton, NJ (US); Neel U. Sukhatme, Princeton, NJ (US)

(73) Assignee: Mixwolf LLC, Princeton, NJ (US)

( * ) Notice: Subject to any disclaimer, the term of this patent is extended or adjusted under 35 U.S.C. 154(b) by 719 days.

(21) Appl. No.: 13/282,432

(22) Filed: Oct. 26, 2011

(51) Int. Cl.
  *G10H 1/36* (2006.01)
  *G10H 7/00* (2006.01)
  *G10H 1/40* (2006.01)

(52) U.S. Cl.
  CPC ........... *G10H 1/40* (2013.01); *G10H 2240/325* (2013.01)

(58) Field of Classification Search
  CPC .................. G10H 2240/325; G10H 2210/375; G10H 2210/076; G10H 2210/391
  USPC .......................................................... 84/634
  See application file for complete search history.

(56) References Cited

U.S. PATENT DOCUMENTS

| | | | |
|---|---|---|---|
| 5,747,716 A | 5/1998 | Matsumoto | |
| 5,919,047 A | 7/1999 | Sone | |
| 6,066,792 A * | 5/2000 | Sone | 84/609 |
| 6,175,632 B1 | 1/2001 | Marx | |
| 6,294,720 B1 | 9/2001 | Aoki | |
| 6,307,141 B1 | 10/2001 | Laroche et al. | |
| 6,343,055 B1 | 1/2002 | Ema et al. | |
| 6,344,607 B2 * | 2/2002 | Cliff | 84/611 |
| 6,489,549 B2 | 12/2002 | Schmitz et al. | |
| 6,538,190 B1 | 3/2003 | Yamada et al. | |
| 6,696,631 B2 | 2/2004 | Smith et al. | |
| 6,888,999 B2 | 5/2005 | Herberger et al. | |
| 6,889,193 B2 | 5/2005 | McLean | |
| 6,904,003 B2 * | 6/2005 | Miyashita et al. | 369/30.07 |
| 6,933,432 B2 | 8/2005 | Shteyn et al. | |
| 6,967,905 B2 | 11/2005 | Miyashita et al. | |
| 7,081,582 B2 | 7/2006 | Basu | |
| 7,208,672 B2 | 4/2007 | Camiel | |
| 7,216,008 B2 | 5/2007 | Sakata | |
| 7,220,911 B2 | 5/2007 | Basu | |
| 7,525,037 B2 | 4/2009 | Hansson et al. | |

(Continued)

FOREIGN PATENT DOCUMENTS

| | | |
|---|---|---|
| EP | 0932157 A1 | 7/1999 |
| GB | 2365616 A | 2/2002 |

(Continued)

OTHER PUBLICATIONS

DJ 2 Degrees. "iDJ App by Numark Review." crossfadr.com (Internet publication). Aug. 16, 2011. Available at (as of Feb. 3, 2012): http://crossfadr.com/2011/08/16/idj-app-by-numark-review/.

(Continued)

*Primary Examiner* — Jeffrey Donels
(74) *Attorney, Agent, or Firm* — Neel U. Sukhatme

(57) ABSTRACT

A system and method are provided for generating cuepoints for mixing song data. One or more people may listen to a song and identify measure groupings within the song. The one or more people might generate markings corresponding to these measure groupings and submit the markings to a cuepoint generation system. The markings may then be reconciled into cuepoints that may be used for mixing the song with other song data. In some embodiments, the cuepoints may be adjusted based on characteristics of the particular songs that are to be mixed together.

101 Claims, 51 Drawing Sheets

(56) References Cited

U.S. PATENT DOCUMENTS

| | | | |
|---|---|---|---|
| 7,842,878 B2 | 11/2010 | Vorobyev | |
| 7,855,333 B2 * | 12/2010 | Miyajima et al. | 84/612 |
| 7,855,334 B2 * | 12/2010 | Yamashita et al. | 84/612 |
| 7,956,276 B2 * | 6/2011 | Sako et al. | 84/625 |
| 7,964,782 B2 * | 6/2011 | Liu | 84/600 |
| 7,999,167 B2 | 8/2011 | Yoshikawa et al. | |
| 8,069,036 B2 | 11/2011 | Pauws et al. | |
| 8,115,090 B2 * | 2/2012 | Miyajima et al. | 84/625 |
| 8,525,012 B1 * | 9/2013 | Yang | 84/601 |
| 2006/0112808 A1 | 6/2006 | Kiiskinen et al. | |
| 2006/0155400 A1 | 7/2006 | Loomis | |
| 2007/0261537 A1 * | 11/2007 | Eronen et al. | 84/611 |
| 2008/0046098 A1 * | 2/2008 | Corbin et al. | 700/1 |
| 2008/0282870 A1 | 11/2008 | Carrick et al. | |
| 2009/0048694 A1 | 2/2009 | Matsuda et al. | |
| 2009/0049979 A1 | 2/2009 | Naik et al. | |
| 2009/0223352 A1 | 9/2009 | Matsuda et al. | |
| 2010/0142521 A1 | 6/2010 | Evans et al. | |
| 2011/0112672 A1 | 5/2011 | Brown et al. | |
| 2014/0032548 A1 * | 1/2014 | Gilra et al. | 707/736 |

FOREIGN PATENT DOCUMENTS

| | | |
|---|---|---|
| WO | 2007036846 A2 | 4/2007 |
| WO | 2007060605 A2 | 5/2007 |

OTHER PUBLICATIONS

Opam, Kwame. "Minimash Lets You Pretend to Be an iPad DJ While It Does All the Work." Gizmodo.com (Internet publication). Aug. 15, 2011. Available at (as of Feb. 3, 2012): http://gizmodo.com/5830954/minimash-lets-you-pretend-to-be-an-ipad-dj-while-it-does-all-the-work.

Parker, Nick and Van Buskirk, Eliot. "Beat Parade Spins Short-Attention-Span DJ Sets from a Single Song." Evolver.fm (Internet publication). Feb. 18, 2011. Available at (as of Feb. 3, 2012): http://evolver.fm/2011/02/18/beat-parade-spins-short-attention-span-dj-sets-from-a-single-song/.

Fingas, Jon. "Review: Djay for iPad." macnn.com (Internet publication). Dec. 26, 2010. Available at (as of Feb. 3, 2012): http://www.macnn.com/reviews/djay-for-ipad.html.

* cited by examiner

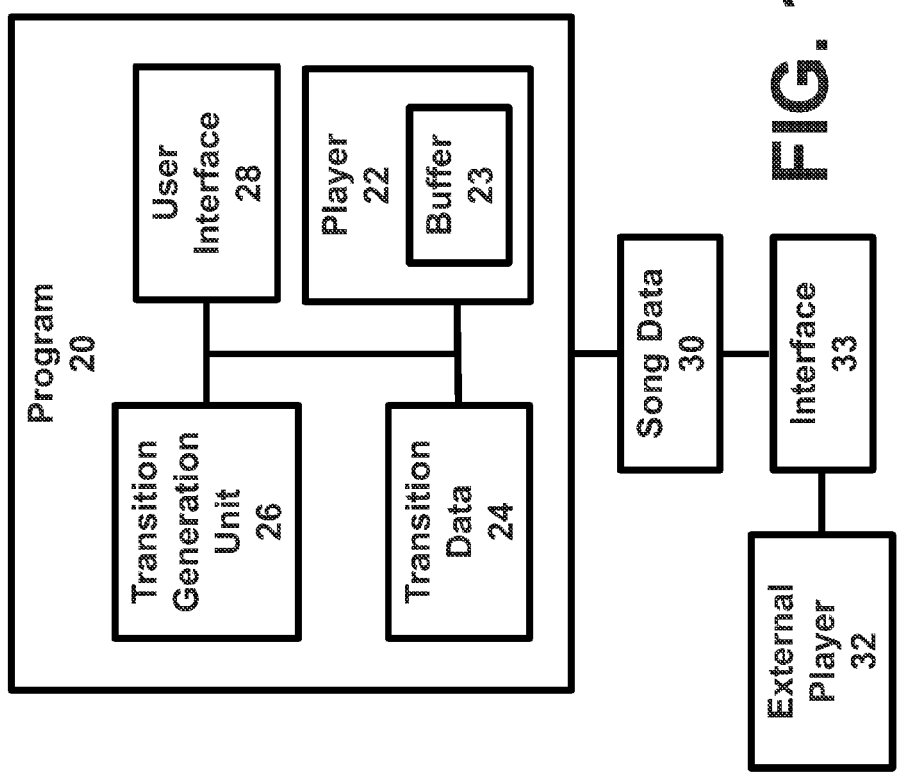

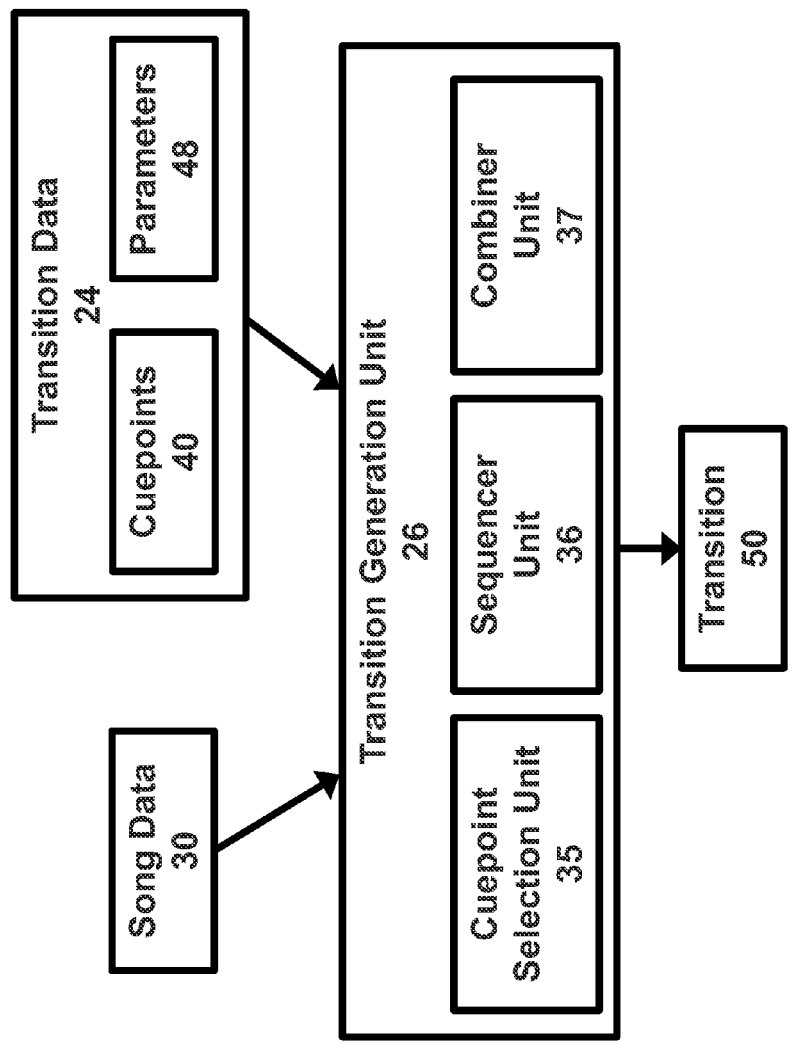

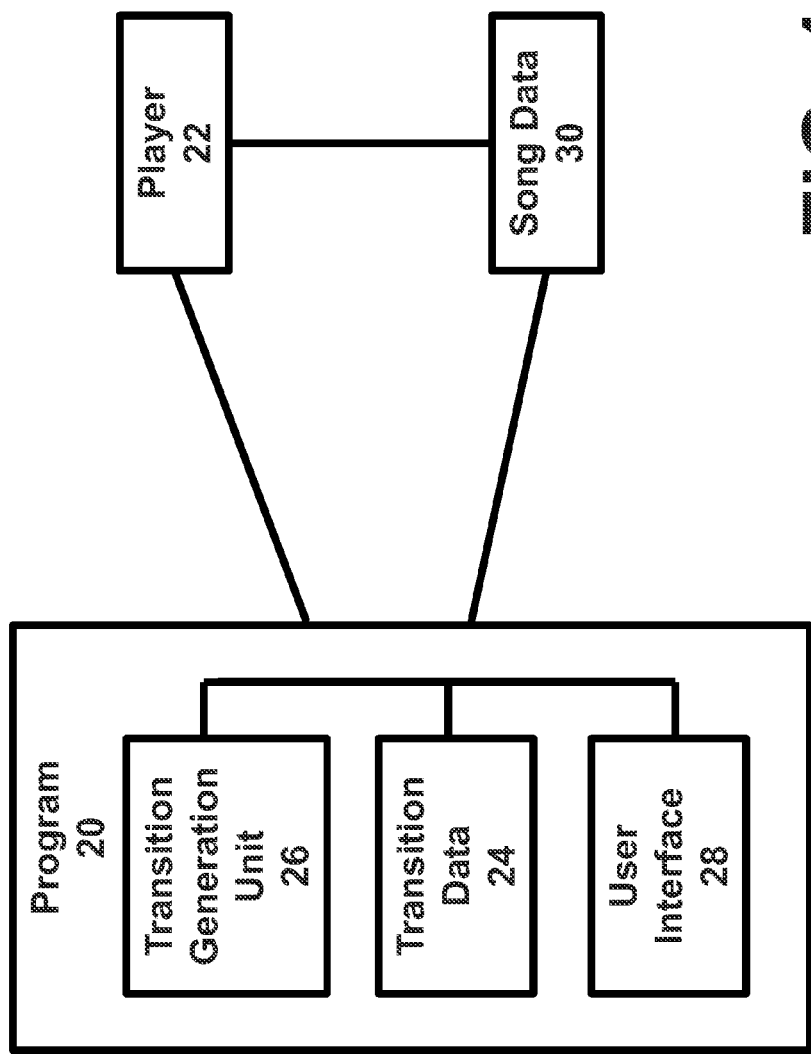

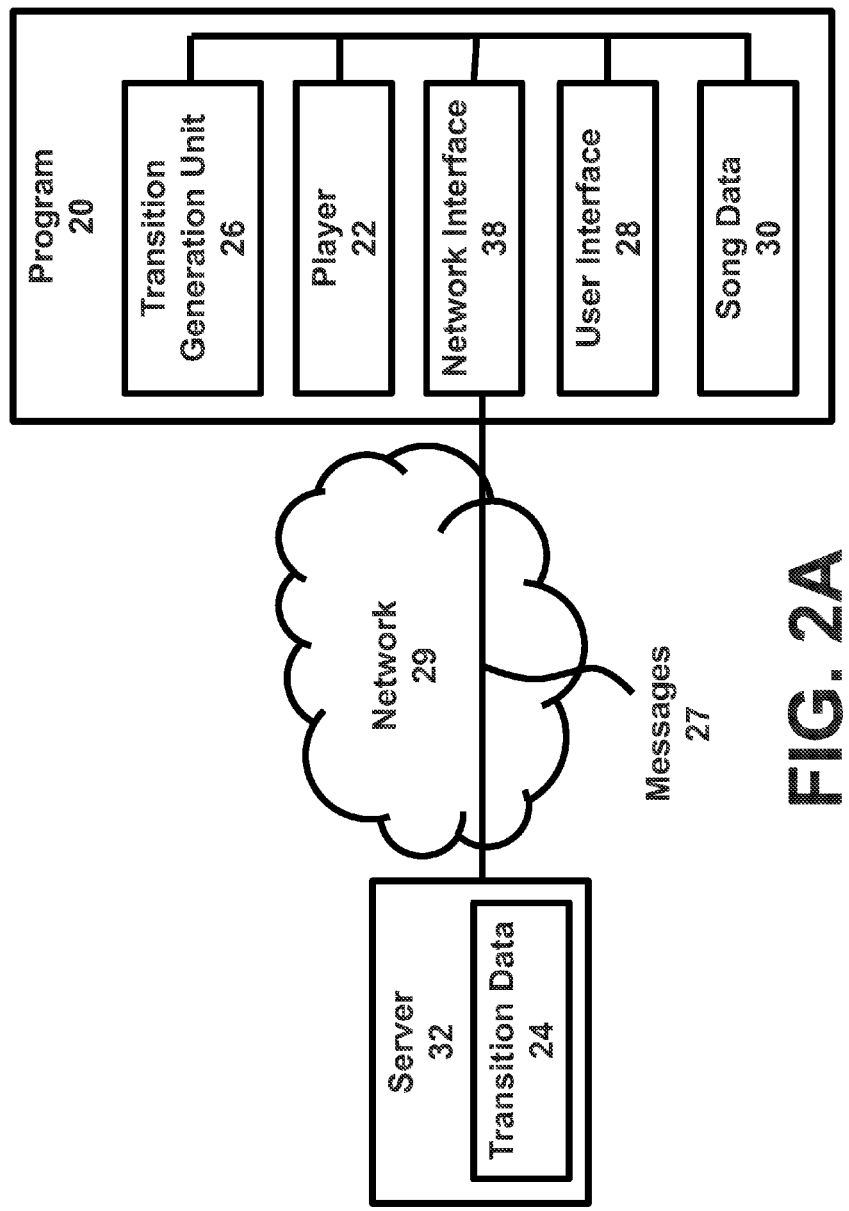

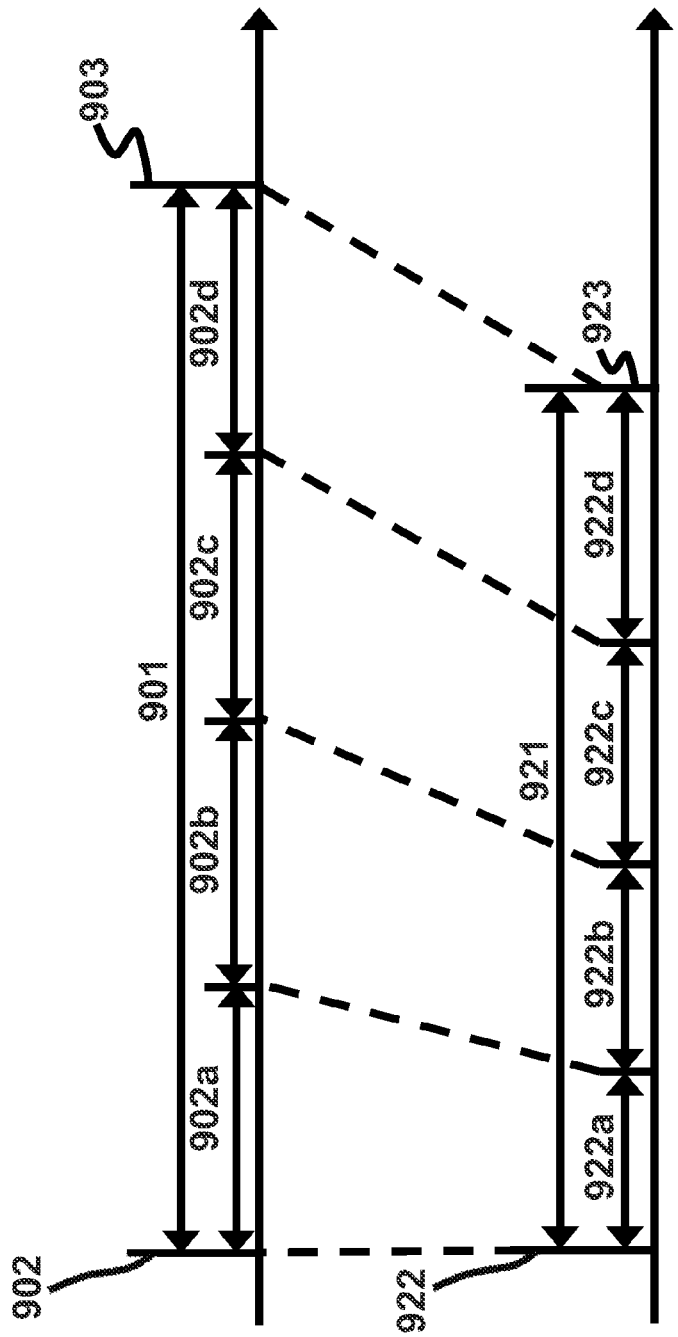

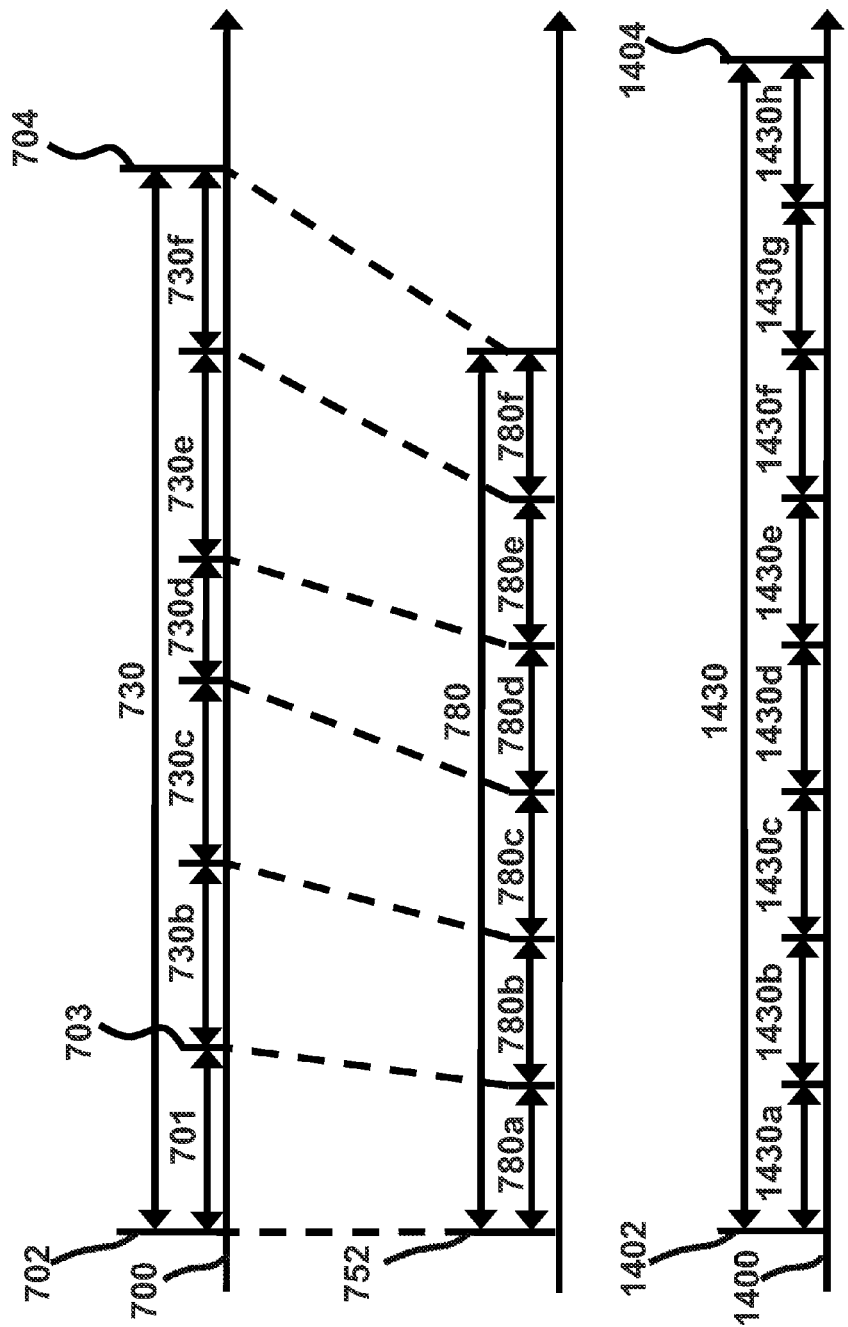

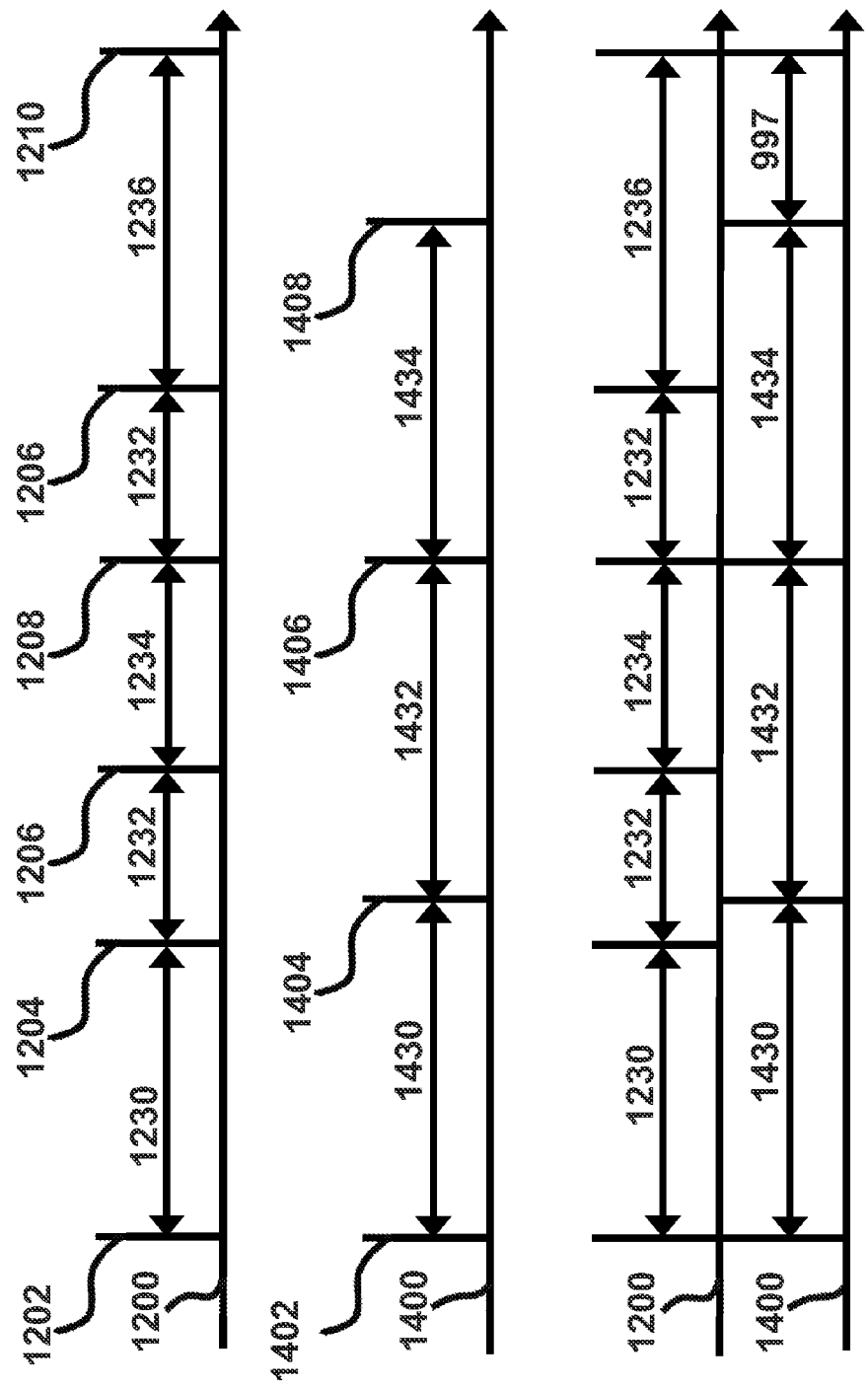

| Transition | Song | Artist | Time |
|---|---|---|---|
| 1. Type B | Today | Smashing Pumpkins | 3:20 |
| 2. Type A | Lose Yourself | Eminem | 5:12 |
| 3. Type A | Mr. Brightside | The Killers | 3:48 |
| 4. Type B | Stand By Me | Ben E. King | 2:59 |
| 5. Type D | Juicy | Notorious B.I.G. | 4:24 |
| 6. Type C | What's My Name | Rihanna Feat. Drake | 3:36 |

FIG. 7B

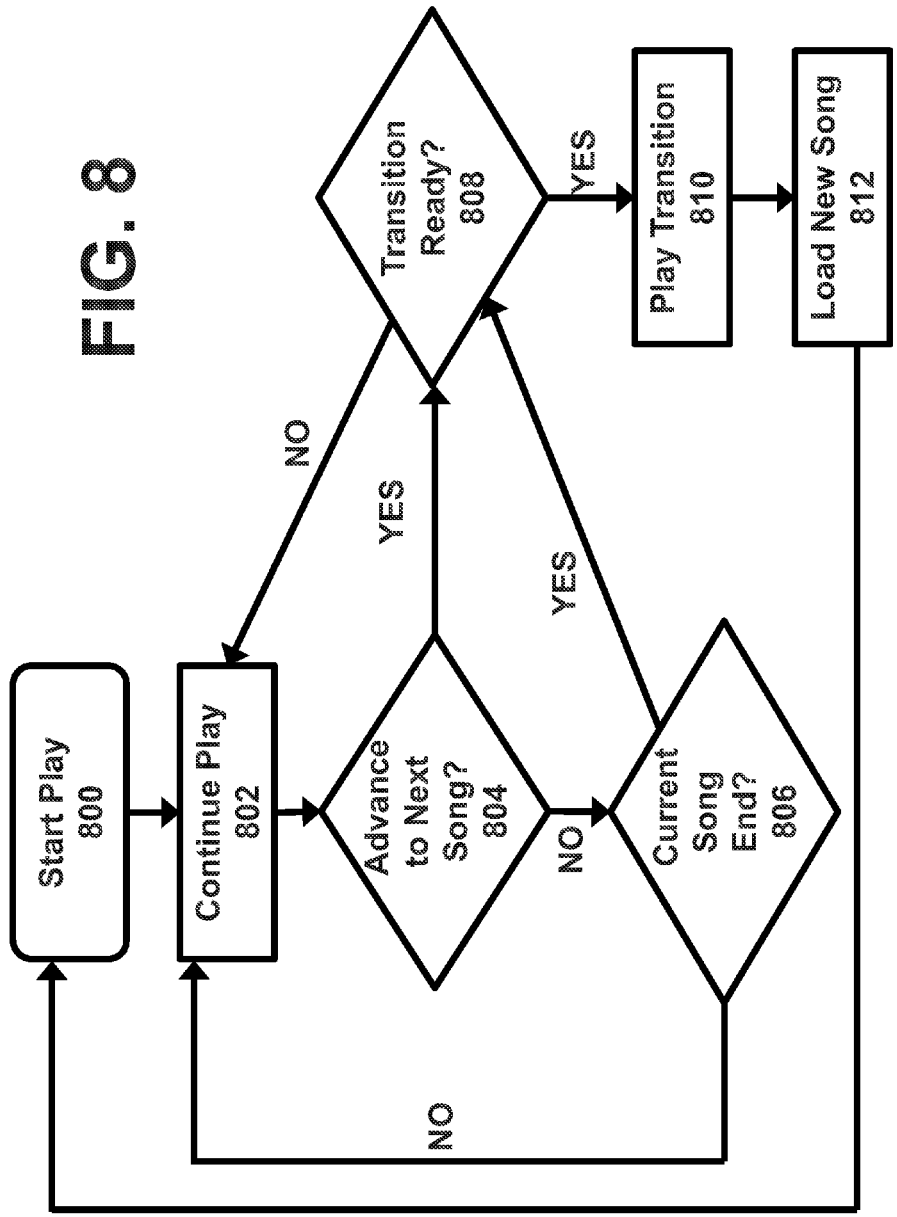

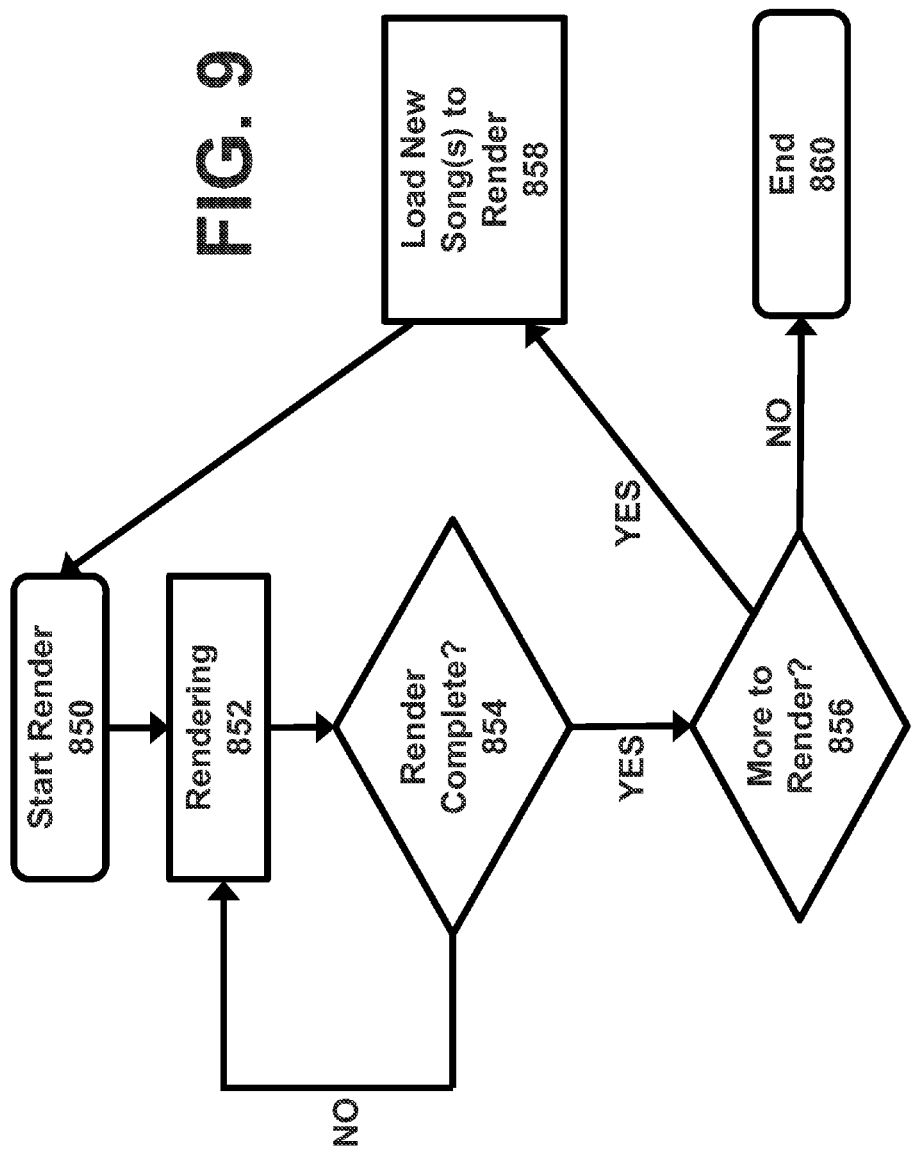

SYSTEM AND METHOD FOR GENERATING CUEPOINTS FOR MIXING SONG DATA

FIELD

The present invention relates to digital music and digital music players.

BACKGROUND

Digital music continues to grow in popularity. Millions of people purchase MP3s or other digital music online and via applications on their mobile devices. Millions more subscribe to music services that stream digital music on demand via the Internet or other networks.

Many people who listen to music use a conventional digital music player, such as iTunes®, WinAmp®, or Windows Media Player®. Such digital music players often have a "playlist"—a list of songs that the user has selected and that will be played in the order specified in the list.

A limitation of conventional digital music players is that they do not allow for seamless playback of songs. Namely, when one song in the playlist ends, there is often an abrupt break or a pause before the next song begins. This might be particularly noticeable when a currently playing song has a tempo or pitch that differs from a song that plays next. Moreover, even if a player could blend one song into the next, the transition between the two would not be aligned according to the tempo of each song, and would not take into account what portions of the two songs match on the basis of measure or song section. Additionally, conventional players do not allow a seamless way to layer one song on top of another.

The lack of seamless transition between songs is less than ideal for many users. For example, a user who is listening to dance music, hip hop, or music produced by disc jockeys may wish to have a continual music listening experience, with no audible gap when one song plays and the other begins. Such a user might want a new song to start playing at a particular portion that correlates to a portion of the currently playing song, or wish to layer two songs together. Similarly, a user who is playing music at a party, or in a bar or club may also wish to have music that seamlessly plays in such a manner. Unfortunately, conventional digital music players do not allow for such functionality.

SUMMARY

One aspect of an exemplary embodiment involves a method for generating cuepoints. The method may involve obtaining first submitted markings for a song. Each of the first submitted markings may map to a measure grouping in the song. Additionally, the method may involve reconciling the first submitted markings into a set of cuepoints.

Another aspect of an exemplary embodiment involves a method for generating cuepoints from submitted markings. The method may involve identifying a first submitted marking for a song and a second submitted marking for the song. The second submitted marking may be located within a first frame distance of the first submitted marking. The method may also involve assigning a first set of frames based on the first submitted marking and the second submitted marking. The method may further involve choosing a first reconciled cuepoint from the first set of frames.

Yet another aspect of an exemplary embodiment involves a method for generating cuepoints, where first submitted markings for a song and second submitted markings for the song are identified. Pairs of agreed markings are determined, where each pair of agreed markings might include one of the first submitted markings and one of the second submitted markings within a number of frames of the one of the first submitted markings. The method further involves choosing at least one reconciled frame set based on at least one of the pairs of agreed markings. The method further involves choosing candidate cuepoints from the at least one reconciled frame set.

A fourth aspect of an exemplary embodiment involves a system for generating cuepoints from submitted markings. The system includes a network interface that receives first submitted markings for a song and second submitted markings for the song. The system also includes a neighborhood generator that assigns a first neighborhood for each first submitted marking and a second neighborhood for each second submitted marking. Additionally, the system has a neighborhood operator that generates reconciled neighborhoods based on the first neighborhoods and the second neighborhoods. The system further includes a selector that chooses first candidate cuepoints in the reconciled neighborhoods.

Another aspect of an exemplary embodiment involves a method for generating cuepoints for mixing songs. The method involves identifying a set of cuepoints for a song. Each cuepoint in the set of cuepoints might map to a measure grouping in the song. Additionally, the method involves altering the set of cuepoints to generate a revised set of cuepoints.

BRIEF DESCRIPTION OF DRAWINGS

FIGS. 1A-1B are block diagrams illustrating exemplary embodiments for mixing song data based on measure groupings.

FIGS. 1C-1D are block diagrams illustrating exemplary embodiments for producing a transition between songs.

FIG. 1E is a block diagram illustrating another exemplary embodiment for mixing song data based on measure groupings.

FIGS. 2A-2E are block diagrams illustrating exemplary embodiments for mixing song data using a network.

FIGS. 4A-4G are time diagrams illustrating exemplary embodiments for generating a transition between songs at the measure level.

FIGS. 5A-5G are time diagrams illustrating exemplary embodiments for generating a transition between songs at the measure grouping level.

FIGS. 6A-6B are time diagrams illustrating exemplary embodiments for generating a transition between songs using multiple measure groupings.

FIGS. 7A-7B show an exemplary user interface.

FIG. 8 is a flow chart showing an exemplary method for switching to and playing a transition.

FIG. 9 is a flow chart showing an exemplary method for determining transition rendering.

DETAILED DESCRIPTION

FIGS. 1A-1E

Exemplary Embodiments for Mixing Song Data and Producing Transitions

Figure 1A:
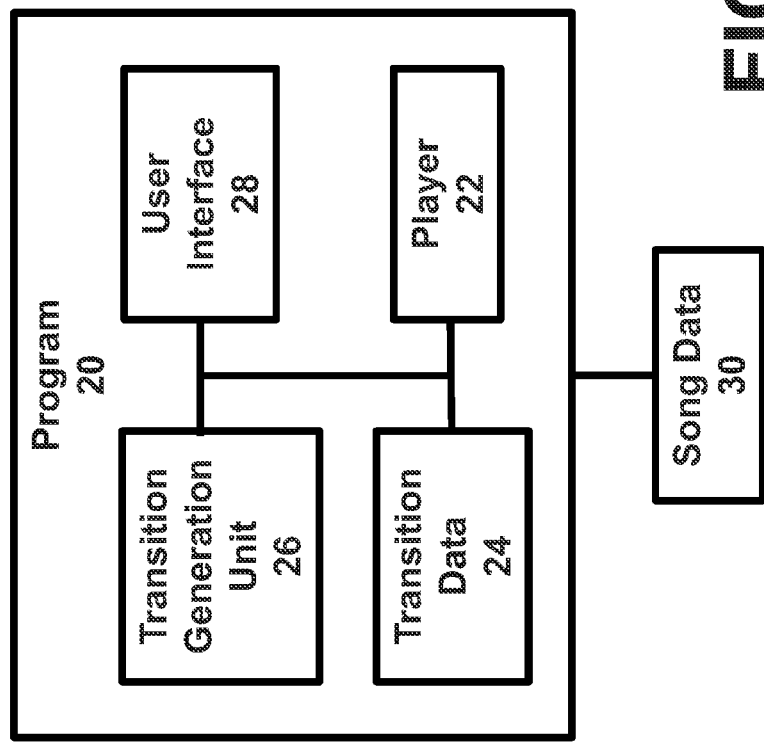

FIG. 1A shows one exemplary embodiment. A computer system runs a program 20 that includes a player 22, a user interface 28, transition data 24, and a transition generation unit 26. The computer system may be a standard personal computer, laptop, notebook, tablet computer, or any other kind of computing device, such as a mobile phone, smart phone, or embedded system. The program 20 may be any kind of computer program, such as a standalone program that resides on the computer system (e.g., an application on a mobile device), and/or a program that operates via an Internet browser.

As represented by the interconnected lines within the program 20, the components within the program 20 may communicate or send data to one another via messages encoded in software and/or hardware, and the program 20 might be implemented in software and/or hardware. The program 20 interfaces with song data 30, which might be one or more songs or other musical compositions or audio files. For example, the song data 30 might include full songs, combinations or mixes of songs, portions of songs, transformed versions of songs (such as time-stretched versions), voice snippets, advertisements, and/or preview clips.

To illustrate, a voice snippet may be a beat-oriented announcement from a disc jockey or radio station, and an advertisement might be an advertising announcement that has a beat and is beat-matched to mix with songs. A preview clip may be, for example, a thirty-second or one minute segment of a song that enables potential customers to hear part of the song before they decide whether to buy it.

It should be understood that this list of song data 30 is meant to be illustrative and not limiting. Many other types of audio or media may be part of the song data 30 such as, for example, multimedia tracks (e.g., video or light tracks cued to music or sound in some way), model-based or sample-based synthesized music, (e.g., grand piano, drum pad sounds). MIDI clips, or beat tracks (e.g., "Latin" rhythms).

The song data 30 may be stored in any number of different formats, such as MP3, Ogg, WAV, and so on. Moreover, the song data 30 may be stored directly on a memory unit on the computer system, such as in random-access memory, read-only memory, flash, or any other storage mechanism. Alternatively, the program 20 may access the song data 30 via a network (such as the Internet, wireless broadband network, or broadcast system) or a physical cable (such as USB, FireWire, etc. cables). It should be understood that the terms "song data". "song", and "songs" may be used interchangeably, and that the use of any of these terms encompasses the others. It should also be understood that although the program 20 directly connects with the song data 30 here, any of the components within the program 20 might additionally or alternatively connect directly with the song data 30.

The player 22 transforms the song data 30 into an audio output. As shown in FIG. 1B, the player may include a playback buffer 23. Alternatively, the buffer 23 may be external to the player or integrated with other components in the computer system. The buffer 23 may be implemented in hardware or software or in any other way in which music may be buffered for playback by a digital music player. The buffer 23 may store the song data 30 or information about the song data 30 (such as title, artist, genre, playback time, etc.), which may then be played by the player 22.

As noted, the song data 30 might be presented to the player 22 in a variety of formats. Moreover, as shown in FIG. 1B, an external music player 32 may generate an output that is received via an interface 33 as the song data 30 for the program 20. For example, the computer system or program 20 may use an interface 33 to capture an audio or electronic output of the external player 32, such as in a raw or compressed URL format. The program 20 may use that output as the song data 30, which may be stored separately or in the playback buffer 23 for the player 22. So instead of the output of the external player 32 being sent to a speaker (or in addition to it being sent by a speaker), the output may be received by the program 20. It should be understood that the program 20 may receive this data from the external player 32 over any kind of connection, such as a link to a file on a hard drive or a link to a network via, for example, a URL or network request.

The program 20 could then process the song data 30 to enable it to mix with other songs. Such an embodiment would allow the components described here to connect with "off-the-shelf" standard music players that are not beat-aware or do not have intelligence built-in to mix songs together. Such an external player 32 (which may be implemented in software, hardware, or a combination of the two) would produce the song data 30 to be received by the buffer 23 or other memory unit associated with the program 20. The song data 30 may then be processed by the transition generation unit 26 such that it might be mixed with another song. Alternatively, the program 20 might control the external player 32, muting it while the player 22 plays the song data 30.

Moreover, the buffer 23 or another buffer (which might be in the program 20 or the interface 33) might be used as a look-ahead buffer that can be used to identify the next song that is being played by the external player 32. This might be useful when the program 20 is trying to identify the next song being played so it can generate a beat-matched, measure-aware transition to that song.

The interface 33 that enables the external player 32 to communicate with the program 20 may be implemented in software and/or hardware. For example, the interface 33 may be a pass-through device that can be fitted on any conventional music player and that connects separately to the computer system. Alternatively, the interface 33 may be part of the program 20, or it might be a software add-on or hardware addition to the external player 32.

It should be understood that the player 22 and/or any accompanying buffer 23 might have various physical components attached to or integrated within it. For example, the player 22 might be part of a physical speaker system that transforms electrical signals into sound. Or the player 22 might simply output the song data 30 or some electronic transformation of it to a physical speaker device. The player 22 might also just play the song data 30 provided to it, or alternatively, buffer additional data that it then outputs to the physical speaker device.

Other types of intelligence might be part of the player 22 as well, such as software or hardware that enable the player 22 to store the song data 30 for later retrieval and playback, to simultaneously buffer and play back streams of the song data 30, to pause and resume playback, or to jump to a specific location in the song data 30. Indeed, in some embodiments, the entire program 20 may be colloquially referred to as "the player" by users. It should be understood that the preceding description is not meant to be limiting and is intended merely to show exemplary features that might be part of the player 22.

For example, the player 22 might concatenate one or many buffered streams together or fade out one song while fading in another.

Figure 7A:
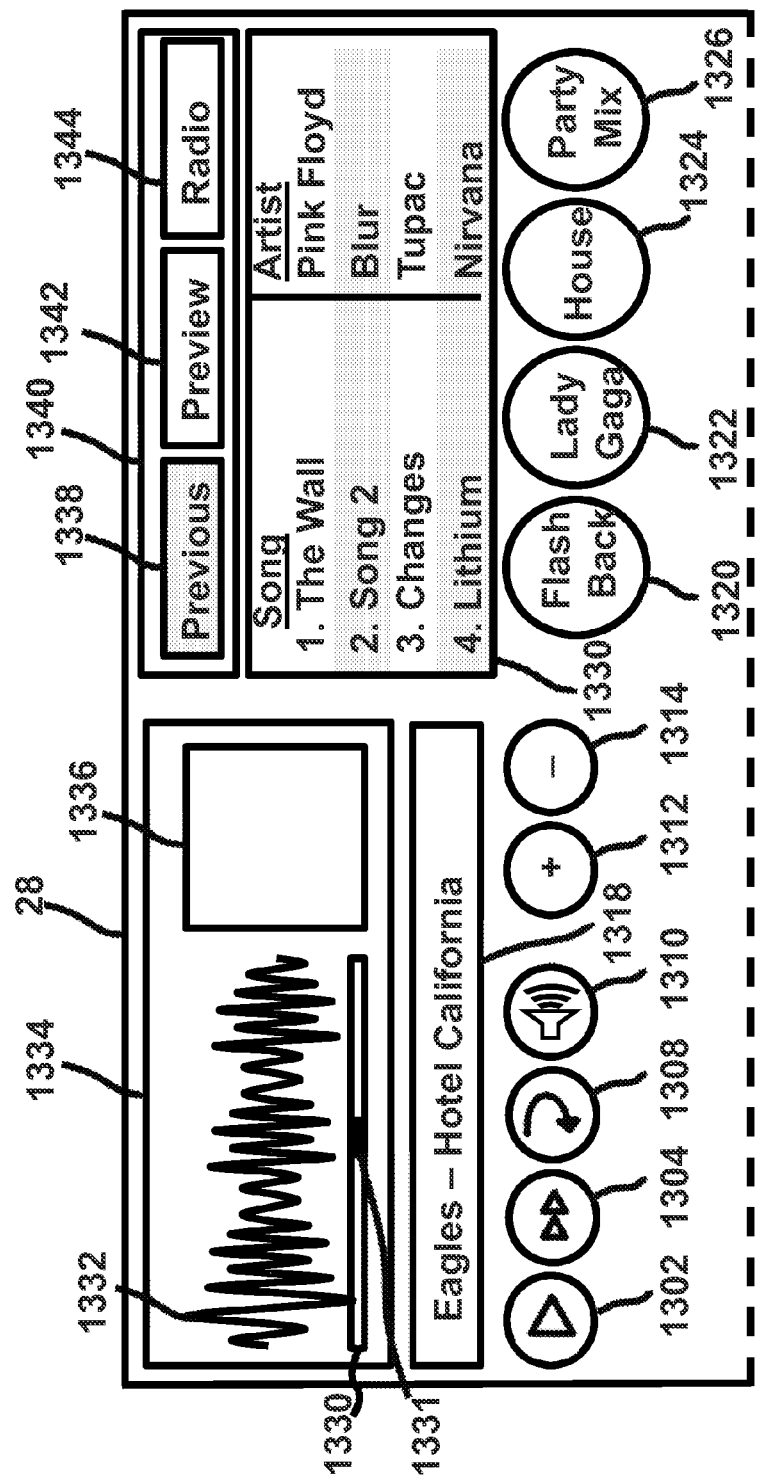

As shown in FIGS. 1A-B, the program 20 also has a user interface 28. This interface 28 may be a graphical user interface, text user interface, voice user interface, touchscreen, web user interface, gesture interface, command line interface, motion tracking interface, intelligent user interface, or any other interface that allows a user to interact with a program. Via the interface 28, the user might, for example, specify songs he would like to play and the manner in which they should be played, or provide information about how transitions between songs should be played. The user interface 28 could also provide information about current playback of songs, and also about future, or "enqueued," songs, such as the next song to be played. More examples of how a user might interact with the user interface 28, and what such an interface 28 might contain, are shown in FIGS. 7A-B and are discussed later in this description.

The program 20 also includes transition data 24, which may be generated based on the song data 30. The transition data 24 may be stored on the same memory unit as the song data 30, or it might be stored on a separate memory unit. Alternatively, similar to the song data 30, in some embodiments the program 20 may access the transition data 24 via a network or a physical cable.

Figure 1C:
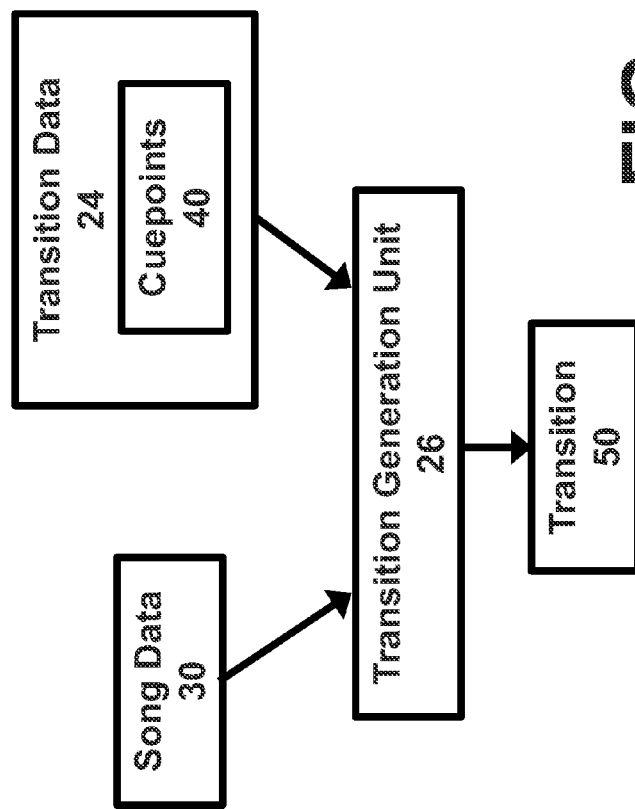

As shown in FIG. 1C, the transition data 24 includes cuepoints 40, which might mark off certain "dominant beats" or other specific points in the song data 30. In particular, the cuepoints 40 might mark off measure groupings, which might be groups of one or more measures in the song. The measure groupings might be segments of the song data 30 that naturally go together and can be rejoined with other songs or song portions.

For example, the cuepoints 40 might mark boundaries of the measure groupings by marking "startpoints" that partition the song data 30 into the measure groupings. Alternatively, the cuepoints 40 might be separated from the boundaries of measure groupings by some number of frames; for example, each of the cuepoints 40 might mark a point prior to the start of a measure grouping by some pre-specified offset. The cuepoints 40 might also specify a midpoint or some other point that identifies a measure grouping. In an exemplary embodiment, the cuepoints 40 may be determined by one or more people who listen to the song data 30 and identify the measure groupings.

It should be understood that this description is exemplary and not meant to be limiting, and that the cuepoints 40 might be used in any way to identify a part of the song. For example, in some embodiments, each of the cuepoints 40 might identify a set of points in the song. Or each of the cuepoints 40 might actually be a range of values corresponding to the range of frames encompassed by a measure grouping.

The cuepoints 40, as well as beats or other position markings in the song, may be marked off based on frame number, time, sample segment, or in any other way in which the song data 30 may be discretized. It should be understood that "frame number" as used throughout this specification is a flexible term that covers any index or other way of measuring a position or sample in a song. For example, frame number may refer to an absolute frame number, which identifies a frame by its position in the song data 30 relative to a start of the song data 30 (e.g., the beginning of a song). In such a scheme, when a song is sampled at 44,100 samples per second (a standard sampling frequency that is often used), a sample pulled after exactly 10 seconds of playback from the beginning of the song will have a frame number of 441,001 (or approximately that number, if there is an offset or some distortion that affects the frame numbers).

A sample that is identified by such a frame number may contain one frame (e.g., if the audio output is mono) or two frames (e.g., if the audio output is stereo), or some other number of frames (e.g., for surround sound or other forms of more complicated audio playback). So in some embodiments, a frame number may be used to identify more than one actual frame of audio data, depending on the number of frames contained within a sample identified by the frame number. Alternatively, each frame within a sample may be separately identified through a frame number. Returning to the example above, if a song sampled at 44,100 samples per second is a stereo song, a sample pulled after exactly 10 seconds of playback might have two frame numbers associated with it, with one corresponding to each audio output channel (e.g., the frame numbers might be 882,001 and 882,002, which equals 2*441,001).

A frame number might also encompass a relative frame number, which marks the number of frames from some other arbitrary point in the song data 30 rather than the beginning. Alternatively, a frame number may refer to a time stamp, which measures the time in the song relative to the beginning of the song data 30. Or a frame number might encompass a relative time stamp, which measures the time in the song relative to some other arbitrary time in the song data 30.

The preceding discussion is intended merely to illustrate some of the ways in which a frame number may be used. Many other ways of marking frames and using frame numbers are possible, such as by using some transformation (e.g., function) of an absolute frame number, relative frame number, time stamp, or relative time stamp.

Returning to the cuepoints 40, they may also be used for purposes not directly related to cutting or appending to the song data 30. For example, cuepoints 40 might be used as a general reference point to indicate what portion of the song data 30 the player 22 has reached. To illustrate, if the player 22 or its playhead reach a cuepoint that corresponds to a final portion or measure grouping in the song data 30, the player 22 might provide a signal to the program 20 that a transition to a new song may be wanted soon.

The cuepoints 40 might also serve as section boundaries between different portions of the song data 30. These section boundaries might, for example, be the beginning or ending points of musical measures or musical sections (like chorus, verse, bridge, intro, outro, etc.) in the song data 30. Of course, the preceding description is intended to be exemplary and not limiting as to the potential uses of the cuepoints 40 in the present embodiment.

The transition data 24 might also include elements other than cuepoints 40. For example, as shown in FIG. 1D, the transition data 24 might include parameters 48 related to the song, such as fade profiles, bass and treble profiles, filters, cuepoint delay offsets, cuepoint groupings, and musical keys or pitches. These parameters 48 might be provided for any part of a song (e.g., measure grouping) or at the song level.

This list is just exemplary, and other information may also be part of the transition data 24. For example, the transition data 24 and/or parameters 48 might also include duration adjustments, beat drop-out locations, and beat rate adjustments.

The program 20 also includes the transition generation unit 26. This unit 26 may be comprised of software and/or hardware components that manipulate or otherwise treat the transition data 24 in a number of different ways. For example, the transition generation unit 26 might select a subset (i.e., one or more, up to and including all) of the cuepoints 40 when mixing together the song data 30. Alternatively, as shown in FIG. 1D, the unit 26 might contain a cuepoint selection unit 35, which is a software and/or hardware unit that performs this function.

Also in FIG. 1D, we see the transition generation unit 26 might contain a sequencer unit 36, which is a software and/or hardware unit that selects frame sequences (e.g., sequences of consecutive or non-consecutive frames) from the song data 30. These frame sequences might be selected based on measure groupings and/or cuepoints 40 associated with one or more songs in the song data 30. Moreover, the sequencer unit 36 might also select subsequences, which might include parts of the frame sequences and other portions of the song data 30, such as parts of different songs. How frame sequences and subsequences might be chosen will be discussed in more detail later in this description.

The transition generation unit 26 might also include a combiner unit 37, which might combine frame values for frames based on the particular frame mapping. The combiner unit 37 (or alternatively, another component in the program 20) might use the cuepoints 40 in the transition data 24 to partition, reorder, join together, or mix together the song data 30. The combiner unit 37 (or other component) might further use the parameters 48, such as bass and treble profiles in transition data 24, to vary the volume and dynamic range of specific frequencies of the song data 30 over time. The combiner unit 37 may also be implemented in software and/or hardware. Discussed later in this description are exemplary embodiments showing how frame values might be combined.

This description of the transition generation unit 26 is not meant to be limiting, and many other ways of transition generation are possible. For example, the unit 26 might also use filters in the parameters 48 to transform and process the song data 30. Moreover, it should be understood that in other embodiments, any of the components 35-37 within the transition generation unit 26 might be combined, separated from the unit 26, or removed altogether. For example, the cuepoint selection unit 35, the sequencer unit 36 and/or the combiner unit 37 may be joined together or separate from the unit 26. Alternatively, the unit 26 might have a separate mapping unit (not shown) that generates a frame mapping between frames and/or subsequences that the combiner unit 37 uses when combining frame values.

In FIGS. 1C-D, we see that the transition generation unit 26 uses the transition data 24 and the song data 30 to generate a transition 50. The transition 50 might be a piece of the song data 30 that has been modified by the unit 26. The transition 50 might include pieces of two separate songs, with certain aspects of both songs (e.g., sound, volume, mix, beats per minute (BPM), duration, offset) varied. As discussed in more detail below, the transition 50 can serve as a bridge between two songs, allowing for beat-matched playback.

Although some of the components in FIGS. 1A-1D are shown as separate, it should be understood that any of them might be incorporated within one another. For example, the user interface 28 might be part of the player 22, or the player 22 may directly include the transition generation unit 26. Alternatively, as shown in FIG. 1E, the player 22 might be separate from the program 20, and the song data 30 may be separately accessed by both the player 22 and the program 20.

Furthermore, it should be noted that although the transition data 24 and the song data 30 are not shown as interconnected in these embodiments, they may be connected in any way. For example, the transition data 24 and the song data 30 might be interspersed together when stored. In one embodiment, the transition data 24 might be stored in a header within the song data 30. Such an embodiment would allow the song data 30 and the transition data 24 to be available together, such that the program 20 might have the ability to mix song data 30 without accessing a remote network or other external data.

In another embodiment, the cuepoints 40 (or any parameters 48) might be marked within the song data 30, perhaps by some sequence of frame values or silent frames at various points corresponding to measure groupings in the song 30. For example, the cuepoints 40 might correspond to some arbitrary frame value (e.g., 0.013) or some sequence of frame values (e.g., 0.12, 0.013, 0, −0.11) that has been predetermined. When the program 20 encounters a frame or sequence of frames in the song data 30 with these values, it could recognize the position of the frame as a cuepoint for the song data 30. The cuepoint might mark, for example, the boundary of a measure grouping in the song data 30. Alternatively, the cuepoint might mark a point that is some predetermined offset from the boundary of the measure grouping, so the boundary of the measure grouping can be determined using the cuepoint and the offset.

If the sequence of frame values used to encode the cuepoints 40 in the song data 30 is relatively short, it will likely not be audible by a person listening to the song data 30 as it is played back. For example, some listeners cannot discern snippets of less than about 10 milliseconds of song data 30, which corresponds to about 440 frames if the song data 30 is sampled at 44,100 samples per second. Other listeners may not discern snippets on the order of about 100 milliseconds of song data 30, which would correspond to about 4400 frames at the 44,100 sampling frequency. So if the cuepoints 40 are encoded within the song data 30 in sufficiently small segments, it is possible they will have no discernible impact on playback of the song data 30.

FIG. 2A-2E

Exemplary Embodiments for Mixing Song Data Using a Network

As noted previously, the player 22, the program 20, and the song data 30, may be physically connected on the same computer system or connected remotely via a network. For example, as shown in FIG. 2A, the components may be separated with components belonging to a server 32 (which might be any kind of remote data source, computing system, or storage unit) and the program 20. The server 32 and the program 20 might be separate software programs running on separate computers and communicating with one another via messages 27 over a network 29. One or both of them might contain hardware elements. The program 20 might contain a network interface 38 that enables it to communicate with the server 32. Such an interface 38 might be, for example, an Ethernet controller, router, wireless receiver, or any other packet-switching device. The network 29 might be, for example, the Internet, wireless broadband network, broadcast system, or mobile telecommunications network, such as a 3G or 4G wireless network.

Messages 27 may stream from the server 32 to the program 20 in both directions. In the embodiment shown in FIG. 2A, these messages 27 might contain the song data 30 and the transition data 24 sent from the server 32, and signals generated by the player 22 and the user interface 28 in the program 20. For example, the program 20 might send messages 27 that comprise identification tags for one or more songs that the program 20 might use to generate a transition 50. The identification tags might be used to query one or more predetermined lookup tables (not shown) on the server 32. The predetermined lookup tables might in turn store the transition data 24, including the cuepoints 40 and/or the parameters 48 (which might, for example, comprise a beat map or other parameters used by the program 20 to generate the transition 50). The server 32 may then stream to the program 20 the transition data 24 for the songs whose identification tags were sent by the program 20. The messages 27 may be encoded using any number of various protocols (e.g., TCP/IP, HTTP, FTP, UDP, POP3, IMAP, OSI, etc.).

It should be understood that any of these components might be distributed between the server 32 and program 20 in a variety of ways. For example, as discussed regarding the embodiment shown in FIG. 2A, the song data 30 may be stored on a storage device or memory unit with the program 20, but the transition data 24 may be stored on the server 32. In such an embodiment, the server 32 might stream the cuepoints 40 and/or the parameters 44 for particular songs to the program 20, which in turn would use the transition generation unit 26 to generate a transition 50 (as shown previously in FIGS. 1C and 1D).

Such an embodiment might be useful, for example, for mobile devices. The program 20 could be any program or "app" on the mobile device, and the server 32 could stream the transition data 24 to the program 20, which could in turn generate the transition 50. The transition data 24 may then be cached with the program 20 or restreamed to the program 20 each time the data 24 is used.

Figure 2B:
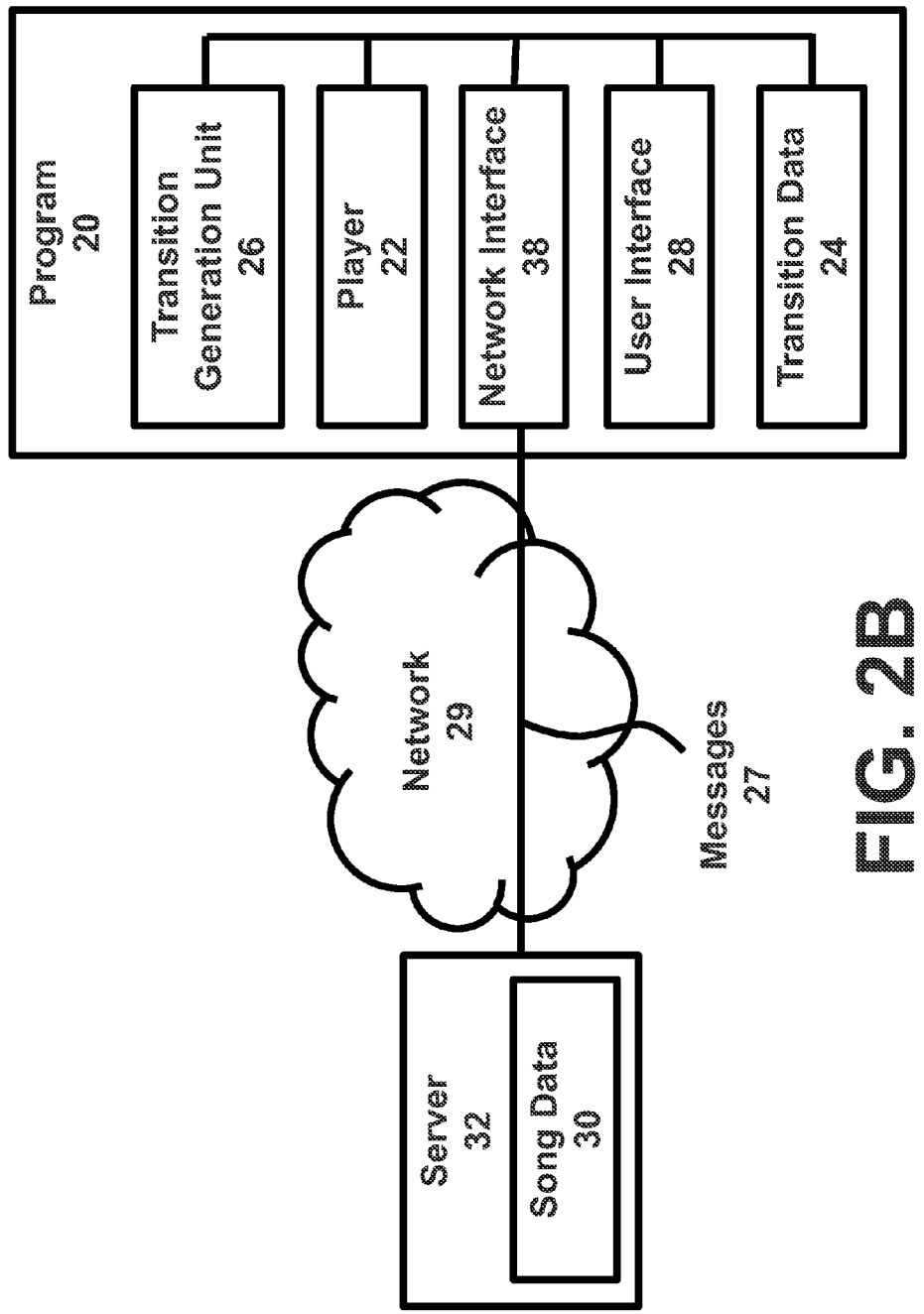

FIG. 2B shows another exemplary embodiment where the song data 30 is stored on the server 32, but the transition data 24 is stored with the program 20. Such an embodiment might be useful in conjunction with "streaming" music services that stream songs to users. The program 20 might take such song data 30 from a streaming music provider and use locally stored transition data 24 and the transition generation unit 26 to produce a transition 50.

Alternatively, the server 32 might stream in one file certain parts of the song data 30 relating to sections of a song that might be used in generating a transition (e.g., this might be a song chosen by the user via the user interface 28). This would enable the program 20 to get the data it might need for generating a transition in just one URL request to the server 32, as well as possibly economizing on the amount of data that the program 20 receives over the network 29. The server 32 might select what portions to stream based on information that the program 20 first provides. This procedure could also extend to multiple songs that the user may wish to play or mix; relevant parts of the songs rather than the whole songs might then be received in one download.

Figure 2C:
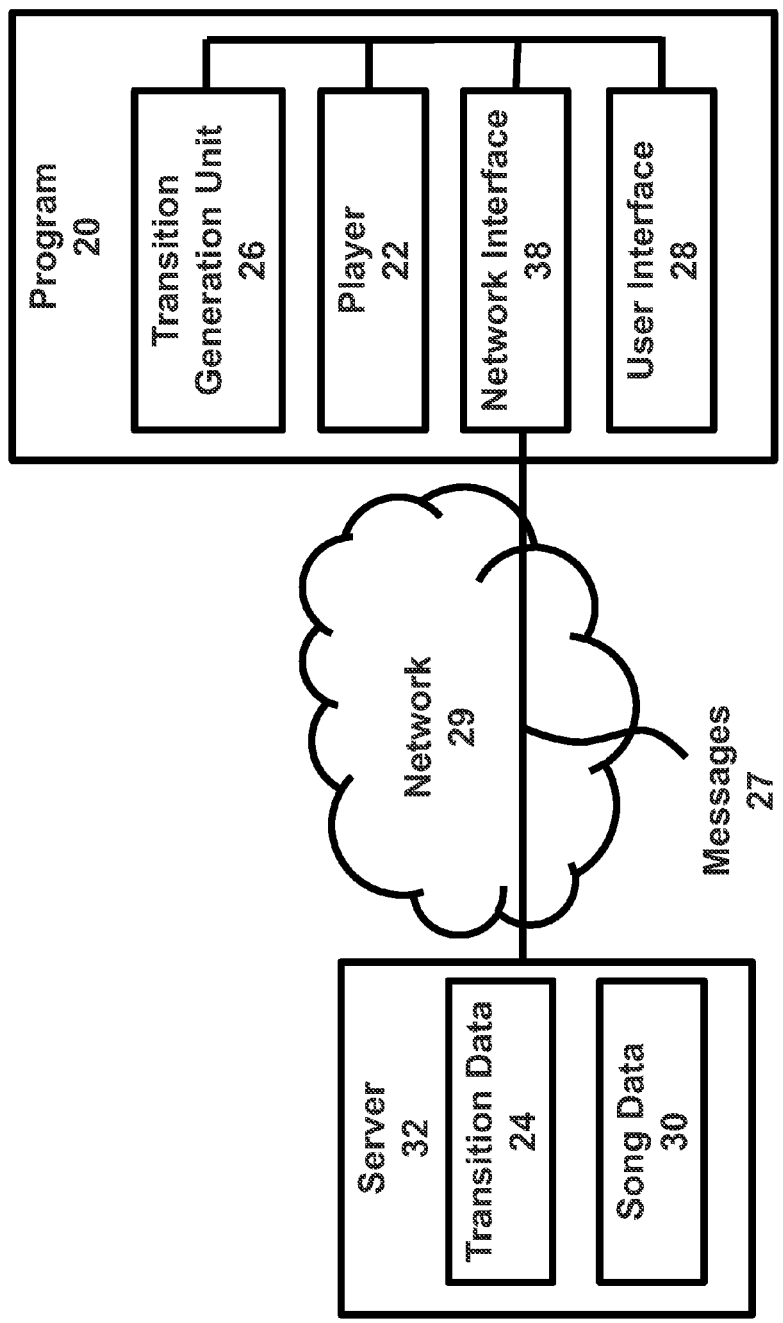

Of course, many other variations are possible. FIG. 2C shows another exemplary embodiment where both the song data 30 and the transition data 24 are stored with the server 32 and then streamed to the program 20 via the messages 27. The program 20 may then use the unit 26 to produce the transition 50.

Figure 2D:
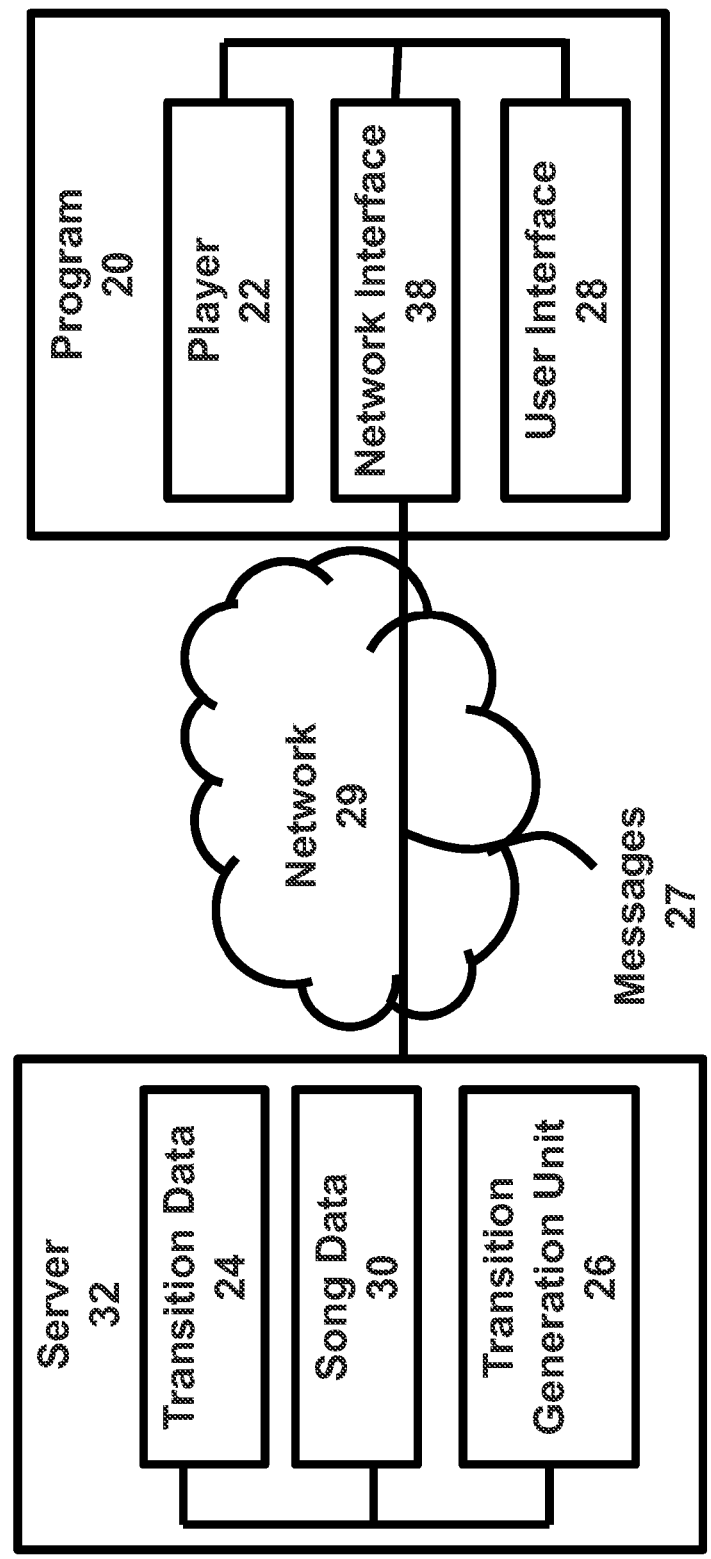

FIG. 2D is yet another exemplary embodiment where the song data 30, the transition data 24 and the unit 26 are all stored on the server 32. In such an embodiment, the server 32 might produce one or more transitions 50, which it would then stream along with the song data 30 via the messages 27 to the program 20 for playback.

Figure 2E:
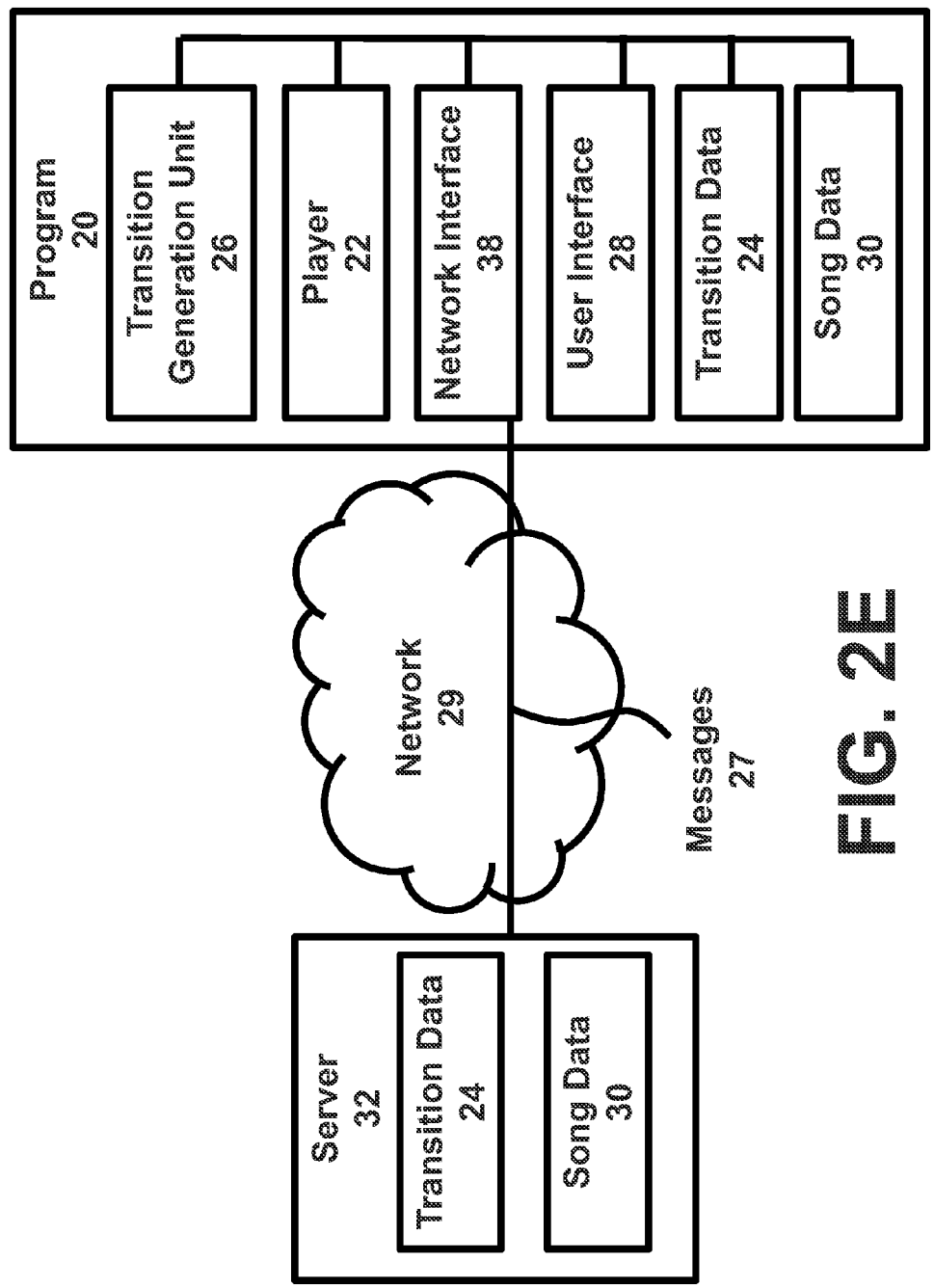

FIG. 2E shows one more exemplary embodiment with the song data 30 distributed between a storage device on the program 20 and a storage device on the server 32. It might be that the program 20 has certain song data 30 (e.g. songs in a collection) while the server 32 may have different song data 30 (e.g. other songs in a separate collection). The song data 30 might then be streamed (e.g. uploaded, downloaded, shared) between the program 20 and server 32 via the messages 27.

Such an embodiment might be useful if the song data 30 is to be played on a web-based program 20 and player 22.

When transferred over the network 29, it might also be possible to obfuscate or encode the song data 30 and/or transition data 24 in any number of different ways. For example, the server 32, program 20, or some other device or program might reorder portions of the song data 30 based on a fundamental unit. For example, the server 32 might reorder eighth note segments of the song data 30 when delivering it to the program 20. This might make the song data 30 sound different from the actual underlying song, which might render it unlistenable without a decoder that unscrambles the song data 30.

This scrambling/unscrambling might be done on the level of a frame—for example, the entity delivering the song data 30 (e.g., the server 32) might store a secret seed integer that is used to randomize the order of frames in the song data 30. The entity receiving the song data 30 (e.g., the program 20), which might be reordering frames anyway to generate a transition 50, might also use the secret seed integer to reconstruct the original order of frames in the song data 30.

Various degrees of scrambling/unscrambling could also be used, based on the application desired. For example, the song data 30 could be minimally reordered to sound slightly inaccurate when played, but the reordering may not be so serious as to prevent the song data 30 from being able to be coded into a compressed format, such as MP3.

A similar use of secret keys or other obfuscation methods could also be used on the transition data 24, which could render it useless unless it is descrambled. This might help prevent the transition data 24 (e.g., the cuepoints 40) from being intercepted and stolen when it is transferred over the network 29.

A simple form of obfuscation might relate to delivering transition data 24 only for particular, non-standard versions of the song data 30. For example, the server 32 might only deliver "pre-elongated" song data 30 to the program 20. Such song data 30 might, for example, involve time-stretching the song data 30 such that they have more frames (e.g., are slower) than the underlying songs.

A reason to do this might relate to computational and accuracy limitations in time-stretching songs—since it is often easier and less computationally intensive to compress songs (which involves removing frames) rather than elongate songs (which involves adding frames), the server 32 might pre-elongate the song data 30 using a high quality computing system. The extent to which the song data 30 is pre-elongated might be based, for example, on the song with the highest beats-per-minute (BPM) count in the song data 30.

The server 32 may then deliver the pre-elongated versions of the song data 30 to the program 20, which may then perform the computationally-simpler operation of compressing the song data 30 as appropriate when playing the songs or generating a transition 50. So by delivering a pre-elongated version of a song, one might be able to deliver a higher quality song that will be less susceptible to audio degradation when it is later contracted.

If pre-elongated versions of songs are being transmitted as the song data 30, the program 20 would likely rely on transition data 24 (including cuepoints 40) that has been determined based on the pre-elongated versions of the songs. This might act as a simple form of obfuscation for the transition data 24—since the cuepoints 40 are for pre-elongated versions of the songs, the cuepoints 40 might not be useful if standard versions of the songs are used.

It should be understood that the preceding embodiments are not meant to be limiting, and are intended to merely provide exemplary layouts of the components between a server 32 and a program 20.

FIG. 3A-3D

Exemplary Embodiments for Selecting and Mixing Song Data

Figure 3A:
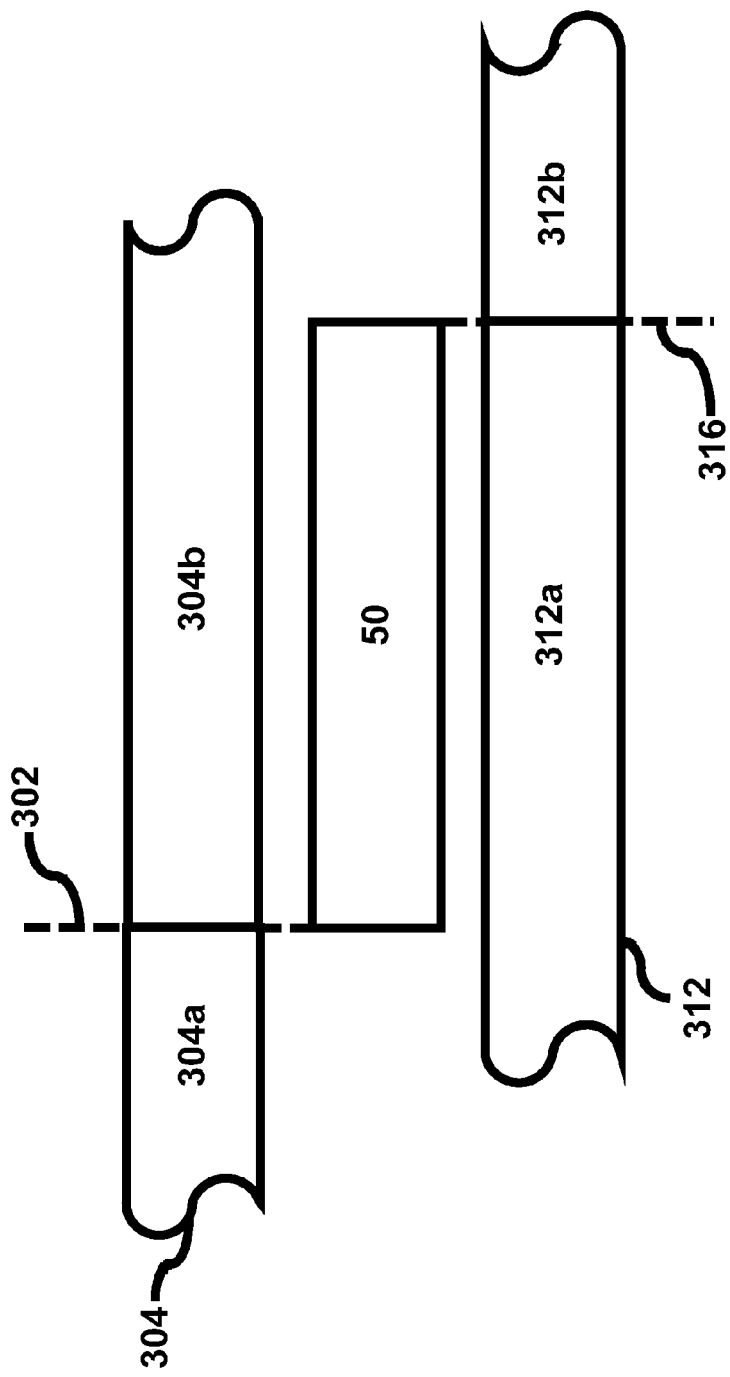
FIGS. 3A-3D are time diagrams illustrating exemplary embodiments of selecting and mixing song data.

Turning now to FIG. 3A, we see a time diagram showing how an exemplary embodiment of selecting and mixing songs may be executed. For illustrative purposes, most of this discussion is keyed in to the embodiments depicted in FIGS. 1A and 1D. However, any of these steps may be performed on other embodiments, including the alternative embodiments previously described.

FIG. 3A shows a first song 304 that is to be played by the player 22. The portion of the song 304 that has been shown is made up of two frame sequences 304a and 304b. Associated with the first song 304 are transition data 24, including cuepoints 40 and parameters 48, as shown in FIG. 1D. Here, the cuepoints 40 include a first startpoint 302. The first startpoint 302 might mark the beginning of a measure grouping in the first song 304, though as discussed earlier with the cuepoints 40, this may vary depending on the embodiment. For example, the first startpoint 302 might mark a point that is some pre-specified offset away from the start of a measure grouping.

The program 20 also identifies a second song 312 to be played, where two frame sequences 312a and 312b of the song 312 are shown here. The first song 304 and/or the second song 312 may be specified by the user, or chosen automatically by the program 20. For example, the user may specify a playlist of songs in the user interface 28 (an exemplary user interface 28 will be described in more detail later in connection with FIGS. 7A-7B). Alternatively, the program 20 may save user preferences from prior playback and automatically enqueue one or more songs to be played after the first song 304. The program 20 might also choose songs to play based on choices of an individual other than the user (perhaps an expert listener connected to the user over a network), who might choose a playlist that includes the first song 304 and/or second song 312 here.

The program 20 may then select a second startpoint 316 for the second song 312. This second startpoint 316 may be one of the cuepoints 40 associated with the transition data 24 for the second song 312. Similar to the first startpoint 304, the second startpoint 316 might be a dominant beat or a marking at the start of a measure grouping in the second song 312, though this may vary according to the embodiment at issue. Moreover, while one second startpoint 316 is depicted in FIGS. 3A-3D, it should be understood that there may be more than one potential second startpoint in other embodiments.

In the present embodiment, the program 20 uses the first startpoint 302 and the second startpoint 316 to determine where to end playback of the first song 304 and where to begin playback of the second song 312. It should be understood that both of these might vary in different embodiments (e.g., playback may start or end at some other point as determined by the program 20).

The program 20 may generate a transition 50 to be played in between the two songs 304, 312. In one embodiment, this transition 50 may be a simple pre-made segment that does not rely on any of the parameters 48 or other cuepoints 40 of the two songs. In another embodiment, the transition 50 might be a volume cross-fade (e.g., fading out the first song 304 while increasing the volume of the second song 312).

Another transition 50 would involve the transition generation unit 26, which could use parameters 48 from the first song 304 and/or the second song 312 to generate a transition 50, as depicted in FIG. 1D. For example, a transition 50 might involve adjusting the duration of and/or time-shifting the first song 304 and the second song 312 in order to align a dominant beat pattern for the first song 304 with a dominant beat pattern for the next song 312. Examples of such a transition are discussed in more detail below, in connection with FIGS. 4A-4G and FIGS. 5A-5G.

Figure 3B:
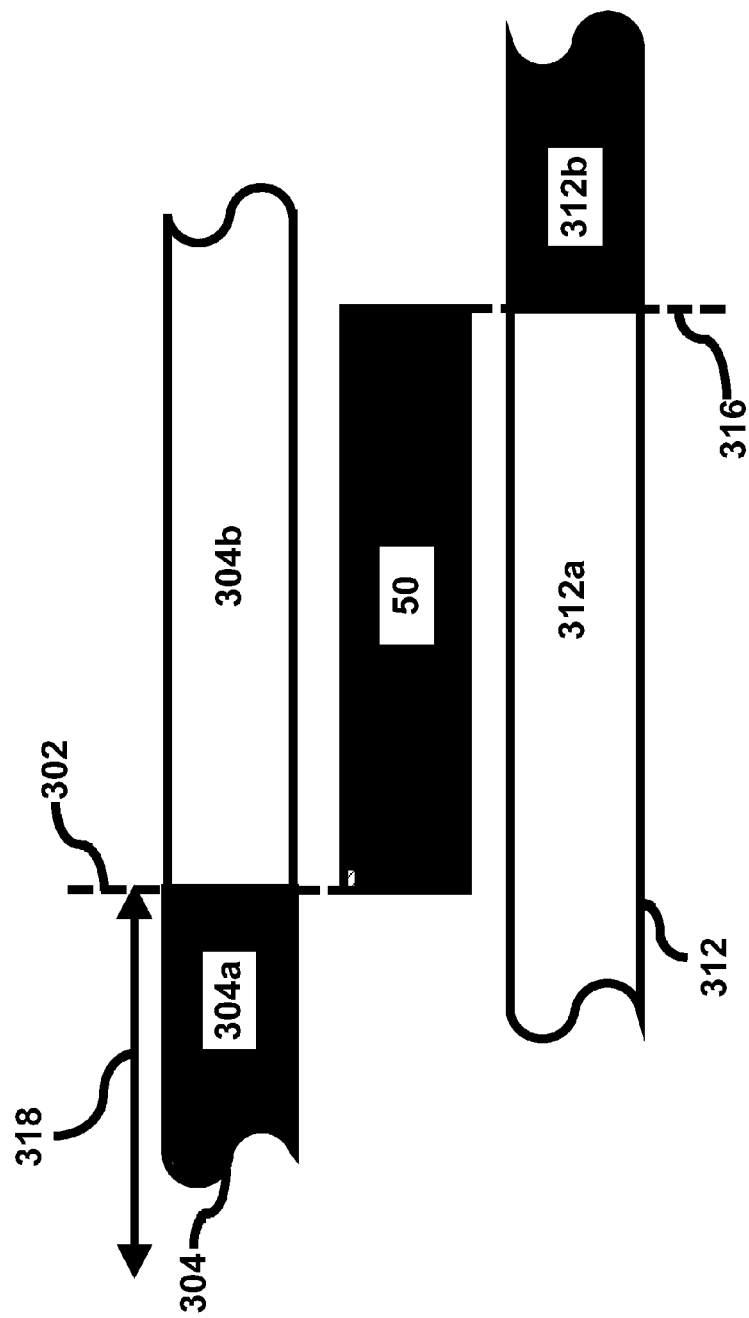

Regardless of how the transition 50 is generated and what song data 30 it contains, FIG. 3B illustrates an exemplary embodiment how the program 20 may execute a switch from the first song 304 to the second song 312 using the transition 50. The hatch pattern indicates the sequence of data being played back by the player 22, where the data might be sent to a buffer, such as the playback buffer 23. As illustrated in FIG. 3B, a playhead (not shown) for the player 22 would first play the data from frame sequence 304a of the first song 304. The playhead would then play the transition 50, and finally the data from frame sequence 312b of the second song 312. These frame sequences 304a, 312b, and other frame sequences or subsequences, might be chosen by the transition generation unit 26 and/or one of its components, such as the sequencer unit 36.

As used throughout this specification, "frame sequence" (such as frame sequences 304a, 312b mentioned above) should be understood as general terms that encompass any sequence of consecutive or non-consecutive frames taken from one or more songs. Here, the frame sequence 304a is shown as a sequence of consecutive frames taken from the portion of the first song 304 prior to the first startpoint 302. This portion of the song may, but need not be, a measure grouping. A frame sequence may sometimes contain just a subset of the frames in a measure grouping. Moreover, as discussed in more detail below in connection with FIGS. 5A-5G, a frame sequence may be comprised of subsequences, which in turn may include frames from other measure groupings in the same song, or frames from other songs.

Returning to our discussion on how a transition between the first song 304 and the second song 312 might occur, FIG. 3B shows the program 20 receiving an advance signal 318. This signal 318 may be generated by the user via the user interface 28. Such an embodiment will be discussed in more detail in connection with an exemplary user interface 28 as shown in FIGS. 7A-7B.

Alternatively, the advance signal 318 may be produced by the program 20, perhaps in response to the status of playback of the first song 304. For example, as the first song 304 nears its end—a fact that may be captured by the fact that the playhead has passed one of the final cuepoints 40 for the first song 304—the program 20 may initiate a transition to the second song 312. Such a process will entail either creating or using a pre-made transition 50 to fill the gap between the first startpoint 302 and the second startpoint 316.

In yet another embodiment, the advance signal 318 may be triggered based on a playback mode selected by the user. For example, if the user wishes to cycle through songs quickly or preview songs in a playlist, he or she may select a "quick transition" mode that will automatically move from a currently playing song (e.g., the first song 304) to a next song in the playlist (e.g., the second song 312) after a certain amount of time. This amount of time may be a set number (e.g., "transition to the new song after 30 seconds") or it might depend on the song being played (e.g., "transition to a new song after playback of one measure grouping in the currently playing song").

Alternatively, the program 20 may automatically trigger the advance signal 318 based on what it decides will sound best. For example, the program 20 may determine that a certain measure grouping in the first song 304 sounds particularly good with another measure grouping in the second song 312, so it might switch between these songs 304, 312 such that these measure groupings are part of the transition 50.

More generally, the program 20 may match portions of any songs specified in a playlist or list of songs that the user has, and switch between them according to a determination by the program 20 as to what transitions will sound best. Alternatively, the program 20 may merely recommend which transitions it believes will sound good but leave it to the user to initiate the transition (e.g., by requiring the user to push an advance button on the user interface 28). How the program 20 may utilize user feedback/information and/or automated mechanisms to make these determinations and recommendations is discussed in more detail below.

Figure 3C:
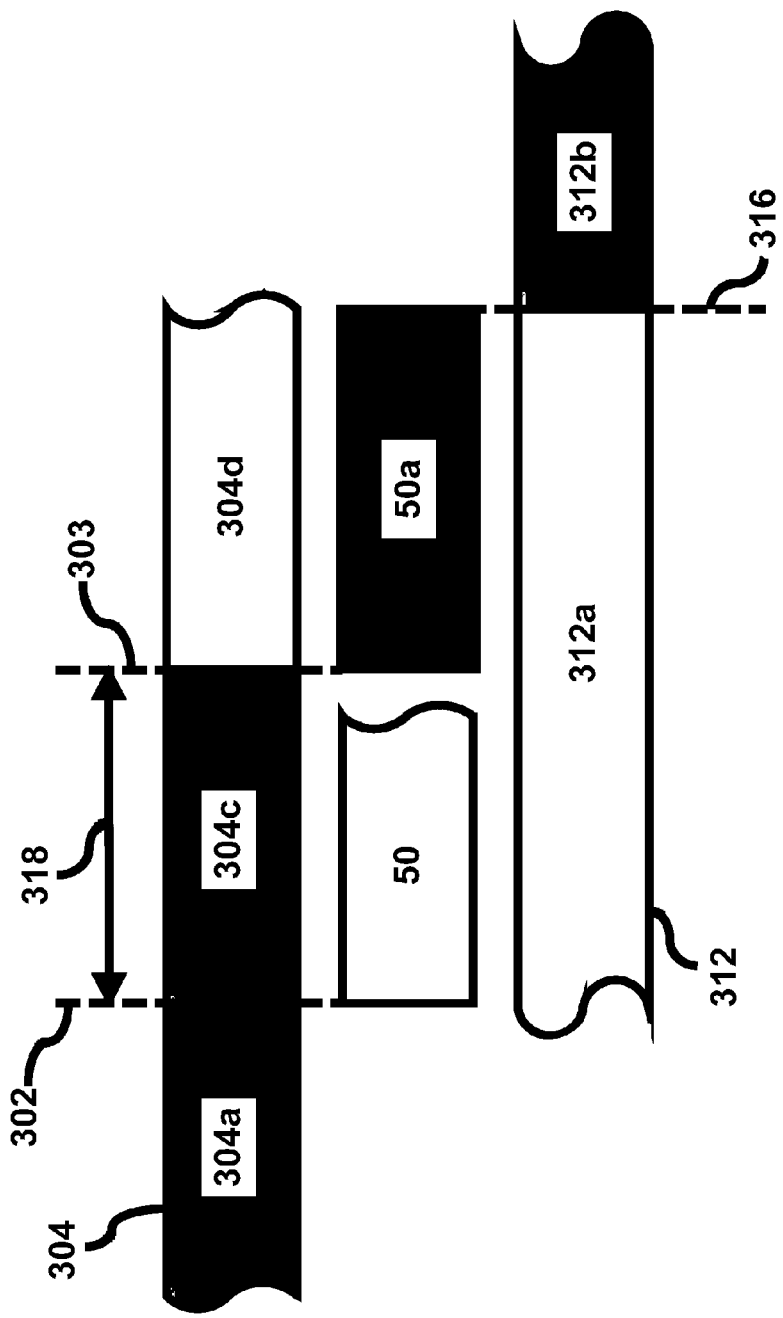

FIG. 3C illustrates another playback scenario. As depicted, the first song 304 has at least two first startpoints 302 and 303. In this scenario, the program 20 receives the advance signal 318 after the playhead has passed the frame associated with the first startpoint 302 but before playback of the frame associated with the first startpoint 303. The program 20 therefore generates a transition based on the first startpoint 302, since the advance signal 318 was received after first startpoint 302 had already passed. The player 22 then plays the transition 50 and subsequently the next song 312 beginning at the second startpoint 316. We see from the hatch pattern in FIG. 3C that frame sequences 304*a*, 304*c* of the first song 304 are sent first to the playback buffer, followed by transition 50*a*, and then frame sequence 312*b* of the second song 312.

Figure 3D:
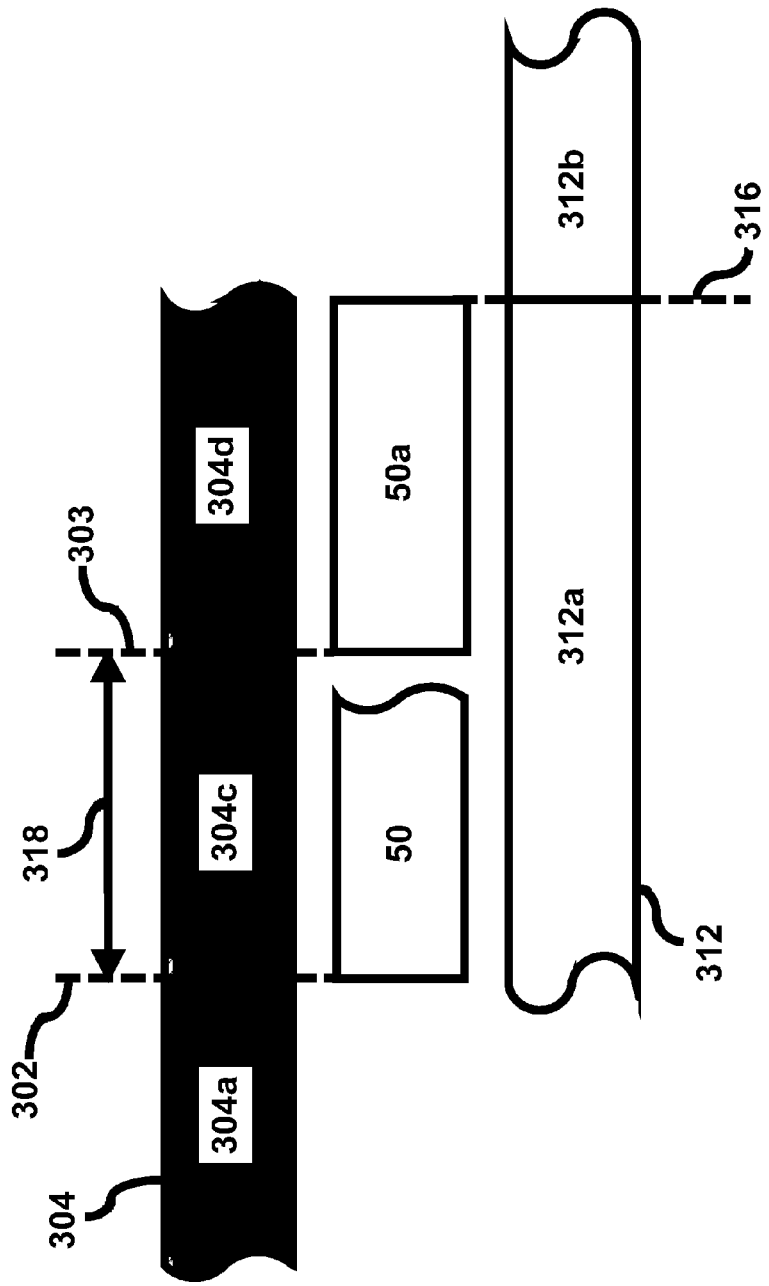

FIG. 3D illustrates a scenario where the program 20 does not receive any advance signal (so there is no advance signal 318) prior to playback of the first startpoint 303. In such a scenario, the player 22 may continue playing the first song 304 until it terminates, or until an advance signal is received and another first startpoint is reached in the song (not shown in the diagram here). The player 22 may then play a transition and proceed to start playing the second song 312 at a second startpoint, which might be second startpoint 316 or some other point not pictured here.

It should be understood that in many embodiments, a number of factors may be used to determine the sequence of playback of the first song 304, the transition 50, and the second song 312. For example, the program 20 (or one of its components, such as the transition generation unit 26 or, if there is one, the cuepoint selection unit 35) may determine a ranking that prioritizes the one or more cuepoints in the first song in terms of which cuepoints might be better as a place to start a transition. Such a priority ranking may depend on playhead position, and the program 20 may update the ranking as the playhead advances. For example, the cuepoints that rank highest might be those that have a frame number greater than the frame number associated with the playhead (since those cuepoints have yet to be reached by the playhead). In particular, the next cuepoint that the playhead will hit (e.g., the cuepoint with the lowest frame number greater than the frame number for the playhead) might receive a high rank, since it is the nearest cuepoint to the playhead.

In generating a priority ranking for the first song cuepoints, the program 20 may consider other factors other than position of the playhead and receipt of the advance signal 318. For example, given that time-stretching and generating a transition takes time, the program 20 might consider this latency when selecting a first song cuepoint. This latency might be relevant because if the playhead is sufficiently close to the next cuepoint it will reach, there may not be enough time to generate the transition 50 for playback if one has not been generated yet. The program 20 may then prioritize a later cuepoint as a preferred cuepoint in the first song. Alternatively, the program 20 might address this latency problem by pre-rendering transitions for one or more of the cuepoints in the first song, so that they are more quickly available for playback.

The program 20 may choose among cuepoints in the second song 312 and/or first song 304 based on other factors as well. For example, a signal from the user or from a component within the program 20 may affect which transition is generated by the program 20. A program signal may be, for example, a status of the program window on the user interface 28, a timeout signal, a central processing unit load signal, and a memory signal.

To illustrate, if a user window has been minimized, this might be a sign that the user is unlikely to trigger an advance button on the user interface 28, perhaps making it less likely that the advance signal 318 is forthcoming. So instead of expending resources preparing transitions for all cuepoints in the first song 304 (on the theory that the user might trigger the advance signal 318 at any moment), it might make more sense for the program 20 to prepare a transition for just the last cuepoint in the first song 304, since it is likely that the first song 304 will play out until that point. Indeed, it might make sense for the program 20 to prepare this transition first as a matter of course, such that a beat-matched transition between the first song 304 and the second song 312 is assured.

Other signals might instruct the program 20 to change which transitions it is rendering and how. For example, a timeout signal might indicate that a process is taking longer than a set amount of time, suggesting that the program 20 should not try to generate more transitions. Similarly, a central processing load signal, which might indicate whether the CPU is having a difficult time running computations, and a memory signal, which might indicate that a memory unit is running out of space, might also help the program 20 choose which transitions to render (or not to render).

User-generated factors may also affect how the program 20 chooses among cuepoints and decides what to render. For example, the program 20 and/or the server 32 may collect information from users about transitions that sound good between various songs. Some of this might be direct feedback from a user, who might, for example, vote on transitions that he thought sounded good or bad. This feedback may be submitted via the user interface 28. Other user information (e.g., history of transitions played, preferences selected by the user, choice of songs in a playlist, choice of songs purchased, amount of time spent listening to particular songs or songs in a genre, etc.) may also be used to determine optimal transitions.

The program 20 may utilize the user feedback/information from a particular user to customize transitions for that user. For example, the program 20 may know that a particular user enjoys transitions from one particular artist (e.g., Nirvana) to another (e.g., Nine Inch Nails), and dislikes one particular transition involving a certain measure grouping in the first song 304 and another measure grouping in the second song 312.

Additionally, or alternatively, the program 20 may aggregate user information to determine default cuepoint choices. For example, based on user feedback and/or other information gathered from users, the program 20 might determine that one particular transition between the first song 304 and the second song 312 sounds particularly good to most users, and that most songs from two particular artists do not sound good when combined.

Additionally, the program 20 might use some kind of automated mechanism to determine which transitions sound good to users. One way to do this might be to use particular sonic attributes of songs in order to determine if they would sound good when mixed together. For example, the program 20 and/or server 32 might calculate a volume envelope for songs in the song data 30. This volume envelope may, for example, measure the amplitude or energy of different frequencies or frequency bands in the songs. Based on these values, it might be determined that certain songs are more likely to sound better than others when combined.

For example, suppose the program 20 is trying to mix a frame sequence beginning with the first startpoint 302 with some portion of the second song 312. The program 20 might consider the volume envelope of that frame sequence, either by analysis or by loading values for an analysis that was done previously. Suppose this frame sequence has a high volume in high-range and low-range frequencies, but has a low volume in the mid-range frequencies. When choosing a second song startpoint from among the cuepoints 40 in the second song 312, the program 20 might seek out one of the cuepoints 40 that corresponds to a portion of the second song 312 with a high volume in the mid-range frequencies and a low volume elsewhere. If this portion of the second song 312 is combined with the frame sequence, the resulting transition 50 may have a more even volume across frequency levels. This might be pleasing to the ears and hence, might be a better portion of the second song 312 to choose for mixing.

FIG. 4A-4G

Exemplary Embodiments for Generating a Transition

Figure 4A:
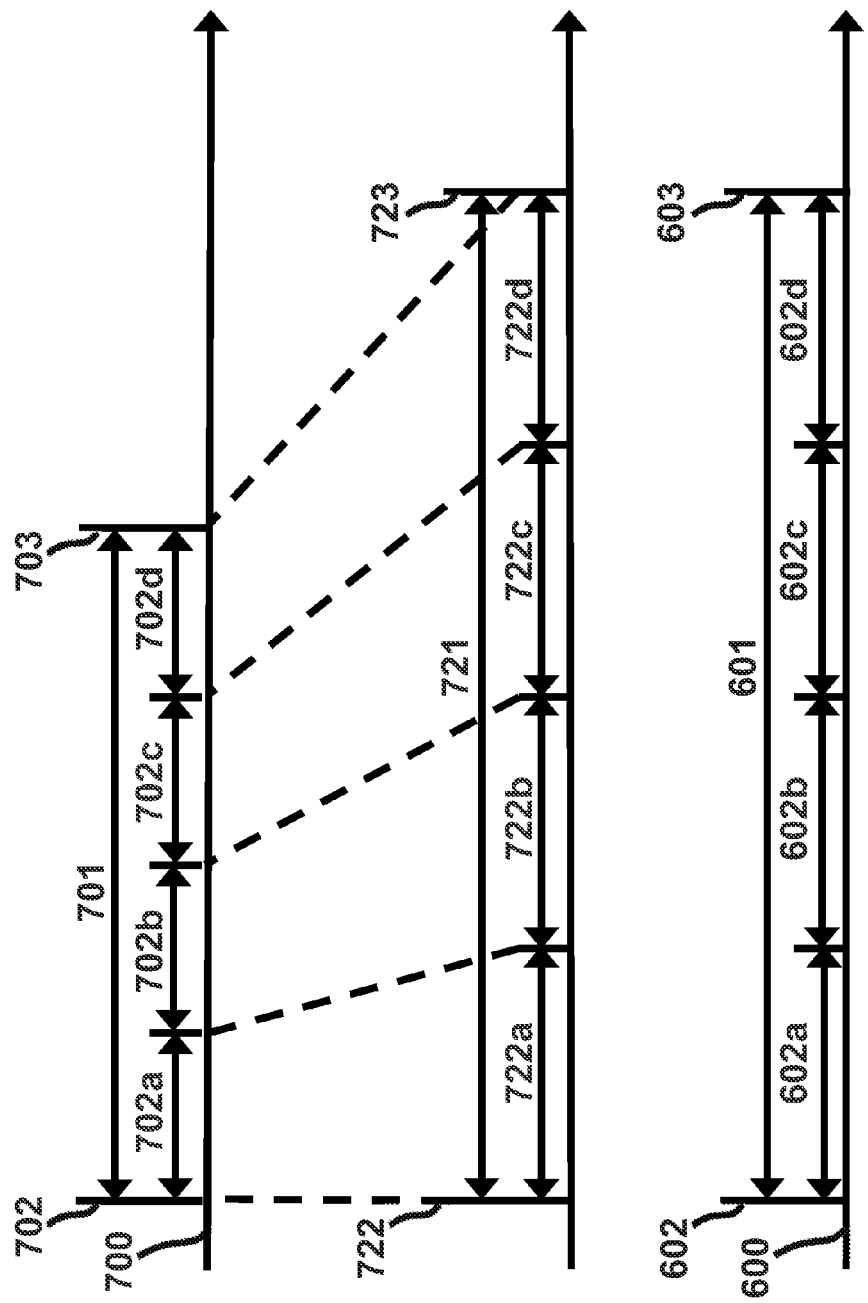

Turning now to FIG. 4A, we see how a transition (such as transition 50 or transition 50a in FIGS. 3A-3D) might be generated. FIG. 4A shows a first song 700, with a measure 701 having a measure startpoint 702 and a measure endpoint 703. The measure 701 has been divided into four equal subsequences 702a, 702b, 702c, 702d.

The start and end points of each of these subsequences corresponds to a beat in the song 700. A measure like measure 701 is typically described as having four beats (you count either the measure startpoint 702 or the measure endpoint 703, in addition to the three beats within the measure). It should be understood that in other embodiments, measures might not be divided into equal subsequences, beats might not be equally spaced in a measure, and a measure might have more or less than four beats. It should also be understood that subsequences (such as the subsequences 702a, 702b, 702c, 702d) may sometimes be colloquially be referred to as beats, rather than the start and end points of these subsequences being called beats.

FIG. 4A also shows a second song 600, with a measure 601 having a measure startpoint 602 and a measure endpoint 603. The measure 601 also has four beats and four corresponding subsequences, 602a, 602b. 602c, 602d.

As FIG. 4A shows, measure 701 of the first song 700 can be time-stretched into a time-stretched measure 721, with time-stretched measure startpoint 722 and time-stretched measure endpoint 723. Time-stretched measure 721 has time-stretched subsequences 722a, 722b, 722c, 722d that match the length of the subsequences 602a, 602b, 602c, 602d, respectively, of the measure 601 in the second song 600. In an alternative embodiment, the entire first song 700 may be time-stretched instead of just the measure 701.

The time-stretching performed here might be done by the transition generation unit 26. Alternatively, the time-stretching might be done on a server (such as the server 32 in FIGS. 2A-2E), with the time-stretched measure 721 being delivered via messages 27 over the network 29 to the computer system running the program 20.

Time-stretching generally implies that the number of frames in a song has been increased or decreased while the underlying sound of the song remains the same. For example, if a segment of a song is time-stretched by removing frames from the segment, it might sound as if it has been sped up. If a segment of a song is time-stretched by adding frames to the segment, it might sound as if it has been slowed down. The pitch of the segment (e.g. musical key) might also change when a song is time-stretched, though sound stretch libraries that preserve pitch during time-stretching operations might also be used.

Since in the present embodiment, the second song subsequences 602a, 602b, 602c, 602d are longer than their corresponding first song subsequences 702a, 702b, 702c, 702d, this implies that the transition generation unit 26 (or server 32, if that does the time-stretching) has added frames to generate time-stretched subsequences 722a, 722b, 722c, 722d, which have substantially the same number of frames as the second song subsequences 602a, 602b, 602c, 602d, respectively.

As an alternative to time-stretching, subsequences 702a, 702b, 702c, 702d could be changed into subsequences 722a, 722b, 722c, 722d by simply adding some extra frames and not performing a typical time-stretching operation. These extra frames may be arbitrary—for example, they might be silent frames (e.g., with a frame value of 0), they could be other frames from some portion of the song 700, or they may be frames received from some external song.

Figure 4B:
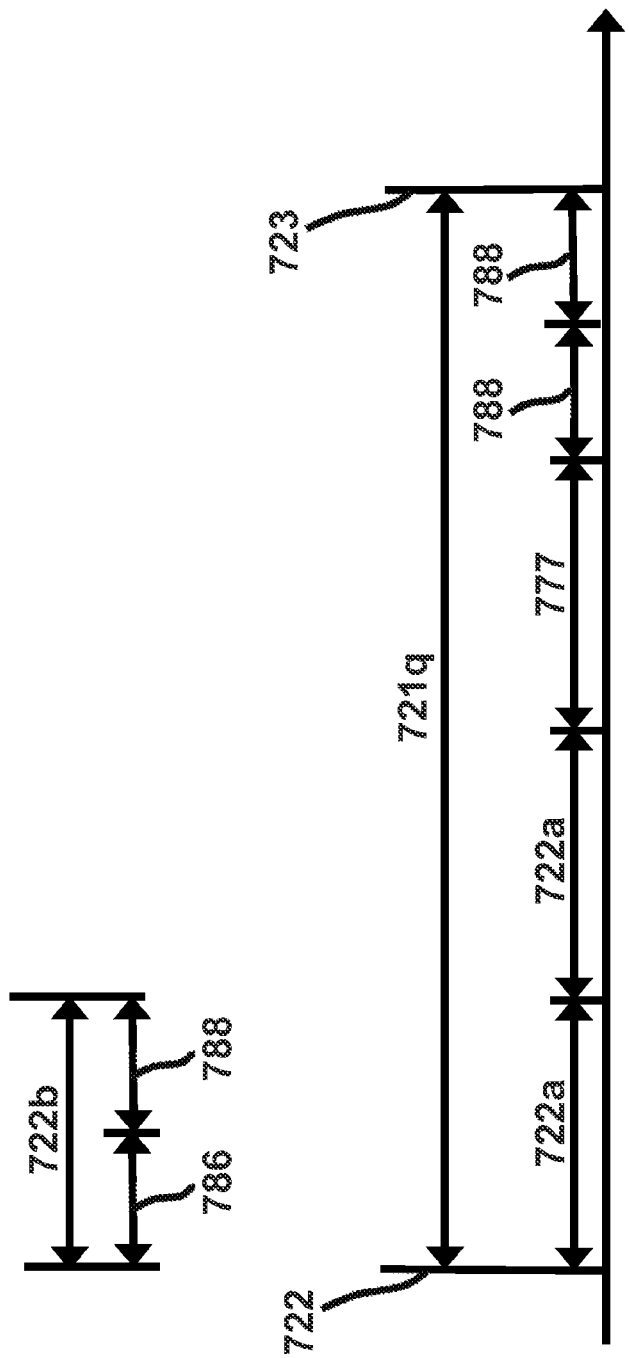

Turning to FIG. 4B, we see a variation of the previous embodiment. At the bottom, we see time-stretched measure 721q, which is a variation of the time-stretched measure 721 shown in FIG. 4A. Although both time-stretched measure 721 and time-stretched measure 721q share the same startpoint 722 and endpoint 723, subsequences within the measure 721 have been changed, replaced, or looped by the program 20 to create measure 721q.

For example, in place of subsequence 722b in measure 721, we see that subsequence 722a has been placed in measure 721q. This will generate a "loop" effect at the level of a subsequence, as subsequence 722a will now play twice in a row if this measure is played.

We also see that subsequence 722c in measure 721 has been replaced by subsequence 777 in measure 721q. Subsequence 777 might be a set of external frame values, such as another portion of the first song 700 (before or after it has been time-stretched), a portion of the second song 600, or some other piece of song data 30 altogether. For example, subsequence 777 might comprise some kind of external sound (e.g., a ring of a bell, a portion of another song, a percussive element). This example shows how the program 20 might replace subsequences, parts of subsequences, or individual frames of a song by external frames (e.g., frames from outside the particular subsequence or measure being altered).

Additionally, FIG. 4B shows that subsequence 722b (which was introduced in FIG. 4A as the second subsequence in the time-stretched measure 721) is comprised of two frame segments, 786 and 788. In measure 721q, instead of using subsequence 722d (which was used in measure 721), the second frame segment 788 is repeated twice. This will cause whatever sound is represented by part 788 to be played twice in a row at the end of playback of measure 721q. So we see how a subsequence may be partitioned into smaller frame segments, which may be looped or altered similar to subsequences.

This example illustrates how the program 20 might partition a subsequence into smaller frame segments and then operate on those frame segments. For example, the program 20 may divide a subsequence into an even number of frame segments, and then loop one or more of those frame segments.

In some embodiments, it might be advantageous to loop frame segments that are at the beginning or the end of a frame sequence, because these might be desirable parts of a song to repeat or otherwise mix. For example, the first measure following a cuepoint (e.g., first measure in a measure grouping) might have a larger or more recognizable downbeat than other measures, so it might be a better measure to loop. Alternatively, for a next song to be played (e.g., the second song 600 here), the last measure in a measure grouping that is used in a transition will have aural continuity with the rest of the song, which will be played following the transition. Accordingly, looping this segment may also be desirable.

These examples should also illustrate that different embodiments of the program 20 might perform any number of different operations on frame sequences and subsequences (including segments within subsequences). For example, the program 20 may change the number of frames (which may involve time-stretching) of any subsequence or set of subsequences. It might reorder the frames within a subsequence (e.g., reverse the order of frames), or change the order of subsequences. The program 20 might repeat portions of a subsequence to generate a loop within a subsequence, or repeat subsequences to generate a loop effect at the subsequence level. Or the program 20 might replace one or more of the frame values in a subsequence with an external frame value, which might come from the same song as the subsequence or from some other song data 30.

It should be understood that this list is not exhaustive, as the program 20 might do other things in other embodiments. For example, the program 20 might add an offset to any given subsequence by prepending it to the beginning or appending it to the end of the subsequence. This which might extend the length of the subsequence and whatever measure might contain the subsequence. This offset may, for example, be another portion of a song that begins on one beat and ends on another beat.

Although the operations are shown as being performed on the time-stretched measure 721 of the first song to generate measure 721q, it should be understood that these operations may be performed on time-stretched or non-time-stretched versions of any song. For example, in an alternate embodiment, the program 20 may add an offset or reorder frames of the measure 601 of the second song 600, or loop subsequences in measure 701 of the first song 700.

Moreover, in an exemplary embodiment, the user interface 28 may permit a user to select between various transition modes that determine how the program 20 operates on frame sequences and subsequences. For example, each transition mode might specify a different generic mapping between subsequences or frames in a first song (e.g., a currently playing song, like the first song 700 here) and a second song (e.g., a next song to be played, like the second song 600 here). The program 20 may then apply the generic mapping to map one or more of the subsequences in the currently playing song to one or more subsequences in the song to be played next. For example, in the embodiment shown in FIG. 4B, a transition mode may apply a subsequence mapping that specifies the order of subsequences in the time-stretched measure 721q. The mode may additionally, or alternatively, specify a frame mapping for frames within any particular subsequence.

Figure 4C:
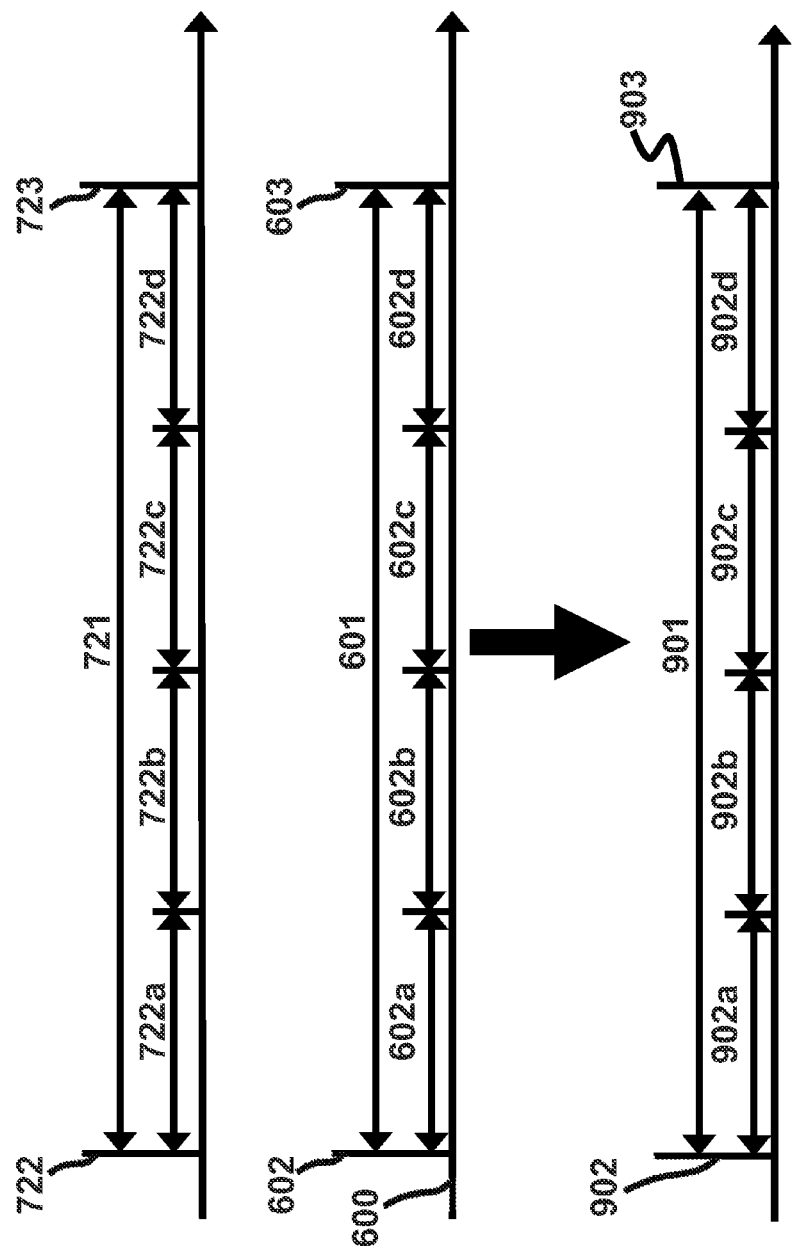

Turning now to FIG. 4C, we see how a transition may be generated from the time-stretched measure 721 and the measure 601 from the second song 600. It should be understood that any other pair of measures (e.g., time-stretched measure 721q and the measure 601) might be used instead to get a different transition.

In FIG. 4C, we see that frame values from measures 721 and 601 may be combined to generate a transition measure 901, with transition measure subsequences 902a, 902b, 902c, 902d. In a simple embodiment, combining frame values may involve merely adding the frame values of one song to another song. This, or other forms of combination, might be accomplished by the transition generation unit 26 and/or one of its component (such as the combiner unit 37).

For example, here we have two measures (the time-stretched measure 721 and the second song measure 601) that are aligned along measure boundaries (measure boundary 722 aligns with measure boundary 602, and measure boundary 723 aligns with measure boundary 603). The measures 721, 601 are also aligned along beats (e.g., frame subsequences 722a. 722b, 722c, 722d, have substantially the same number of frames as subsequences 600a, 600b, 600c, 600d, respectively).

The program 20 may form the transition measure 901 by simply adding frame values for corresponding frames in the two measures 721, 601, such that the frame value for the measure boundary 722 adds together with the frame value for the measure boundary 602, and frame values for subsequent frames in the time-stretched measure 721 add together with frame values for subsequent frames in the measure 601.

It should be noted here that songs do not need to be perfectly aligned for them to be combined in this manner. For example, the time-stretched measure 721 might merely be substantially aligned with the second song measure 601, with subsequences 722a, 722b, 722c, 722d, merely having substantially the same number of frames as subsequences 600a, 600b, 600c, 600d, respectively.

Whether songs are substantially aligned might depend on a number of factors, such as the degree of accuracy desired for the audience at issue. For example, true audiophiles may demand a higher level of accuracy than the average user. One possible test, though not necessarily the only one, for whether sequences or subsequences are substantially aligned would be to see if a listener (e.g., an average listener, an especially keen listener, etc.) can discern any misalignment if the two supposedly aligned songs are combined and played. As noted earlier, a misalignment greater than about 10 milliseconds of song data 30, which corresponds to about 440 frames if the song data 30 is sampled at 44,100 samples per second, might be discernible to some listeners. Other listeners may only respond to a misalignment on the order of about 100 milliseconds of song data 30, which would correspond to about 4400 frames at the 44,100 sampling frequency. It should be understood that these values are exemplary and that a larger degree of misalignment may be acceptable in certain embodiments.

In addition to adding frame values, combining two songs might involve applying any number of filters, effects, overlays, or any other processing to a transition (such as the transition 50 or the transition measure 901). For example, the transition generation unit 26 might filter the transition measure 901 (and/or some part of the first song 700 or the second song 600) prior to it being played. In one embodiment, the unit 26 might apply a band filter (not shown). This filter might alter frame values in different frequency bands of a song based on a desired playback profile. The filter might also determine the relative mix of a playback parameter (e.g., high frequency band volume, mid frequency band volume, low frequency band volume) based on the parameters 48 for the songs being mixed. Similarly, the unit 26 may use some form of volume normalization to ensure that no song being played varies by more than a certain threshold in its volume as compared to other songs being played. Using a filter and/or volume normalization in the present embodiment could help make a transition between songs smoother.

Additionally, the transition generation unit 26 might also shift the pitch of a transition based on the musical keys of the songs at issue. Here, the unit 26 might shift the pitch of the measure 901 based on the musical key of the first song 700 and the second song 600.

Turning to FIG. 4D, we see how the transition generation unit 26 might alter the tempo of a transition (here, transition measure 901) to generate a smooth change in tempo from the first song 700 to the second song 600. In the present embodiment, such a change would depend on the relative tempos of the songs.

For example, suppose the first song 700 has a tempo of 108 beats-per-minute (BPM), and the second song 600 has a tempo of 100 BPM. Thus, the first song 700 is faster than the second song 600. Since the first song 700 will be played first, followed by the transition measure 901, and then the second song 600 (see the discussion in connection with FIGS. 3A-3D), the program 20 may seek to ensure that the transition measure 901 begins with a tempo close to the first song tempo and ends with a tempo close to the second song tempo. In other words, the program may seek to have the tempo of the transition measure 901 decrease from 108 BPM to 100 BPM as the transition measure 901 is played.

The program 20 might accomplish this, for example, by linearly decreasing the tempo in the transition by 2 BPM for each of the four subsequences in the transition measure 901. To accomplish this linear ramping effect, the transition generation unit 26 may time-stretch the transition measure subsequences 902a, 902b, 902c, 902d into final transition measure subsequences 922a, 922b, 922c, 922d, respectively, which in total comprise a final transition measure 921.

As is apparent from the diagram, final transition measure subsequence 922a is shorter as compared to the other final transition measure subsequences 922b, 922c, 922d, implying that it also has the fastest tempo. This makes sense, since it is the first subsequence to play, and hence its tempo will be closest to that of the first song 700. Conversely, we see that the last of the subsequences, subsequence 922d, has the longest length, and hence it has a tempo closest to that of the second song 600.

It should be understood that in other embodiments, the program 20 might choose any arbitrary speed profile in generating the final transition measure 921. For example, the program 20 might speed up the transition rapidly at first and then slow down, or vice-versa. The program 20 also might alter the tempo such that it increases or decreases speed across any single subsequence. Alternatively, the program 20 might not use any ramp at all, in effect playing the transition measure 901 just as it is.

Moreover, it should be noted that the length of the final transition measure 921 need not depend on the tempo of the first song 700, the tempo of the second song 600, the length of the first measure 701, or the length of the second measure 601. Indeed, the length of the final transition measure 921, and the length of any of the final transition measure subsequences 922a, 922b, 922c, 922d, might be any arbitrary length. These lengths may depend, for example, on a particular effect that a user wants, or a particular transition mode that a user has selected. For example, if a user wants a transition between the first song 700 and 600 to sound very slow, without any kind of ramping effect, the program 20 could elongate (e.g., using time-stretching) both the first measure 701 and second measure 601 by whatever desired amount, which still ensuring that the subsequences within the measures 701, 601 are aligned as before (so the transition still sounds beat-aligned).

It should also be noted that the present embodiment does not require any time-stretching (or any other operation of adding/removing frames) to be done in any particular order. For example, while the present embodiment described measure 701 in the first song 700 as being time-stretched first (FIG. 4A), then combined with measure 601 of the second song 600 (FIG. 4C) and then time-stretched again to generate a linear ramp (FIG. 4D), this order may be altered.

To illustrate, both measure 701 and measure 601 of the second song 601 may be time-stretched such that subsequences 702a, 702b, 702c, 702d and subsequences 602a, 602b, 602c, 602d have the same length as final measure subsequences 922a, 922b, 922c, 922d, respectively. Then the time-stretched subsequences for the first song 700 and the second song 600 may be combined to generate the same final transition measure 901 as before. Other ways of generating a beat-aligned transition involving the first song 700 and the second song 600 may also be used.

Figure 4E:
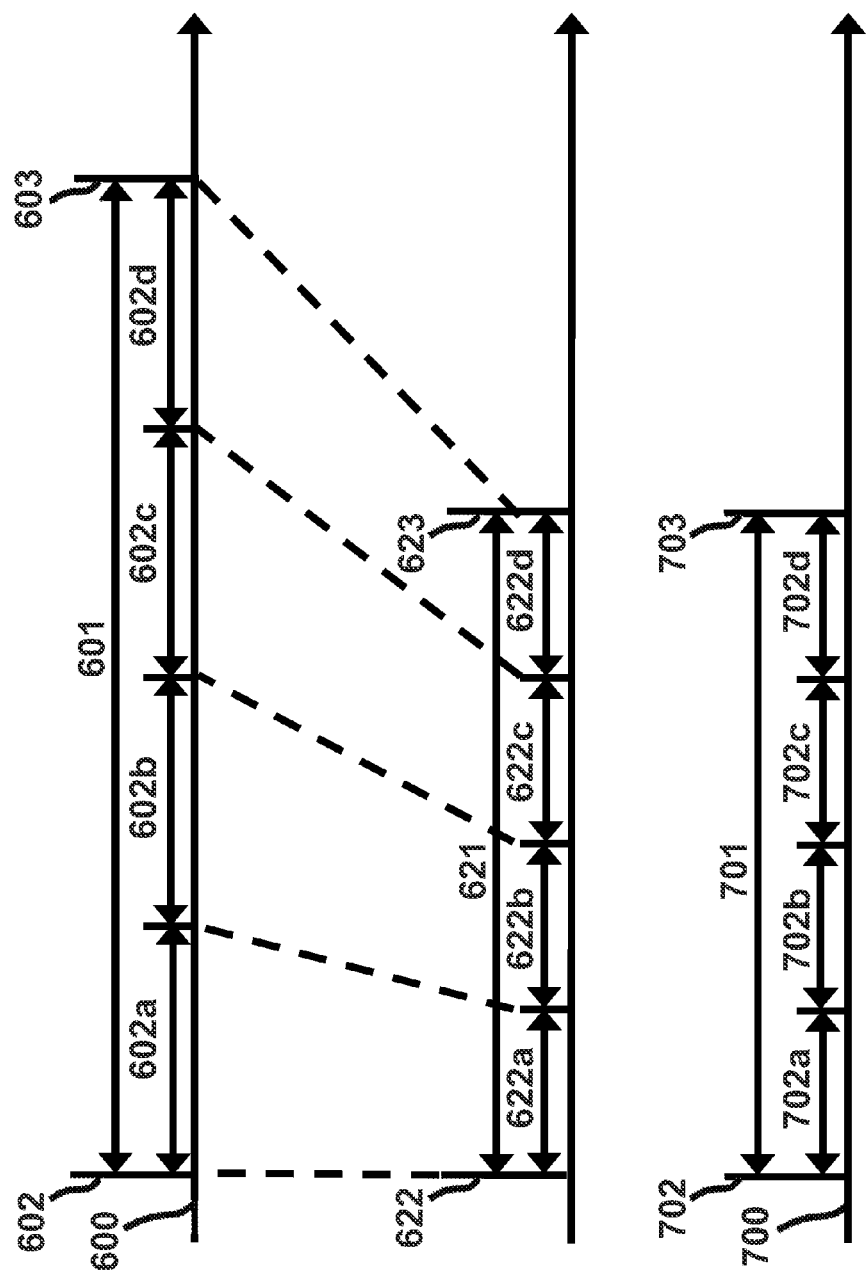

Turning to FIG. 4E, we see the mirror image of what we saw in FIG. 4A—instead of time-stretching the first song 700 such that its measure 701 is transformed into a measure 721 that substantially matches measure 601 of the second song, we take the second song 600 and time-stretch it such that its measure 601 is transformed into a measure 621 that substantially matches measure 701 of the first song. In essence, the currently playing song may be the second song 600 in this embodiment, and the next song may be the first song 700. And since the measure 601 of the second song 600 is longer than the measure 701 of the first song 700, time-stretching the measure 601 involves shortening the length of the subsequences 602a, 602b, 602c, 602d into time-stretched subsequences 622a, 622b, 622c, 622d, respectively.

Figure 4F:
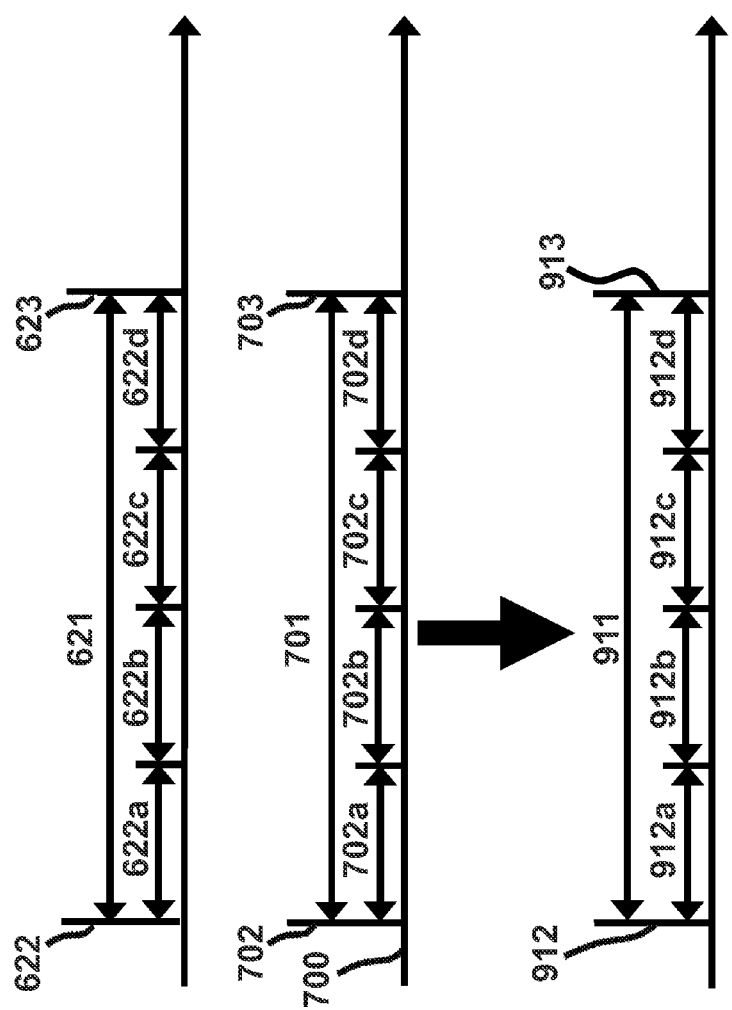

In FIG. 4F, we see how the time-stretched measure 621 of the second song 600 may be added to the first measure 701 to generate a transition measure 911. And in FIG. 4G, we see how the transition measure 911 may be time-stretched to generate a final transition measure 931. This last time-stretch operation, as before, generates a linear tempo ramp between the second song 600 (which is now the currently playing song) and the first song 700 (which is now the next song to which the program 20 is transitioning).

Figure 4G:
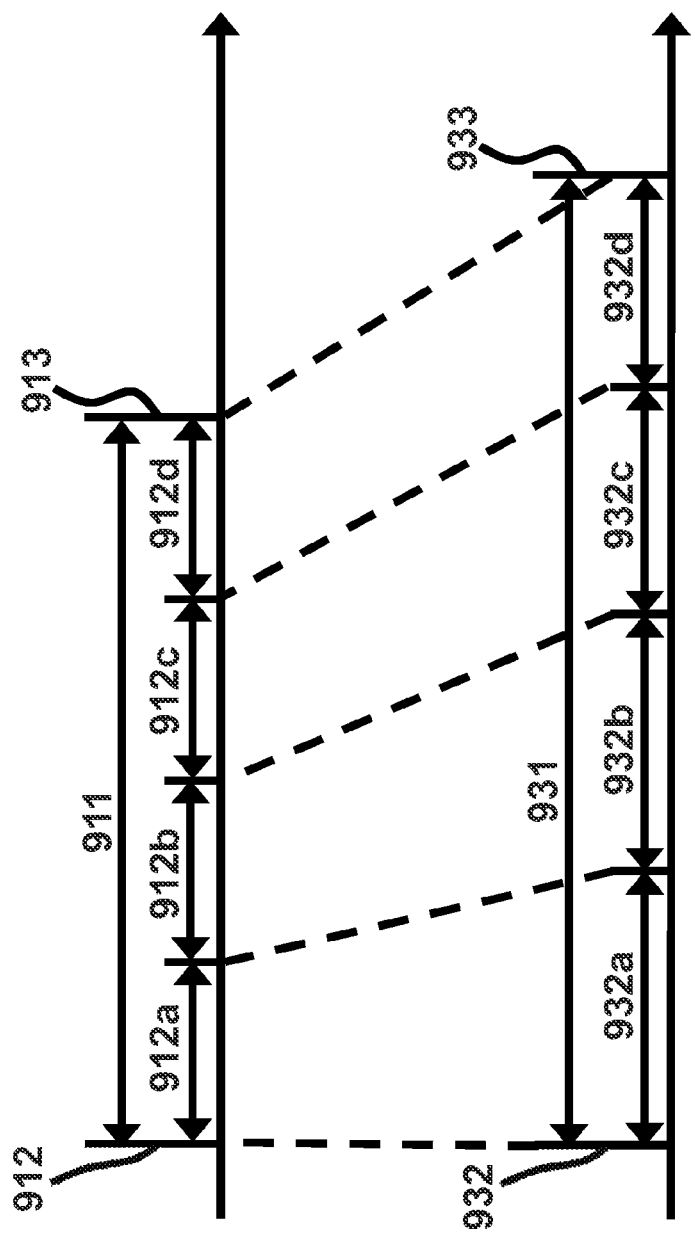

It should be understood that all of the previous statements and supplementary explanation made in relation to the embodiment depicted in FIGS. 4A-4D also applies to this embodiment depicted in FIGS. 4E-4G.

FIG. 5A-5G

Further Exemplary Embodiments for Generating a Transition

FIGS. 5A-5G show another exemplary embodiment in which a transition might be generated, this time at the level of measure groupings. A measure grouping 730 of a first song 700 is shown. This measure grouping 730 comprises six measures—measure 701 (which we encountered in connection with FIGS. 4A-4G above) and measures 730b, 730c, 730*d*, 730*e*, 730*f*. As noted in the diagram, the measures are not all the same length—for example, measure 730*d* has fewer frames than measure 701. This illustrates how the present embodiment may work when measure groupings have measures of different sizes. Other embodiments can involve measure groupings having measures of a uniform size.

In the present embodiment, the program 20 seeks to mix the measure grouping 730 with a measure grouping 1430 for a second song 1400. The measure grouping 1430 has eight measures in it—1430*a*, 1430*b*, 1430*c*, 1430*d*, 1430*e*, 1430*f*, 1430*g*, 1430*h*. So measure grouping 730 and measure grouping 1430 have different numbers of measures in them. In other embodiments, the measure groupings for the two songs being mixed may have the same number of measures in them.

In FIG. 5A, we see that the measure grouping 730 can be time-stretched (or alternatively, arbitrary frames may be removed from the measure grouping 730) such that it becomes time-stretched measure grouping 780. Time-stretched measure grouping 780 matches up with the first six measures in the measure grouping 1430 (i.e., comprising measures 1430*a*, 1430*b*, 1430*c*, 1430*d*, 1430*e*, 1430*f*). So time-stretched measures 780*a*, 780*b*, 780*c*, 780*d*, 780*e*, 780*f*, have substantially the same number of frames as corresponding measures 1430*a*, 1430*b*, 1430*c*, 1430*d*, 1430*e*, 1430*f*, respectively.

It should be understood that in alternate embodiments, the time-stretched measures for the first song might be matched up against different measures in the measure grouping 1430. For example, the time-stretched measures for the first song might have been matched up against the last six measures of the measure grouping 1430 instead (i.e., 1430*c*, 1430*d*, 1430*e*, 1430*f*, 1430*g*, 1430*h*). More generally, it should be understood that any subset of measures in a measure grouping for a first song (e.g., a song that is currently playing) may be matched with any subset of measures in a measure grouping for a second song (e.g., a song that is to be playing next).

Figure 5B:
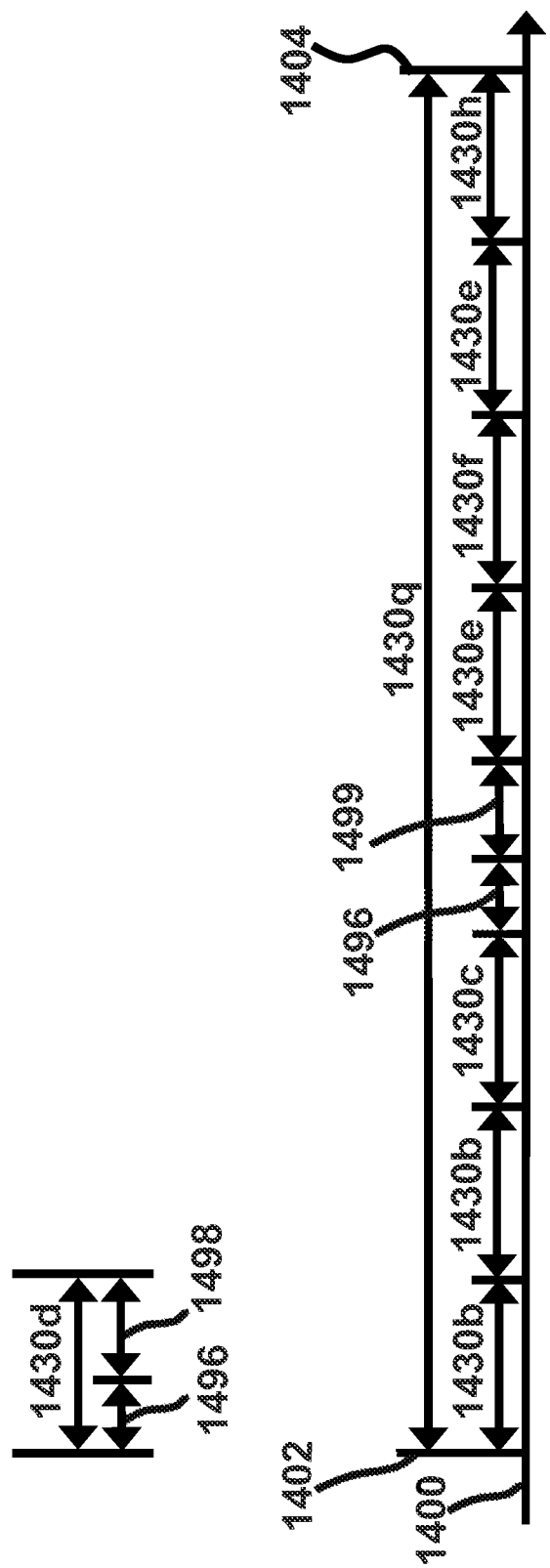

In FIG. 5B, we see measure grouping 1430*q*, an alternate embodiment of the measure grouping 1430 as shown in FIG. 5A. The boundaries of both measure grouping 1430 and measure grouping 1430*q* are defined by cuepoints 1402 and 1404, which might be part of the cuepoints 40 that are in the transition data 24. However, some of the measures within measure grouping 1430 have been changed, replaced, or looped by the program 20 to create measure grouping 1430*q*.

For example, comparing measure grouping 1430 and measure grouping 1430*q*, we see that measure 1430*a* has been replaced by measure 1430*b*. This will cause measure 1430*a* to play twice in a row in a "loop." Additionally, measure 1430*g* has been replaced by measure 1430*e* in measure grouping 1430*q*, which will cause this measure 1430*e* to play twice in a non-consecutive fashion.

We further see that measure 1430*d* from the measure grouping 1430 is actually comprised of two parts, segment 1496 and segment 1498. In measure grouping 1430*q*, segment 1498 has been replaced by segment 1499, a set of external frames that might have come from some external source, similar to subsequence 777 discussed earlier. Segments 1496 and 1499 have then been placed where measure 1430*d* used to be in measure grouping 1430. This example shows how a measure may be partitioned into smaller frame segments, which might be looped or replaced with external frames.

These examples should illustrate that different embodiments of the program 20 can perform any number of different operations on measure groupings and measures, similar to the operations they could perform on frame sequences and subsequences as discussed in connection with FIG. 4B. For example, the program 20 may change the number of frames (which may involve time-stretching) of any measure, reorder frames within any measure, or change the order of measures. The program 20 might also repeat portions of a measure to generate sub-measure loops, or repeat measures to generate measure loops. Or the program 20 might replace one or more of the frame values in a measure with an external frame value, which might come from the same song as contains the measure or from some other song data 30.

As in the context of sequences and subsequences, it should be understood that this list is not exhaustive, as the program 20 might do other things in other embodiments. For example, the program 20 might prepend (or append) an offset to any given measure.

Moreover, although the operations shown here are being performed on the measure grouping 1430 (in order to generate the measure grouping 1430*q*), it should be understood that these operations may be performed on any type of measure or measure grouping, whether time-stretched or not, or whether performed on a currently playing song or an enqueued song.

Additionally, as in the context of FIGS. 4A-4G, the user interface 28 may permit a user to select between various transition modes that determine how the program 20 operates on measure groupings and measures. For example, each transition mode might specify a different generic mapping between measures or measure groupings in a first song (e.g., a currently playing song, like the first song 700 here) and a second song (e.g., a next song to be played, like the second song 1400 here). The program may then apply the generic mapping to map one or more of the measures in the currently playing song to one or more measures in the song to be played next.

Figure 5C:
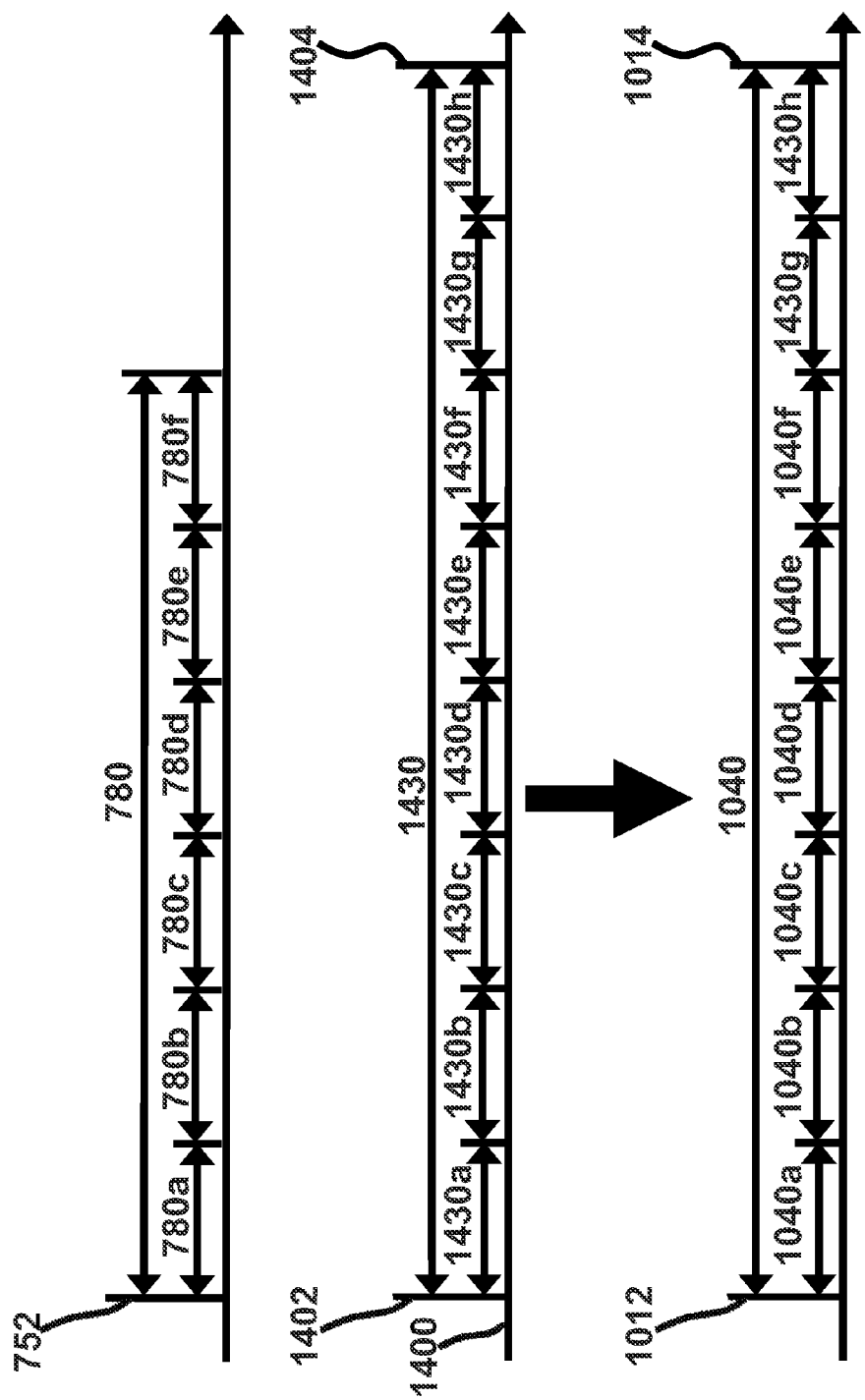

Turning now to FIG. 5C, we see how a transition may be generated from the time-stretched measure grouping 780 and the measure grouping 1430 from the second song 1400. It should be understood that any other pair of measure groupings may instead be used to get a different transition.

In FIG. 5C, we see that frame values from measure groupings 780 and 1430 may be combined to generate a transition measure grouping 1040, with transition measures 1040*a*, 1040*b*, 1040*c*, 1040*d*, 1040*e*, 1040*f*, 1430*g*, 1430*h*. This might be done by the transition generation unit 26 and/or one of its components, such as the combiner unit 37.

In FIG. 5C, the last two measures (1430*g*, 1430*h*) in the transition measure grouping 1040 are the same as in the measure grouping 1430; in this embodiment, that is because the measure grouping 1430 has two more measures than the measure grouping 780. It should be understood that in alternate embodiments, the measure groupings 780, 1430 may be combined in a different way. For example, alternatively, the last measure (780*f*) in measure grouping 780 might be appended twice to measure grouping 780, and the resulting extended measure grouping may be added with measure grouping 1430 to generate a different transition measure grouping.

As in the context of FIGS. 4A-4G, combining frame values of the two measure groupings 780, 1430 may involve merely adding the frame values of one song to another song. These measure groupings are substantially aligned in the present embodiment, as they have substantially the same number of frames in each of their respective measures (e.g., measures 780*a*, 780*b*, 780*c*, 780*d*, 780*e*, 780*f* have the substantially the same number of frames as measures 1430*a*, 1430*b*, 1430*c*, 1430*d*, 1430*e*, 1430*f*, respectively). So the program 20 may form the transition measure grouping 1040 by simply adding frame values for corresponding frames in the two measure groupings 780, 1430, as depicted in FIG. 5C.

As before, the measure groupings need not be perfectly aligned to be combined in this manner. Whether the measure groupings are substantially aligned might depend on a number of factors, such as the sensitivity of the audience to misaligned beats or frames (see previous discussion in connection with FIG. 4C). Additionally, as before, combining the two measure groupings 780, 1430 may involve using any number of filters, effects, overlays, or any other processing. The transition generation unit 26 may also shift the pitch of the transition measure grouping 1040 based on the musical keys of the songs at issue.

Figure 5D:
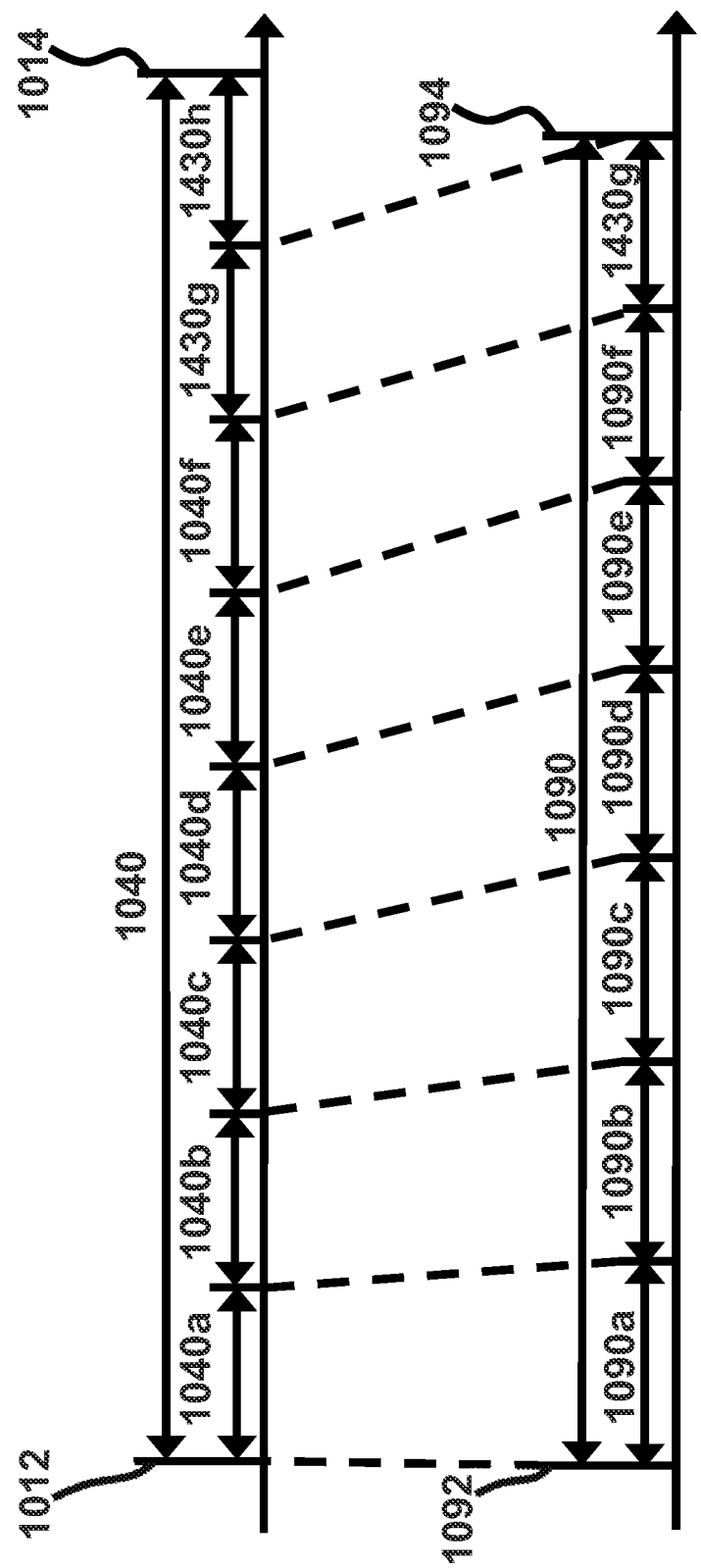

Now looking at FIG. 5D, we see how the transition generation unit 26 might alter the tempo of a transition (here, transition measure grouping 1040) to generate a smooth change in tempo from the first song 700 to the second song 1400. This results in a final transition measure grouping 1090. Similar to FIG. 4D, the unit 26 here uses a linear ramp to smooth out the tempo change across the transition measure grouping 1040 from the first song 700, which is somewhat slower than the second song 1400. Again, the program 20 may alternatively choose any arbitrary speed profile in generating the final transition measure grouping 1090. Alternatively, in some embodiments, the length of the final transition measure grouping 1090 might not depend on any characteristics of the first song 700 or the second song 1400 (see discussion related to FIG. 4D).

Also similar to the previous discussion in connection with FIGS. 4A-4G, the present embodiment does not require any time-stretching (or any other operation of adding/removing frames) to be done in any order. For example, in an alternative embodiment, both measure grouping 730 and measure grouping 1430 may be time-stretched first and then combined to generate the same final transition measure grouping 1090.

Figure 5E:
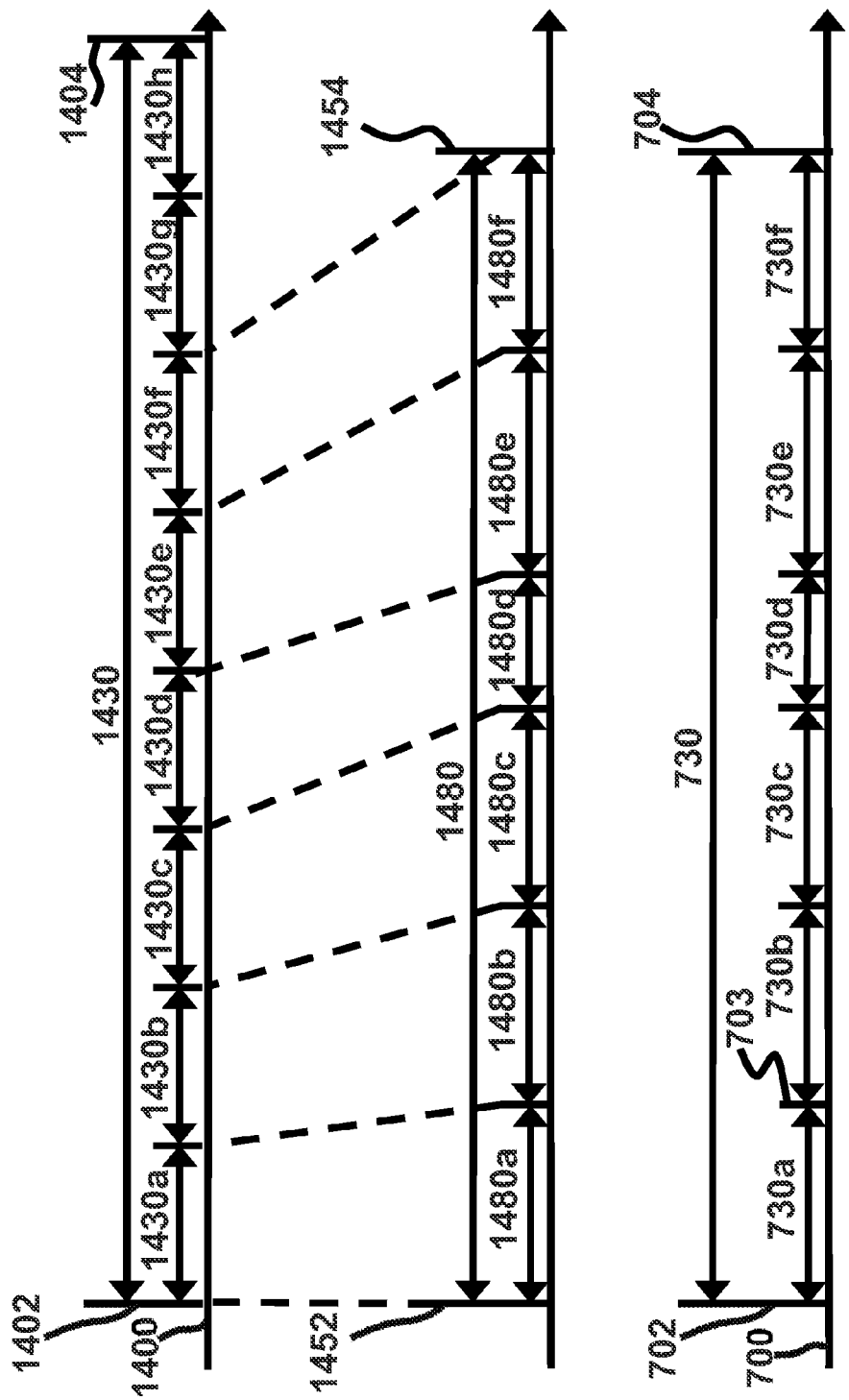
Figure 5F:
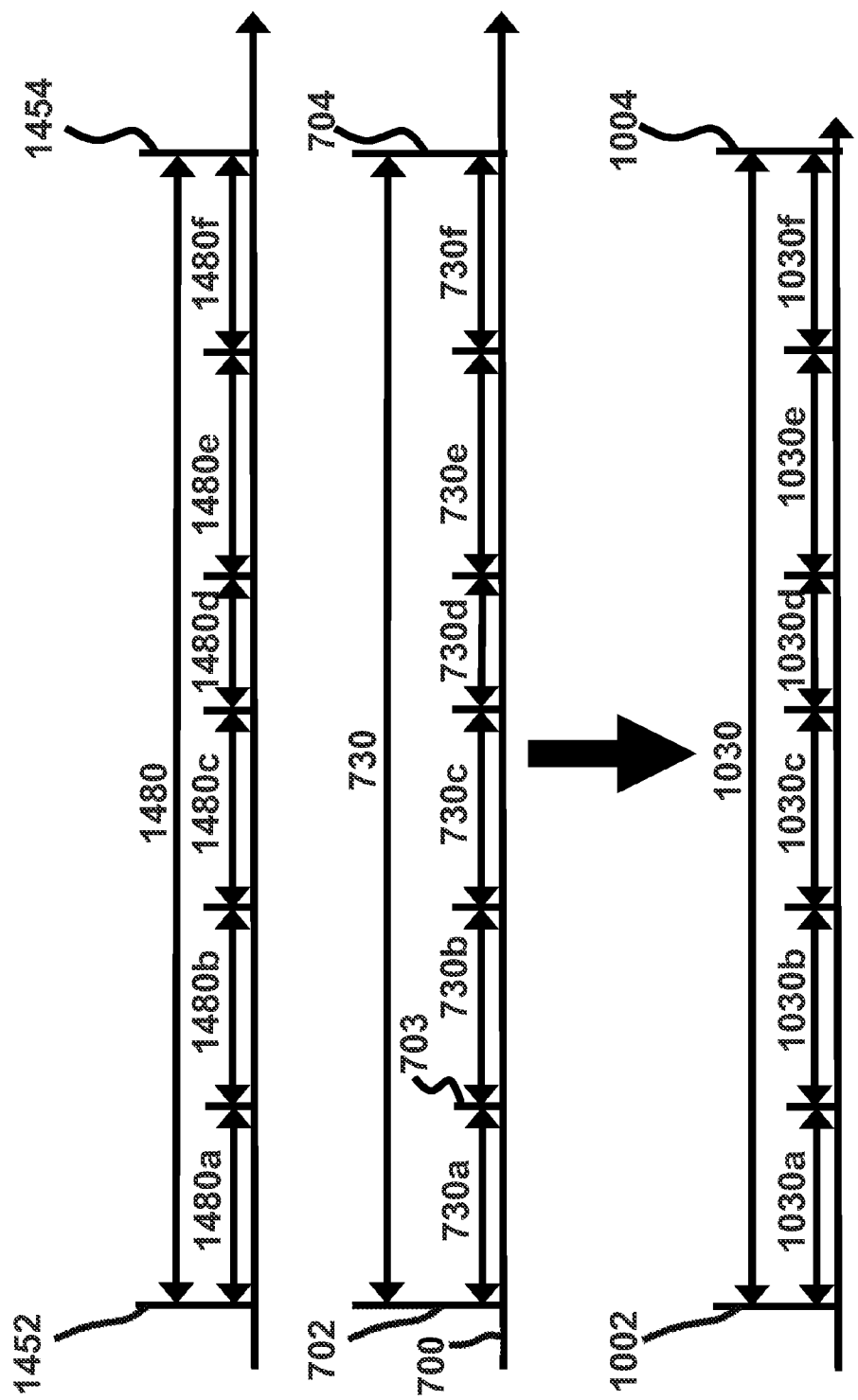

Turning to FIG. 5E, we see what happens when we switch songs—we instead time-stretch the measure grouping 1430 for the second song 1400 to match it to the measure grouping 730 for the first song 700. In FIG. 5F, we see how the time-stretched measure grouping 1480 of the second song 1400 may be added to the measure grouping 730 to generate a transition measure grouping 1030. And in FIG. 5G, we see how the transition measure grouping 1030 may be time-stretched to generate a final transition measure grouping 1080. This last time-stretch operation, as before, generates a linear tempo ramp between the second song 1400 (which is now the currently playing song) and the first song 700 (which is now the next song to which the program 20 is transitioning).

Figure 5G:
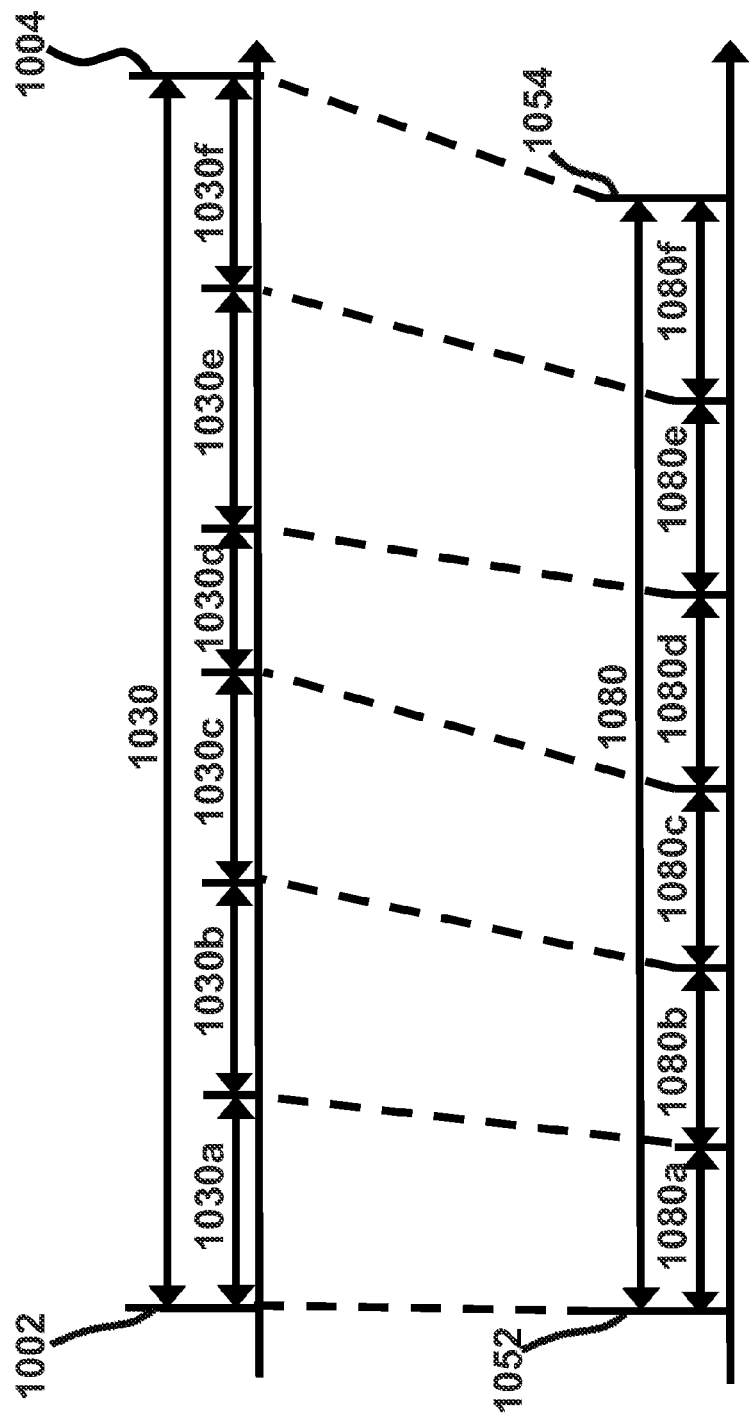

It should be understood that all of the previous statements and supplementary explanation made in relation to the embodiments encompassed by FIGS. 5A-5D also applies to the embodiments encompassed by FIGS. 5E-5G.

Figure 6A:
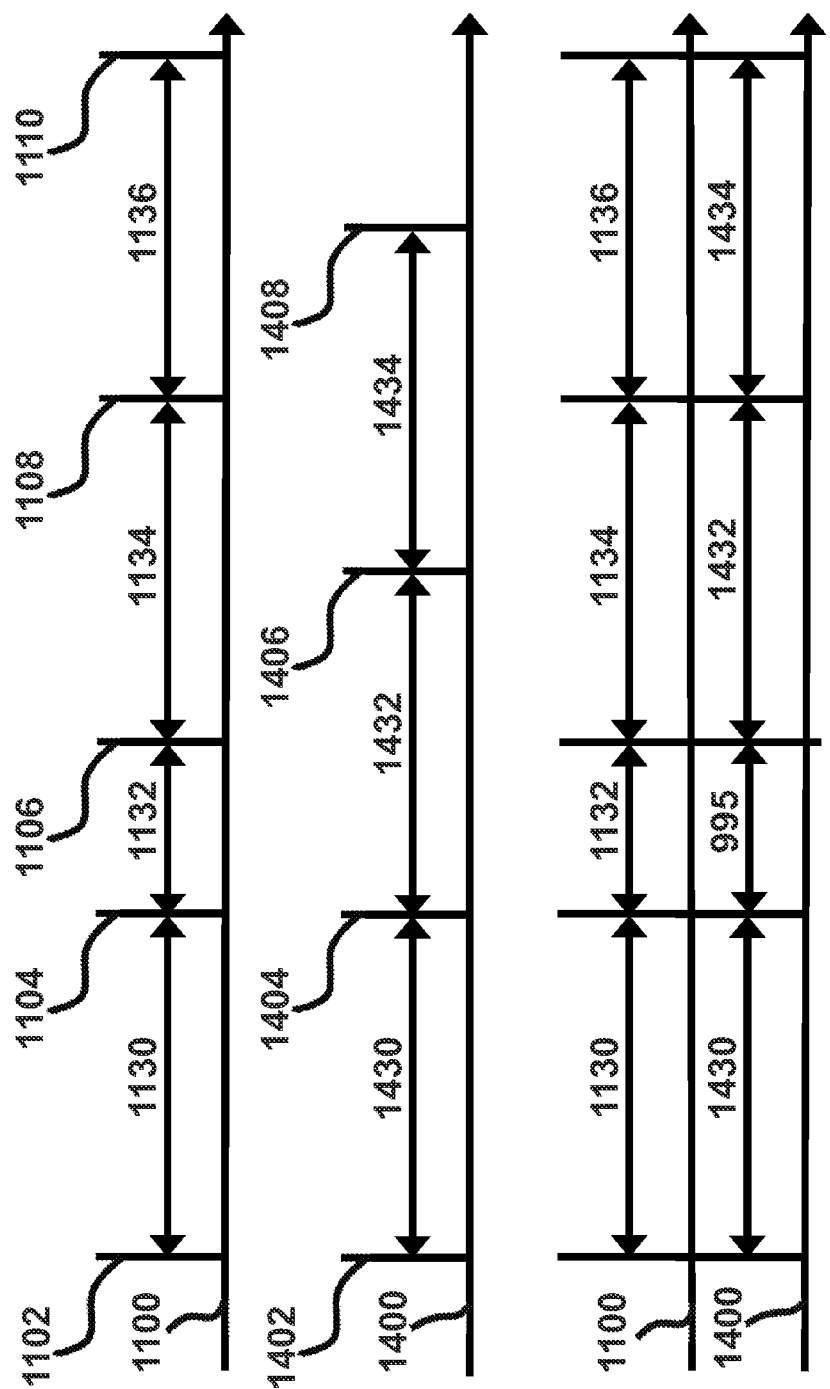

Before turning to FIG. 6A, some other exemplary variants of the present embodiments should be noted. In one such embodiment, the system described here could be used to put together song fragments in a variety of ways. For example, the song data 30 might comprise portions of songs (e.g., measure groupings, measures, frames between beats). These portions might comprise, for example, portions of songs created by disc jockeys, who take songs and mix them with certain beats in order to create "remix" versions of those songs. The program 20 might take these song portions and allow individuals to combine them in a beat-matched fashion, through the generation of transitions (e.g., transition 50) based on these song portions. The resulting product might recreate some of these disc jockey mixes, or it might allow users to generate new mixes from these song portions.

Moreover, in alternate embodiments, the program 20 might generate transitions not just with song data 30, but also with data related to other media, such as videos or lights. For example, the program 20 might take video that is already synced to an existing audio track (like a music video). After generating a map of beats for the song, which might be done via an automated program, the program 20 might take the audio/video track and mix it with another audio track in a manner similar to that described above.

More generally, the present embodiment might map a media track (e.g., video, lights) and an audio track (e.g., song data) when both have cuepoints associated and beats associated with them. The media track and audio track may then be mixed based on these cuepoints and beats.

Alternatively, the program 20 might output a signal based on the beats of the songs and transitions it is playing. Such beats might allow the program 20 to synchronize with a separate beat-aware player (such as a computer running a different version of the program 20) or to a graphical display or lighting system or any other human interface system that might use a sequence of pulse data to trigger an action. For example, the program 20 might output the beats to a lighting system that might flash whenever a beat occurs. Or the program 20 might output the beats to graphical display or projection unit, such as a slide projector, a movie projector, a computer attached to a liquid crystal display screen, and the like. This graphical display or projection unit may show pictures (e.g., flash pictures, or switch between pictures in a slideshow) at the same rate as the beats outputted by the program 20.

FIG. 6A-6B

Exemplary Embodiments Using Multiple Measure Groupings

Turning now to FIG. 6A, we see an exemplary embodiment showing how multiple measure groupings in different songs might be combined. FIG. 6A shows a first song 1100 with measure groupings 1130, 1132, 1134, 1136. The boundaries of the groupings 1130-1136 are defined by first song cuepoints 1102, 1104, 1106, 1108, 1110. We also see a second song 1400 (which might be the same as the second song 1400 discussed previously in connection with FIGS. 5A-5G) with measure groupings 1430, 1432, 1434, whose boundaries are defined by second song cuepoints 1402, 1404, 1406, 1408.

In FIG. 6A, we see that first song cuepoint 1102 is aligned (or at least substantially aligned—see previous discussion on this point in connection with FIGS. 4A-4G and FIGS. 5A-5G) with second song cuepoint 1402, and first song cuepoint 1104 is aligned with second song cuepoint 1404. The first song cuepoints 1102, 1104 define the measure grouping 1130, and the second song cuepoints 1402, 1404 define the measure grouping 1430. These two measure groupings 1130, 1430 are also aligned.

This alignment in measure groupings 1130, 1430 could have possibly occurred naturally (e.g., without any action by the program 20), but more likely resulted from time-stretching operations on one or both of the songs 1100, 1400. Either way, given this alignment, these two measure groupings 1130, 1430 may be combined, for example, in a manner similar to that specified in connection with FIGS. 5A-5G.

The remaining measure groupings in the songs are not aligned. However, the program 20 might perform one or more operations to make them aligned. For example, as shown at the bottom of FIG. 6A, the program 20 might insert an external measure grouping 995 to the second song 1400 after the measure grouping 1430. External measure grouping 995 may be any set of measures (or portion of measures) from either the second song 1400 or from any other form of song data 30. External measure grouping 995 is chosen such that is substantially the same length as measure grouping 1132. The external measure grouping 995 might also be chosen such that it sounds good when combined with measure grouping 1132 (see discussion in connection with FIGS. 4A-4G to see how this might be done).

By adding the external measure grouping 995 to the second song 1400, the measure groupings 1432, 1434 in the second song 1400 now align with the measure groupings 1134, 1136 in the first song 1100. As such, these measure groupings may now be combined, for example, in the fashion specified in FIGS. 5A-5G. Thus a mashup or combination of multiple measure groupings in the first song 1100 with the second song 1400 is now possible.

Turning to FIG. 6B, we see another exemplary embodiment where multiple measure groupings in different songs may be combined. First song 1200 has measure groupings 1230, 1232, 1234, 1236. Measure grouping 1232 repeats itself once in the song 1200, after measure grouping 1234. The measure groupings 1230-1236 are separated by first song cuepoints 1202, 1204, 1206, 1208, 1210. As in the previous embodiment, the second song to be mixed is song 1400, with the same second song cuepoints and measure groupings as specified in connection with FIG. 6A.

At the bottom of FIG. 6B, we see how the program 20 might combine the two songs 1200, 1400 across multiple measure groupings. Here, the program 20 might append an external measure grouping 997 after measure grouping 1434. This external measure grouping 997 might comprise any set of frames—for example, it might be part of measure grouping 1430, some other part of the second song 1400, or some other piece of song data 30 altogether.

Regardless, by adding the external measure grouping 997, it becomes possible to combine the first song 1200 and the second song 1400 across multiple measure groupings. In particular, three measure groupings 1230, 1232, 1234 in the first song 1200 may be combined with two measure groupings 1430, 1432, and two other measure groupings 1232, 1236 (at the end of the first song 1200 as shown in FIG. 6B) may be combined with measure groupings 1434 and 997 in the second song 1400.

While the present embodiments show how multiple measure groupings may be combined in two songs, it should be understood that by mapping cuepoints and measure groupings, it becomes possible to combine any number of songs in any number of ways. For example, after the first song 1200 and the second song 1400 have been combined in the manner specified in FIG. 6B, another song (say first song 1100 in FIG. 6A) may also be combined with the songs 1200, 1400. This other song may be any kind of song data 30, such as a standard musical composition, a "beat" track, a musical fragment, a drum-and-bass rhythm, or any other audio fragment, wherein time-shifted, pitch-shifted, or not.

This process may be iterated any number of times as desired by the user, who may select his preferences via the user interface 28. Additionally, as discussed previously in connection with FIG. 3A-3D, user feedback and/or preferences may be used to optimize combinations of multiple measure groupings in songs that might sound good when played together. Moreover, any of the actions that the program 10 was able to take at the measure or measure grouping level (e.g., replacing frames, looping segments, moving sub-sequences, repeating measures, etc.) may be performed on any portion of the measure groupings 1230, 1430 that are combined.

FIGS. 7A-7B

Exemplary User Interface

Now turning to FIGS. 7A-7B, we see an exemplary user interface 28. The user interface 28 is split among these two diagrams. The top half, which includes many of the user controls and display, is shown on FIG. 7A. The bottom half, which shows a playlist 1348 of upcoming songs, is shown in FIG. 7B. It should be understood that the interface 28 shown here is merely exemplary, and as stated earlier many other types of interfaces in any number of different layouts may be used. For example, while "buttons" are used for many components of the exemplary interface 28, any number of other input mechanisms might be used. For instance, the playlist 1348 may be an interface by itself and accept input if, for example, it is a touchscreen-type of interface. Moreover, certain components that are pictured separately may instead be incorporated within one another or deleted, and other components not pictured here may instead be included.

The user interface 28 shown here has a current song listing 1318 that identifies the title and artist of the currently playing song. There is also a graphical section 1334 showing a waveform 1332 and cover art 1336 for the song, and a progress meter 1330 showing how much of the song has been played.

The progress meter 1330 may have a scrubber 1331 that a user may adjust to move around to different portions of the song. In an exemplary embodiment, if the user drops the scrubber 1331 at a point in the song, the song may immediately start playback at that point. Alternatively, dropping the scrubber 1331 may cause the program 20 to initiate a beat-matched transition from the current portion of the song that is playing to a portion at or near where the scrubber 1331 was dropped. In other words, instead of having an abrupt discontinuity in playback when the scrubber 1331 is moved, the player 22 may maintain a beat-matched sound by mixing the currently playing song with itself at or near the point where the scrubber 1331 is set to resume playback.

If the currently playing song has a constant or nearly constant beats-per-minute count, then beat-matching where the scrubber 1331 drops may take minimal computational effort, since no time-stretching or adding/removing frames would be used to generate the transition. In yet another embodiment, dropping the scrubber 1331 at another point in the song may cause it to jump to the nearest beat, cuepoint or measure startpoint and begin playback there once the playhead reaches the next beat, cuepoint, or measure startpoint in the currently playing section of the song.

Returning to the user interface 28, the exemplary embodiment here also has various control buttons, including a play button 1302 that triggers playback of a currently loaded song. Pressing the play button 1302 while a song is currently playing may cause the song to pause playing, to fade out, or to stop immediately, depending on the specific implementation used. Alternatively, other embodiments may include a separate pause and/or stop button.

The interface 28 also has a volume control button 1310, which might be used to raise or lower the volume. Alternatively, the interface 28 may have a slider (not shown) to accomplish this functionality.

Additionally, the interface 28 has an advance button 1304, which might trigger an advance signal, such as the advance signal 318 shown in FIGS. 3A-3D. An advance signal might trigger the program 20 to initiate a transition to a next song 1390, which might be specified in the playlist 1348. Alternatively, an advance signal may be triggered by clicking on or otherwise selecting the next song 1390 in the playlist 1348. A transition initiated by an advance signal may be a beat-matched, measure-aware transition, generated in a manner similar to the embodiments discussed in connection with FIGS. 4A-4G, 5A-5G, and/or 6A-6B.

If the advance button 1304 is pressed twice in a row, it might indicate that a user wishes to skip directly to the next song 1390 without a transition. In such a case, the transition might be skipped and the next song 1390 will be directly played. Alternatively, the next song 1390 may be faded into the current song, or the interface 28 may have a separate button to initiate this kind of skip functionality. This kind of fast advance may also be triggered by pressing the advance button 1304 during playback of a transition.

The interface 28 also has a loop button 1308, which might be a button that stays depressed until it is pressed again (the button 1308 might change graphically to indicate that it is depressed). Depending on user preferences and on the mode in which the player 22 is set, pressing the loop button 1308 might cause the player 22 to loop a currently playing song, measure grouping, measure, or sequence or subsequence of frames. Alternatively, a loop might not be initiated until the playhead reaches the next loopable section of the currently playing song.

If the loop button 1308 is undepressed (e.g., it is selected again after it has been depressed), the program 20 may then transition out of the repetitive beat and back into the current song. The playback experience might thus resemble entering a repetitive loop after the button 1308 is depressed and then resuming playback after it is undepressed. Such a mode may enable a user to play a current song for longer than its runtime, giving her more time to decide on what she wants to hear next.

Other buttons on the user interface 28 might include a positive ratings buttons 1312 and a negative ratings button 1314. Based on which button 1312, 1314 (if any) is pressed, the program 20 may be able to discern whether a user liked a particular song or transition to a song. This information may be sent to the server 32 over the network 29 using messages 27. As described earlier, this information may be used to tailor the player 22 to a particular user's preferences. It might also be used to aggregate information on user preferences and determine player 22 and/or program 20 settings for other users.

The exemplary interface 28 may also have various customizable buttons 1320-1326. These might be programmed by the user or take certain preset values that may be altered. The buttons 1320-1326 shown here are merely exemplary, and it should be understood that their nature might vary widely.

For example, in the present embodiment, button 1320 is listed as a "Flashback" button. Pressing this button might cause the player 22 to auto-populate the playlist with songs from a particular past era that the user enjoys. For example, if the user enjoys 1980s music, he could program the Flashback button 1320 such that pressing it loads 1980s music into his playlist. What songs are loaded, and in what order, might be determined by the program 20, which might account for song characteristics in order to choose a playlist that sounds best when songs transition from one to another.

This same concept may be applied to particular artists ("Lady Gaga" button 1322 will put Lady Gaga songs in the playlist), genres ("House" button 1324 will put various house music in the playlist), albums, or any arbitrary favorite selection. A customizable button might also load in pre-specified playlists that are generated by the user, someone else (e.g., an expert music listener) or the program 20 itself. For example, the "Party Mix" button 1326 might load various party music that the user has selected into the playlist.

Another part of the interface 28 may be a variable display 1340, which changes depending on which of a set of tabs 1338, 1342, 1344 has been selected. In the exemplary embodiment shown in FIG. 7A, the display 1340 shows a list of songs (with artist/song name displayed) that have previously played on the system. An alternative embodiment might, for example, show additional information about the songs, such as time of the song, genre, and the type of transition used to enter or exit the song.

User interface 28 also includes a preview tab 1342. In some embodiments, such a tab might play preview clips of songs that are in the playlist, or other songs to which a user may want to listen (if, for example, one of the customizable buttons 1320-1326 is depressed). Preview clips might be particularly useful to sample music that the user does not yet own and is considering purchasing. Transitions to these preview clips may be a beat-matched, measure-aware transition in an exemplary embodiment.

The preview clips might also be based on songs in the playlist; selecting the preview tab 1342 may thus cause the player to only play small portion of the next song 1390 and subsequence songs in the playlist, to help the user determine whether they are worth playing for longer. If a user decides to stay on a particular song, she may click the preview tab 1342 or some other pre-specified button again to stay on the song that is playing.

In an alternative embodiment, selecting the preview tab 1342 may cause the player 22 to preview part of the next song 1390 while the current song is still playing. Many users may find this useful, as it would enable them to see what the next song 1390 sounds like without having to stop playback of the currently playing song. Indeed, this might be particularly useful for systems that have only one audio output (and so previewing the next song 1390 without playing it would be difficult). So by playing the next song 1390 on top of the current song, the user may preview what the song sounds like. This might also be useful for testing an audience's reaction to the preview portion of the next song 1390, which might be useful in determining whether the entire next song 1390 should be played.

The exemplary embodiment also includes a radio tab 1344. Selecting this tab 1344 may allow the user to select a radio station, which may, for example, be an Internet radio station. A variety of such stations might be available; their names or a description of them might be shown in the display 1340 when the tab is selected, allowing the user to select one. When a radio station is selected, the program 20 may initiate a beat-matched transition from the currently playing song (which may be from the user's personal collection and pulled from his playlist) to whatever song happens to be playing on the radio station that was selected. If, for example, a song in the playlist is selected again, the program 20 may initiate another beat-matched transition back to that song from whatever song was playing in Internet radio.

In this sense, the present embodiment might allow a user to seamlessly switch between an Internet radio station and a song in a playlist. Such a playlist song may be any kind of song data 30.

Additionally, during Internet radio playback, advertisers may be able to intersperse commercial audio advertisements that are beat-matched and are mixed with other song data 30 being broadcast on the radio. Such a mode of advertising might be less disruptive to the radio experience, while still allowing advertisers to get their message across to listeners.

Other tabs not shown in the present embodiment are also possible. For example, the interface 28 might have a playlists tab. Selecting this tab may cause a list of playlists to appear that the user might select. As mentioned previously, these playlists may be automatically generated by the program 20 and/or server 32, or they may be generated by the user or another individual. The interface 28 might also have an "About" tab, which provides information on the player 22 and/or program 20, and a "Transitions" tab, which describes the various transition mappings available between songs.

Turning to FIG. 7B, we see the exemplary playlist 1348. Songs in this playlist 1348 may be added, removed, reordered, or changed. Changing a song may present another interface (not shown), where a song may be selected from a list that may include a search interface that filters or adds selections to the list.

In this playlist 1348 (which may look very different in other embodiments), we see that for each entry, there is a listing of the song name 1360, artist name 1370, and running time 1380 of the song.

We also see there are transition types 1350 listed for each song. In the present embodiments, these types 1350 describe the kind of transition that would be used when introducing the song. For example, for the next song 1390, we see that the song will be introduced using a "Type B" style transition. The second queued song 1392, on the other hand, is being introduced by a "Type A" style transition.

These different transition types might be, for example, some specific mapping at a frame, subsequence, frame sequence, measure, measure grouping, and/or multiple measure groupings level. Many examples of such possible mappings were discussed previously in connection with FIGS. 4A-4G, 5A-5G and 6A-6B.

It should be understood that any part of the user interface 28 may be laid out in other embodiments in a way different from the way shown in FIGS. 7A-7B. For example, alternate embodiments may have additional or less functionality that the user interface 28 shown here. To illustrate, in alternate embodiments, the user interface 28 may have a slide control that affects or adjusts the quality of the current song (e.g., equalizer or a volume slider). For example, the slide control may affect the degree of turntable scratch effects present on the transition, the type of transition, or any other parameter related to a transition.

Alternatively, the interface 28 may present an intermediate song interface, which allows the user to select a sequence of songs that will allow a more gradual and subtle between the currently playing song and some target song that the user wants to play. The program 20 may determine such an exemplary playback sequence in various ways (e.g., analysis from previous user sessions, use of volume envelopes, pitch analysis of songs, etc.).

FIG. 8

Exemplary Method for Playing a Transition

Turning now to FIG. 8, we see a flow chart that shows an exemplary method for performing an embodiment. While we discuss the method here with respect to certain embodiments previously discussed, nothing here limits the scope of the method, as it can be practiced in a variety of ways with any of the possible embodiments.

The method begins when a user (or some other person or mechanical process) initiates playback of a song or other audio file (step 800). In this step 800, the player 22 may begin playing song data 30 received from a buffer (such as playback buffer 23) that is filled by the program 20 or some component outside the program (e.g., external player 32 in FIG. 1B).

In step 802, the player 22 continues to play the current song (e.g., the first song 304, as shown in FIG. 3A-3D). As discussed previously, the artist name, song name, or other information about the current song might be visible in the user interface 28 via, for example, the current song listing 1318 (as shown in FIG. 7A)

In step 804, the player 22 determines whether to advance to the next song (e.g., the second song 312) while continuing to play the current song. The decision whether to advance may depend, for example, on whether the program 20 has received a signal to advance (such as the advance signal 318 as shown in FIGS. 3A-3D) from a user, who might have triggered such a signal by pressing a button such as advance button 1304 on the user interface 28. The user may have selected the next song via the user interface 28, and information about the next song may, for example, be visible in the next song listing of the user interface 28 in the next song listing 1390 (as shown in FIG. 7B). Alternatively, depending on a playback mode selected by the user, the program 20 may generate an advance signal on its own (see previous discussion in relation to FIGS. 4A-4G).

If the program 20 decides not to advance, it may proceed to step 806, where the program 20 checks whether the current song is nearing its end. Similar to the decision in step 804, the decision in step 806 might depend on receiving the advance signal 318. The advance signal 318 might be generated by the program 20 itself, which tracks what portion of the first song 304 is playing. For example, the program 20 might track a playhead frame number, which might be a frame number associated with a frame of the song that is currently playing. If the playhead frame number gets close to a frame number associated with the end of the song, the program 20 might decide to advance to the next song. This might cause the program 20 or a component within the program 20 to trigger the advance signal 318, which in turn triggers the advance. It should be understood as before that "advance signal" should be construed broadly—a signal in this context might be an actual electrical signal (e.g., a flag that is raised, or variable value that is changed in response to getting near the end of the song) or it might be any other way in which the program 20 becomes aware that the end of the song is approaching.

If the current song is not nearing its end, the program 20 will go back to step 802 and continue playing the current song. The program 20 will then proceed once again to step 804, and this cycle will continue until, for example, the advance signal 318 is received.

If in either step 804 or 806, the answer to the question at issue is in the affirmative (e.g., an advance signal 318 is received), then the program 20 will seek to advance to the next song. In such an instance, the program 20 will proceed to step 808, which checks whether an appropriate transition (such as transitions 50, 50a shown in FIG. 3A-3D) is available for playback.

Whether a transition is available may depend on whether it has been rendered and is ready for playback. This might depend on the playhead location within the current song, the location of the next song at which the program 20 seeks to enter, what transition mode the user might have chosen via the user interface 28, and any number of other factors, such as the processing capacity of the computer system running the program 20, the availability of cuepoints 40 for mixing purposes, and latency over the network 29. For example, in a "smooth transition mode" (which might be, for example, the "Type A"

transition discussed earlier in connection with FIG. 7B), an appropriate transition might be one that smoothly bridges between the current song and the next song.

It should also be noted that a transition does not necessarily have to be "pre-rendered" in order for it to be considered ready. In some embodiments, a transition may be rendered in real-time, right before or at playback time.

Regardless of when or how it is rendered, in the present embodiment, if the program 20 determines that an appropriate transition is not available, then the program 20 will cycle back to step 802 and keep playing the current song. If the program 20 determines that an appropriate transition is ready, the program 20 will then proceed at the appropriate time to step 810, which involves playing the transition. It should be noted that the program 20 may move to this step 810 at any time—depending on the embodiment at issue, the program need not wait until the playhead reaches one of the cuepoints 40 in the currently playing song.

After the program 20 plays the transition in step 810, it will proceed to step 812, which will involve loading a new song into the player 22. This step may involve looking at what song has been specified by the user as the next song 1390 in the user interface 28. Alternatively, the program 20 may adopt certain default rules to govern the choice of the next song. For example, if the user has not specified a next song, or for some reason the next song that the user has specified is not available for playback, the program 20 may choose another song, such as the song that just played (referred to as the current song above) and play that or some portion of that again. Or the program 20 may loop portions of songs to fill time until an appropriate next song has been identified and is ready for playback.

After the next song has been loaded in step 812, the method will go back to step 800, and the player 18 will begin playback of the next song. The method will then proceed again, as the next song will become the currently playing song and the program 20 will identify a new next song to be played (e.g., this might be the second queued song 1392, as shown in FIG. 7B).

Although FIG. 8 shows a specific order of executing steps 800-812, it should be understood that the order of execution may be changed in alternate embodiments, that steps may be combined, and that other steps may be omitted. For example, steps 804 and 806 may be combined into one step—has the advance signal 318 been received (whether it comes from a user pressing the advance button 1304 or if the program 20 generates the signal on its own based on playhead location). In addition, any number of commands, state variables, messages or the like may be added to the logical flow of this method.

FIG. 9

Exemplary Method for Determining Transition Rendering

We now turn to FIG. 9, which shows an exemplary method by which transitions may be rendered by the program 20 or one of its components (e.g., the transition generation unit 26). In step 850, the program 20 begins rendering a transition and in step 852, it continues the process of rendering.

Rendering involves steps previously discussed in this specification, such as time-stretching or changing the number of frames in one or more songs, filtering frames, applying a linear ramp, and so on (see discussion in connection with FIGS. 4A-4G, 5A-5G, 6A-6B). This step will vary depending on the particular transition mode chosen, the type of song data 30 being processed, and a variety of other factors, such as availability of computing power, connectivity to the network 32, etc.

In step 854, the program 20 determines whether the rendering of the transition is complete. If it is not, the program 20 continues rendering by proceeding back to step 852. If rendering is complete, the program 20 proceeds to step 856, where it determines if there are more transitions to render. Whether there are more transitions to render will depend on factors similar to the ones listed above and previous portions of this specification.

If the program 20 determines there are no more transitions to render, then the process moves to step 860 and terminates. Otherwise, if there are more transitions to render, the program 20 proceeds to step 858, where it loads in the one or more new songs that will be rendered by the program 20. The program 20 then returns back to step 850, where it begins rendering the new transition.

As with the previous flow chart in FIG. 8, it should be understood that this is merely a description of one potential rendering process. Many other rendering processes may be possible in other embodiments. For example, steps might be combined (e.g., steps 852, 854 here) and new steps might be added (e.g., determining a ranking among the generated transitions as most to least preferable).

FIG. 10A-10C

Exemplary Embodiments for Cuepoint Generation

Figure 10A:
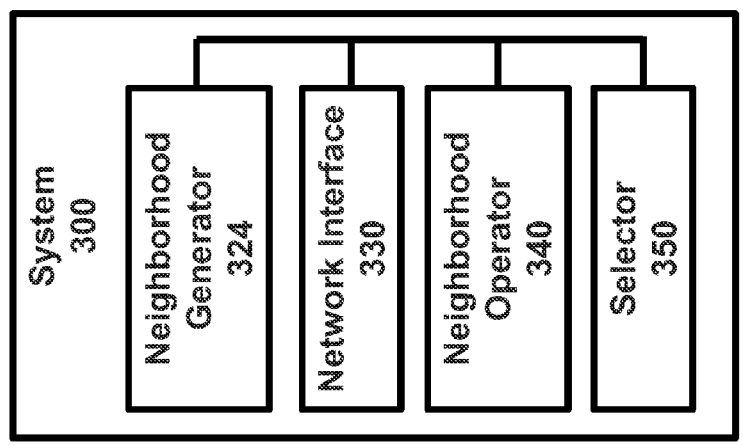
FIG. 10A is a block diagram showing an exemplary embodiment for cuepoint generation.
Figure 10B:
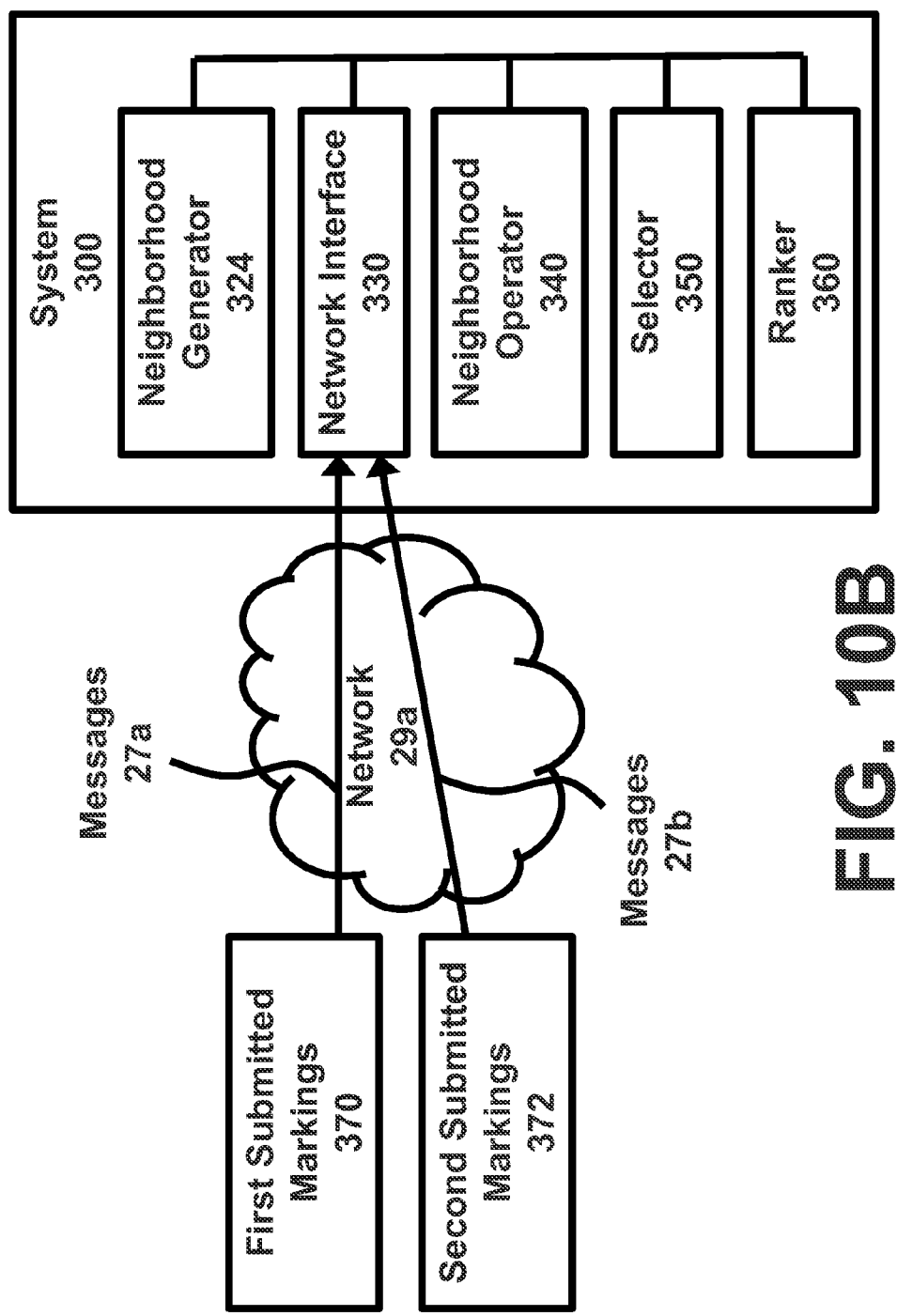
FIGS. 10B-10C are block diagrams showing exemplary embodiments for cuepoint generation using a network.

We now turn to another aspect of the present embodiment, which relates to the generation of cuepoints (such as the cuepoints 40). FIG. 10A shows an exemplary block diagram of a cuepoint generation system 300. The system 300 includes a neighborhood generator 324, a network interface 330, a neighborhood operator 340 and a selector 350. Each of these components might be implemented in software and/or hardware. While each of the components 324-350 in FIG. 10A are shown as separate, it should be understood that any of them may be integrated with one another, or other components might also be part of the cuepoint generation system 300. For example, as shown in FIG. 10B, the system 300 may also include a ranker 360, which ranks one or more of the cuepoints 40 in terms of suitability for mixing. The ranker 360 may alternatively be part of the selector 350. It should also be understood that any of the components 324-360 within the system 300 may be implemented in software and/or hardware.

The neighborhood generator 324 may take one or more reference frames in a song and generate one or more sets of frames (e.g., a neighborhood) based on the one or more reference frames. For example, suppose the generator 324 selects a reference frame with some frame number associated with it (say frame number 14,100). The generator 324 may create a set of frames ranging from a frame with an associated frame number 13,100 up to a frame with an associated frame number 15,100, thereby creating a neighborhood with 2,000 frames that is centered on the frame with frame number 14,100.

It should be understood that the neighborhood generator 324 may generate any arbitrary set or sets of frames. Continuing with the previous example, the generator 324 might instead generate a neighborhood comprising a set of frames between a frame with an associated frame number 14,000 to a frame with an associated frame number 20,000. This illustrates that a neighborhood need not be symmetric around the one or more reference frames that are used when building the neighborhood. Alternatively, the neighborhood generator 324 might generate discontinuous sets—in our previous example, the generated neighborhood might comprise: (1) the frames between a frame with an associated frame number of 13,000 and a frame with an associated frame number of 13,900, and (2) the frames between a frame with an associated frame number of 17,000 and a frame with an associated frame number of 18.000. So in certain embodiments, a neighborhood might not be made up of contiguous sets, and the neighborhood might not contain the reference frame(s) upon which the neighborhood is based.

Turning to the neighborhood operator 340, this unit can take one or more neighborhoods created by the neighborhood generator 324 and perform set operations on them to generate one or more "reconciled neighborhoods". For example, suppose the neighborhood generator 324 creates three neighborhoods—a first neighborhood ranging from a frame with an associated frame number of 50,203 to a frame with an associated frame number of 51,900 ("neighborhood A"), a second neighborhood ranging from a frame with an associated frame number of 51,389 to a frame with an associated frame number of 55,600 ("neighborhood B"), and a third neighborhood ranging from a frame with an associated frame number of 60,000 to a frame with an associated frame number of 62,000 ("neighborhood C").

In one embodiment, the neighborhood operator 340 might take a union of some of these neighborhoods. For example, if the operator 340 took a union of neighborhoods A and B, it would be counting all frames that are in neighborhood A or neighborhood B. This would yield a reconciled neighborhood with associated frame numbers ranging from 50,203 to 55,600. Neighborhood C would remain untouched.

If the neighborhood operator 340 were to take a union of neighborhoods A, B, and C, we would get the same result—a reconciled neighborhood with associated frame numbers ranging from 50,203 to 55,600, and neighborhood C, which has associated frame numbers from 60,000 to 62,000. Neighborhood C remained unchanged in this example because it did not overlap with either neighborhoods A or B.

In other embodiments, the neighborhood operator 340 might take an intersection of these neighborhoods. For example, if the neighborhood operator 340 took an intersection of neighborhoods A and B, it would be counting frames that are in both neighborhood A and neighborhood B. Here, that would yield a reconciled neighborhood with associated frame numbers ranging from 51,389 up to 51,900.

The neighborhood operator 340 might also perform other set operations. For example, the neighborhood operator 340 might take a relative complement of the neighborhoods. Continuing with the above example, the relative complement of neighborhood B in neighborhood A would be the frames that are not in neighborhood B but are in neighborhood A—these would be the frames with associated frame numbers ranging from 50,203 up to 51,389. If instead, the operator 340 took a full complement (often referred to as simply the complement) of neighborhood B, that would be all the frames in the song that are not in neighborhood B.

It should be understood that the neighborhood operator 340 may perform any of these or any other set operations in any sequence. For example, the neighborhood operator 340 may take an intersection of some sets, followed by a union or one of the complement operations.

After the neighborhood operator 340 has generated one or more reconciled neighborhoods, the selector 350 may select one or more frames from those neighborhoods. Frames selected from reconciled neighborhoods may be referred to here as "reconciled cuepoints." Frames selected from other neighborhoods (e.g., neighborhoods that were created by the generator 324 and whose boundaries were not changed by the neighborhood operator 340) might be referred to as "interpolated cuepoints."

We return to the first example above, where the operator 340 took a union and ended up with two neighborhoods: a reconciled neighborhood with frame numbers ranging from 50,203 to 55,600 and neighborhood C, with frame values from 60,000 to 62,000. The operator might select one or more "reconciled cuepoints" from the reconciled neighborhood and one or more "interpolated cuepoints" from neighborhood C.

The selector 350 might select broadly from within the reconciled and/or non-reconciled neighborhoods, choosing many "candidate cuepoints" from within either neighborhood. The ranker 360 (which is shown as a separate element in FIG. 10B but might be part of the selector 350 or any other component in the system 300) might then rank the candidate cuepoints based on a cost function. An exemplary way in which such a process might take place is described in more detail below.

When the selector 350 chooses candidate cuepoints and/or the ranker 360 picks among them, either element may be constrained to choose cuepoints based on beats within the particular neighborhood in which they are selecting. Selecting from among beats may require the selector 350 and/or ranker 360 to nudge candidate cuepoints that are off-beat on to, for example, the nearest beat in the neighborhood in which the components 350, 360 might be selecting. For example, if the reconciled neighborhoods generated by the operator 340 have associated frame values of 50,203 up to 51,389, the selector 350 might choose the frame with associated frame value 51,000 as a reconciled cuepoint if that frame number corresponds to a beat in the song at issue.

Other constraints on candidate cuepoint selection, such as constraining the selector 350 and/or ranker 360 to pick cuepoints from a particular range in the song, or allowing some transformation of the candidate cuepoints within a neighborhood (e.g., average of the cuepoints), are also possible.

Turning to FIG. 10B, we see an exemplary block diagram of how cuepoint generation might work. First submitted markings 370 might be sent to the system 300 and received by the network interface 330 using messages 27a over the network 29a. Second submitted markings 372 might be sent to the system 300 and received by the network interface 330 using messages 27b over the network 29a. The network 29a, network interface 330, and messages 27a, 27b, may take a variety of forms, like the network 29, the network interface 38, and messages 27, respectively, as described previously in connection with FIGS. 2A-2E.

In an exemplary embodiment, a first individual might listen to a song play. This first listener might identify points in the song that separate logical segments of the song. For example, in one embodiment, the first listener listens for beats in a song (e.g., points at which various percussive or melodic elements of a song repeat themselves). Alternatively, an automated system may be used to identify such beats.

The first listener might also listen for measures in a song. A measure is generally a group of beats. In most Western music, there are 4 beats per measure (this is referred to as "4/4 time signature"). Of course, such a time signature is not required here. For example, a song that has 5 beats per measure (a "5/4 time signature") might be mixed with another song that is in 4/4 time signature.

In addition (or as an alternative) to counting measures, the first listener might identify measure groupings in a song. Measure groupings, as mentioned previously, might comprise one or more measures in a song. For example, in much of Western music, songs can be logically broken into groups of eight measures. The first listener might identify the boundaries of these measure groupings and, for example, mark down the frame numbers corresponding to these boundaries. Alternatively, the first listener might identify a measure grouping in some other manner, such as by marking a frame number corresponding to the midpoint of the measure grouping. This kind of task might not be possible for a fully automated system to accomplish consistently or correctly, so human feedback in identifying measures and measure groupings is useful.

As an alternative to counting measures (discussed above), the first listener instead might simply count measure groupings and assume that a song has a certain time signature, thereby automatically obtaining measure boundaries within a measure grouping. For example, the first listener might mark boundaries of measure groupings. If these measure groupings have 32 beats in them, and the song has a 4/4 time signature (either this is known or assumed), then this would imply that there are 8 measures in each measure grouping.

Using such a technique, the first listener therefore might generate first submitted markings 370 that mark measure groupings, measures and/or beats in a particular song. The first listener may generate the markings 370, for example, from a display that shows a visual representation of beats in the song, and where the first listener selects the markings 370 from among the beats. A second listener might generate second submitted markings 372 in a similar manner.

The first listener might then transmit the first submitted markings 370 to the network interface 300 of the cuepoint generation system 300 using messages 27a over the network 29a. The second listener might transmit the second submitted markings 372 to the system 300 similarly, using messages 27b.

If the second listener is a different person from the first listener, then the first submitted markings 370 and the second submitted markings 372 might differ. For example, where one person hears four measures in a measure grouping another person might hear eight measures. Or where one person marks a measure grouping as beginning at one beat, another might mark a different beat to identify the start of a measure grouping. It is also possible that a listener may not be very good at identifying measure groupings and may simply mismark one or more of them.

Accordingly, the system 300 may seek to reconcile differing first submitted markings 370 and second submitted markings 372 into cuepoints 40 that can be used to mix songs. Exemplary ways in which this might be done are shown in more detail in connection with FIGS. 11A-11G, 12A-12D, and 13A-13C below.

It should be understood that in other embodiments, the system may reconcile a single listener's markings into cuepoints without a second listener. For example, after receiving the first submitted markings 370 from the first listener 300, the system 300 might deem the markings 370 as test cuepoints. The system 300 may use the test cuepoints to generate a transition between the song for which the markings 370 were created and another song, which may be known to have correctly marked cuepoints. The system 300 may then assess the quality of the transition. For example, if the transition sounds good when played (which may be determined by an automated system or an individual, such as an audiophile, expert listener, or other user), then the system 300 might determine the markings 370 were correctly marked. If the transition sounds bad or misaligned, the markings 370 could be discarded or chosen for further processing.

Figure 10C:
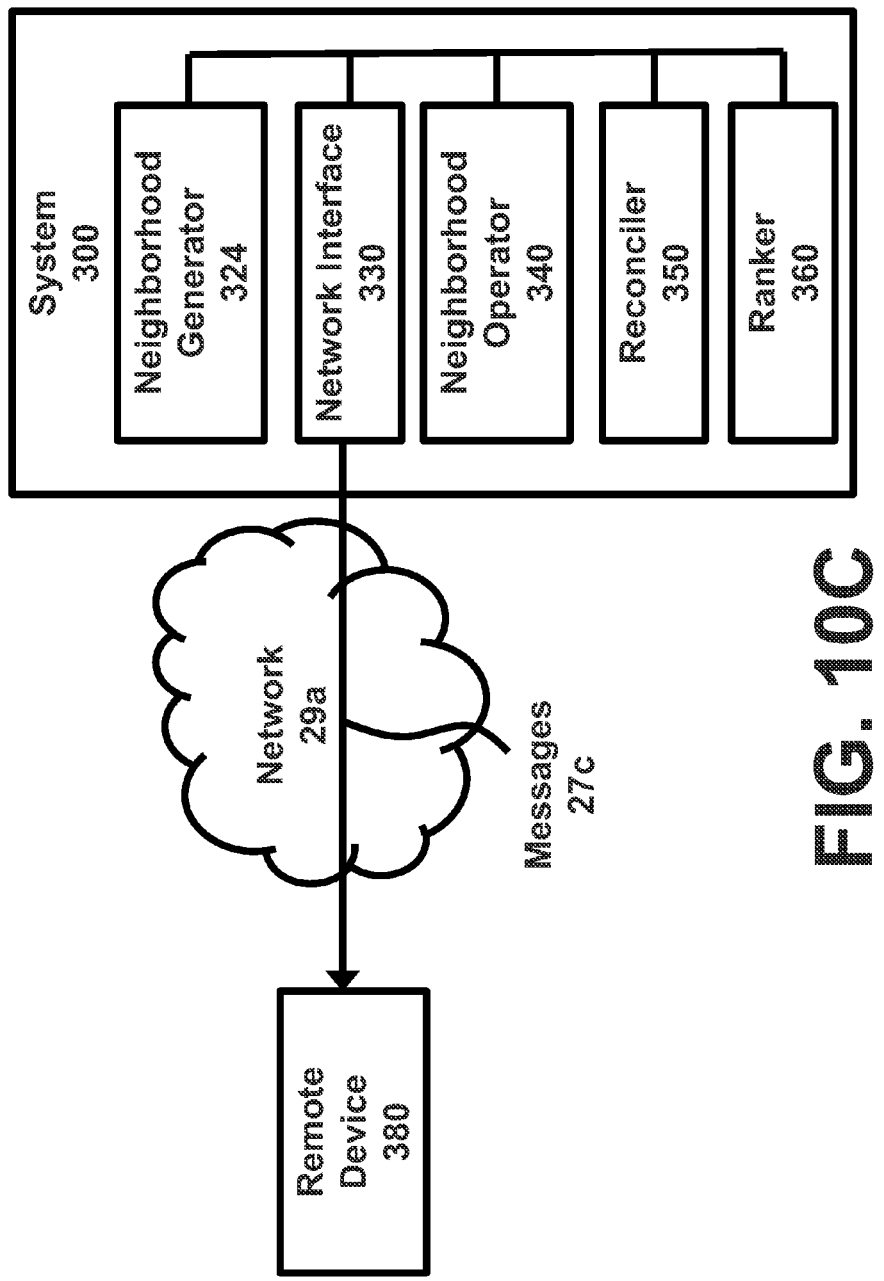

Turning now to FIG. 10C, we see that once the system 300 has reconciled the markings 370, 372 into cuepoints 40 (or has somehow transformed one set of markings 370 into cuepoints 40, as discussed in the previous paragraph), the cuepoints 40 may then be distributed to a remote device 380 using messages 27c over the network 29a. Such a remote device 380 may be any kind of computing or communications device (e.g., PC, laptop, notebook, mobile phone, smart phone, etc.). The remote device 380 may then run the program 20 that generates transitions (like transition 50) and mixes song data 30 using the cuepoints 40.

The cuepoints 40 might be delivered in any number of ways as described earlier. Moreover, the cuepoints 40 might be delivered ahead of time for all or some portion of the song data 30. This might be useful if, for example, the network 29a becomes unavailable. Alternatively, the system 300 might deliver cuepoints 40 at or near runtime, when the remote device 380 uses them to generate a transition.

It should be understood that many variants of the present system 300 are possible. For example, the system 300 may be integrated with the server 32 that interacts with the program 20, as shown in FIGS. 2A-2E. Or the work of reconciling cuepoints may be pushed to remote devices such as the remove device 380. Such a system may allow for distributed cuepointing—people on separate remote devices would generate markings and reconcile them with one another by using, for example, a peer-to-peer network.

FIGS. 11A-11G

Exemplary Embodiments for Reconciling Submitted Markings

Figure 11A:
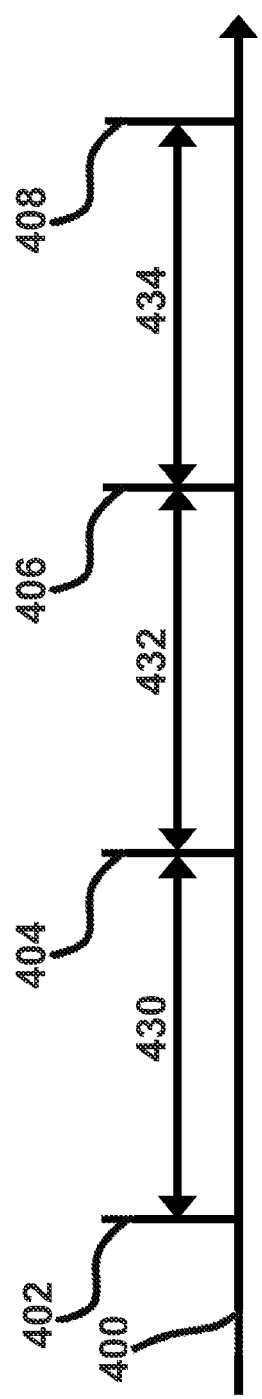
FIGS. 11A-11G are time diagrams showing exemplary embodiments for reconciling submitted markings.

FIG. 11A is a time diagram showing an exemplary embodiment relating to reconciling submitting markings. The diagram shows a song 400 whose cuepoints might be identified by the cuepoint generation system 300. First submitted markings 402 and 404 mark the start and end boundaries, respectively, of a first measure grouping 430. First submitted markings 404 and 406 mark the start and end boundaries, respectively, of a first measure grouping 432. And first submitted markings 406 and 408 mark the start and end boundaries, respectively, of a first measure grouping 434.

In an exemplary embodiment, each of the first measure groupings 430, 432, 434 might correlate to, for example, a section within a verse, chorus, bridge, or other portion of the song 400. A first listener might have listened to the song 400 to identify these first measure groupings 430, 432, 434. The first listener might then have notated the first submitted markings 402, 404, 406, 408, in order to mark the boundaries of these groupings 430, 432, 434. The first listener might use an automated software program to choose these markings 402, 404, 406, 408, such as by choosing the markings 402, 404, 406, 408 from a beat map that provides a visual representation of beats in the song 400.

Figure 11B:
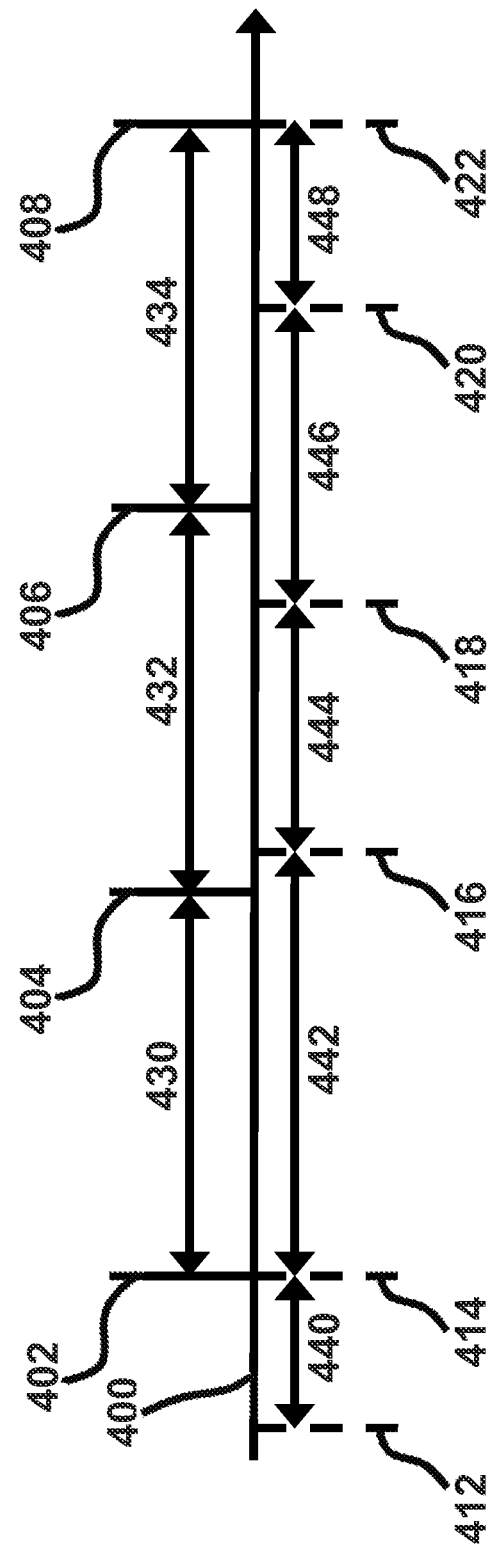

FIG. 11B shows the same timeline of the song 400 with second submitted markings 412, 414, 416, 418, 420, 422, each of which is marked by a dashed line in the diagram 400. Analogous to the first submitted markings 402, 404, 406, 408, the second submitted markings 412, 414, 416, 418, 420, 422, mark the boundaries of second measure groupings 440, 442, 444, 446, 448. These second measure groupings 440, 442, 444, 446, 448, might represent a section within a verse, chorus, bridge, or other portion of the song 400, as identified by a second listener of the song 400. This second listener may be different from the first listener who submitted the first submitted markings 402, 404, 406, 408.

As FIG. 11B shows, on some occasions, the frame values for first submitted markings and second submitted markings might match. For example, in this example, the frame value for the first submitted marking 402 matches the frame value for the second submitted marking 414, and the frame value for the first submitted marking 408 matches the frame value for the second submitted marking 422. This implies that both the first listener and the second listener marked the same frame value as separating two measure groupings. Markings 402, 414 and markings 408, 422 may each be thought of as a pair of "agreed" markings.

In other situations, frame values for the submitted markings from different listeners may be approximately, but not exactly, the same. For example, as shown in FIG. 11B, the frame value for the first submitted marking 404 is near the frame value for the second submitted marking 416. In some embodiments, markings 404, 416 may be thought of as pairs of agreed markings, since they are close together.

In other instances, the frame values for submitted markings from different listeners might substantially vary. For example, the second submitted markings 412, 418 and 420 are not near any first submitted marking. Similarly, the first submitted marking 406 is not near any second submitted marking. These markings 406, 412, 418, 420 may be referred to as disagreed markings.

Figure 11C:
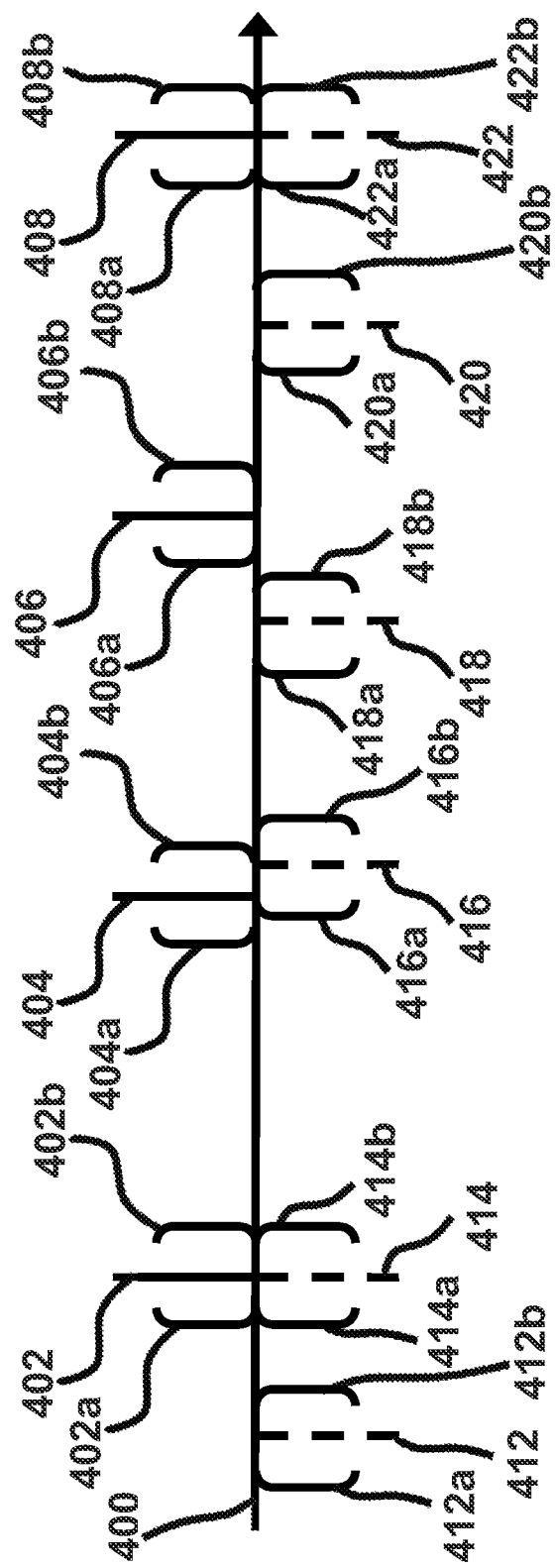

A relationship between first and second submitted markings is shown in FIG. 11C, which shows neighborhoods, or sets of frames, around each of the markings. Each of the neighborhoods might be generated by the neighborhood generator 324, and each of the neighborhood boundaries is depicted in FIG. 4C by an "a" or a "b" after the marking number. For example, the neighborhood around the first submitted marking 402 has a left boundary 402a and a right boundary 402b. The same goes for all of the other first submitted markings 404, 406, 408 (e.g., the neighborhood around the first submitted marking 408 has a left boundary 408a and a right boundary 408b). Similarly, the neighborhood around the second submitted marking 412 has a left boundary 412a and a right boundary 412b, and so on, for all the other second submitted markings 414, 416, 418, 420, 422.

It should be understood that while the neighborhoods in FIG. 11C have been drawn as roughly symmetrical (i.e., the number of frames between a marking and its left boundary is about the same as the number of frames between a marking and its right boundary), neighborhoods may be asymmetrical. For example, the number of frames between the left boundary 418a and the second submitted marking 418, may differ from the number of frames between the right boundary 418b and the second submitted marking 418.

Moreover, the number of frames in any particular neighborhood might differ from the number of frames in another neighborhood. For example, the number of frames between the left boundary 416a and the right boundary 416b (which is the number of frames in the neighborhood around the second submitted marking 416) might differ from the number of frames between the left boundary 420a and the right boundary 420b (which is the number of frames in the neighborhood around the second submitted markings 420), and it might differ from the number of frames between the left boundary 406a and the right boundary 406b (which is the number of frames in the neighborhood around the first submitted marking 406).

As shown in FIG. 11C, in some instances, the neighborhoods around submitted markings might perfectly coincide. For example, the first submitted marking 402 matches the second submitted marking 414, and the neighborhoods around these two markings 402 and 414 are the same in this embodiment. The same is true for the neighborhoods around the first submitted marking 408 and the second submitted marking 422.

Alternatively, the neighborhoods around submitted markings from different listeners might overlap but not have the same boundaries. For example, the neighborhood around the first submitted marking 404 overlaps with the neighborhood around the second submitted marking 416, though the two are not the same in this embodiment.

Finally, the neighborhoods around submitted markings from different listeners might not overlap all. The neighborhoods around first submitted marking 406, and second submitted markings 412, 418, and 420 do not overlap with any other neighborhoods.

Having identified neighborhoods, one might use the neighborhood operator 340 to perform set operations on the neighborhoods in order to generate reconciled neighborhoods. The boundaries of these reconciled neighborhoods are shown in FIGS. 11D-11G and 12A-12D as parenthetical brackets that cross above and below the lines representing the songs in those diagrams.

Figure 11D:
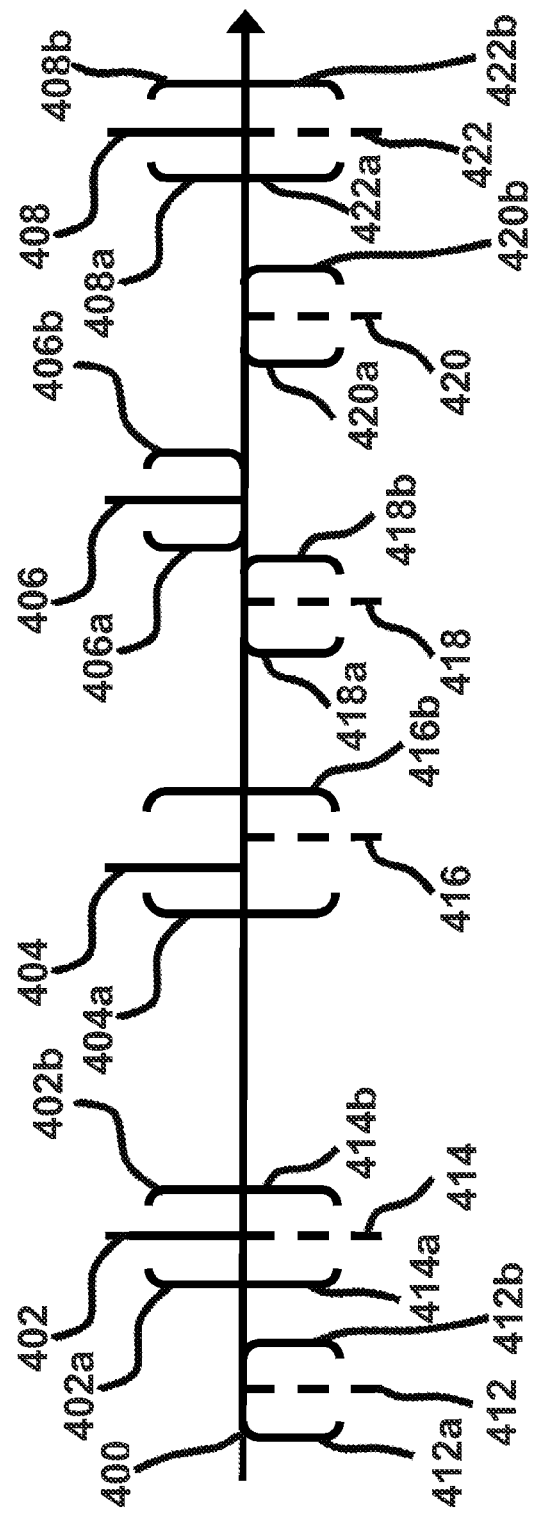

To illustrate, in FIG. 11D, one might use the neighborhood operator 340 to take a union of neighborhoods that overlap. As shown in this embodiment, taking a union of the neighborhood around the first submitted marking 404 and the second submitted marking 416 yields a reconciled neighborhood that encompasses both markings 404, 416 and that has a left boundary 404a and a right boundary 416b. That is, the reconciled neighborhood has as boundaries the left boundary 404a of the neighborhood around first submitted marking 404, and the right boundary 416b of the neighborhood around the second submitted marking 416. Both the first submitted marking 404 and the second submitted marking 416 fall within the reconciled neighborhood.

Taking a union around the first submitted marking 402 and the second submitted marking 414 yields a reconciled neighborhood with the same boundaries as the original neighborhoods surrounding these markings 402, 414, since these neighborhoods perfectly overlapped. The same is true when taking a union around the first submitted marking 408 and the second submitted marking 422. Taking a union around the first submitted marking 406 and the other second submitted markings 412, 418, 420 does not yield any other reconciled neighborhoods, because they do not overlap at all.

Figure 11E:
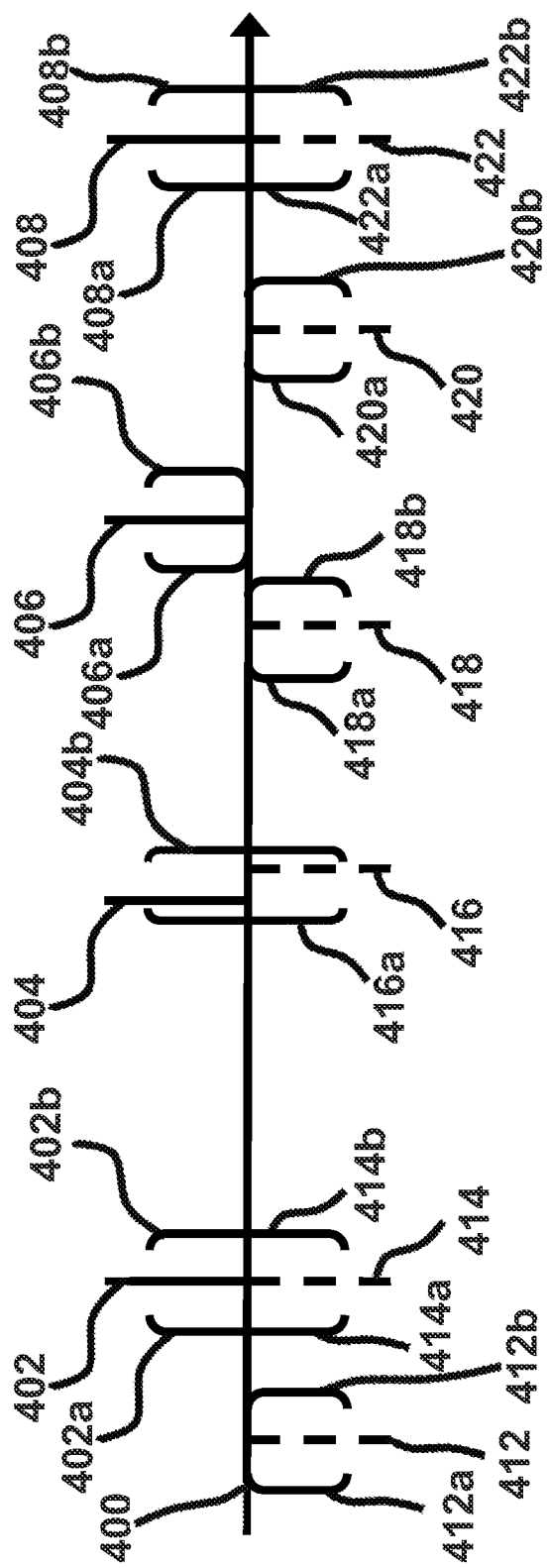

FIG. 11E shows an alternative embodiment in which the neighborhood operator 340 might be used to perform a different set operation—an intersection—on the neighborhoods in order to generate a reconciled neighborhood. As in FIG. 11D, most of the neighborhoods are unaffected by the intersection, either because the neighborhoods do not overlap at all, or because they perfectly overlap, so the reconciled neighborhood has the same boundaries as the neighborhoods from which it was created. The one difference relates to the neighborhoods around the first submitted marking 404 and the second submitted marking 416. Taking an intersection of these two neighborhoods yields a reconciled neighborhood with a left boundary 416a and a right boundary 404b. The first submitted marking 404 and the second submitted marking 416 fall within this reconciled neighborhood, though it should be understood that in other embodiments, this may not necessarily be the case.

It should also be understood that any number of other set operations might be performed by the neighborhood operator 340 or any other element in the cuepoint generation system 300 in order to generate the reconciled neighborhoods. For example, the neighborhood operator 340 might use complements or relative complements in generating a neighborhood.

Figure 11F:
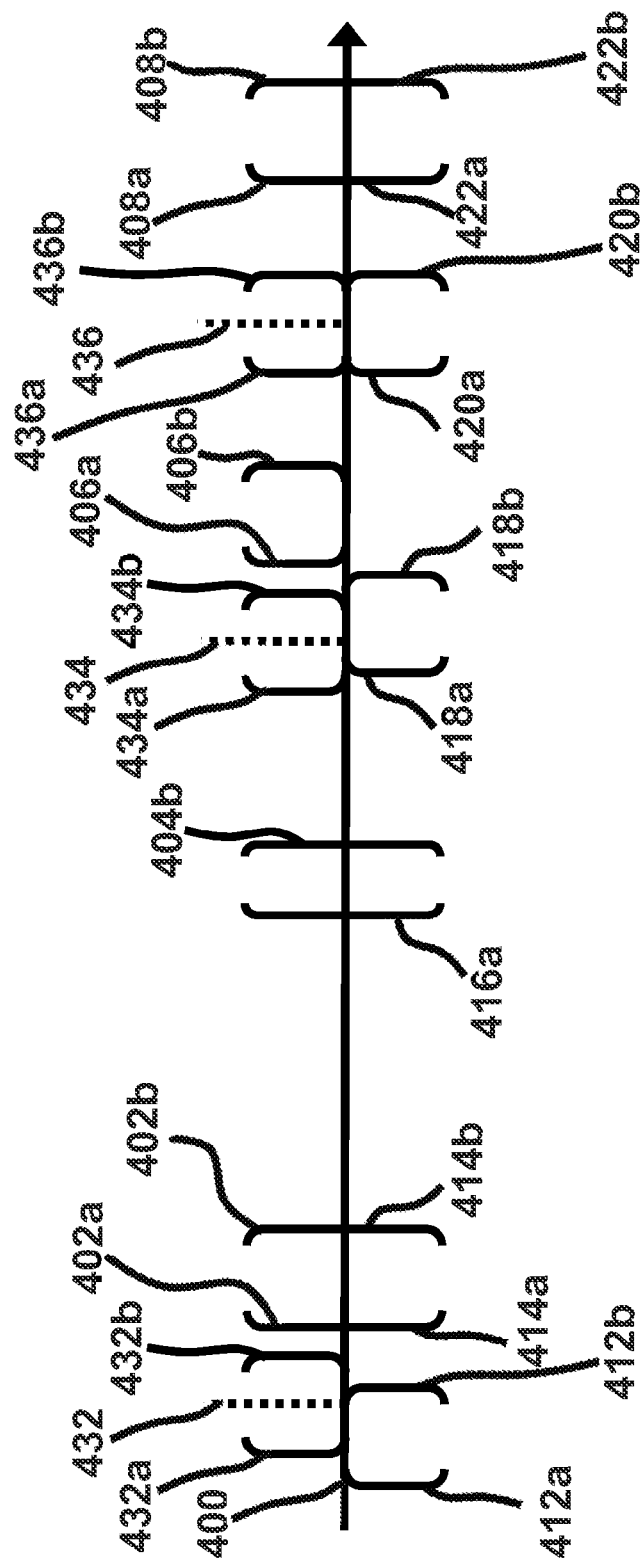

As shown in FIGS. 11D-11E, after the neighborhood operator 340 performs its operations, there might still be neighborhoods around markings that are generated by different listeners and that the system 300 has been unable to reconcile. To generate additional reconciled neighborhoods from these remaining neighborhoods, one might use submitted markings from yet another listener. For example, FIG. 11F shows third submitted markings 432, 434, 436 (identified by dotted lines) that might be identified by a third listener. Like the first listener and the second listener, the third listener might listen to the song 400 in order to identify measure groupings in the song 400 and then mark the third submitted markings 432, 434, 436 to mark boundaries of those measure groupings.

As before, the neighborhood generator 324 might be used to generate neighborhoods around the third submitted markings 432, 434, 436. For example, around the third submitted marking 432, there is a neighborhood with a left boundary 432a and a right boundary 432b, around the third submitted marking 434, there is a neighborhood with a left boundary 434a and a right boundary 434b, and around the third submitted marking 436, there is a neighborhood with a left boundary 436a and a right boundary 436b.

Figure 11G:
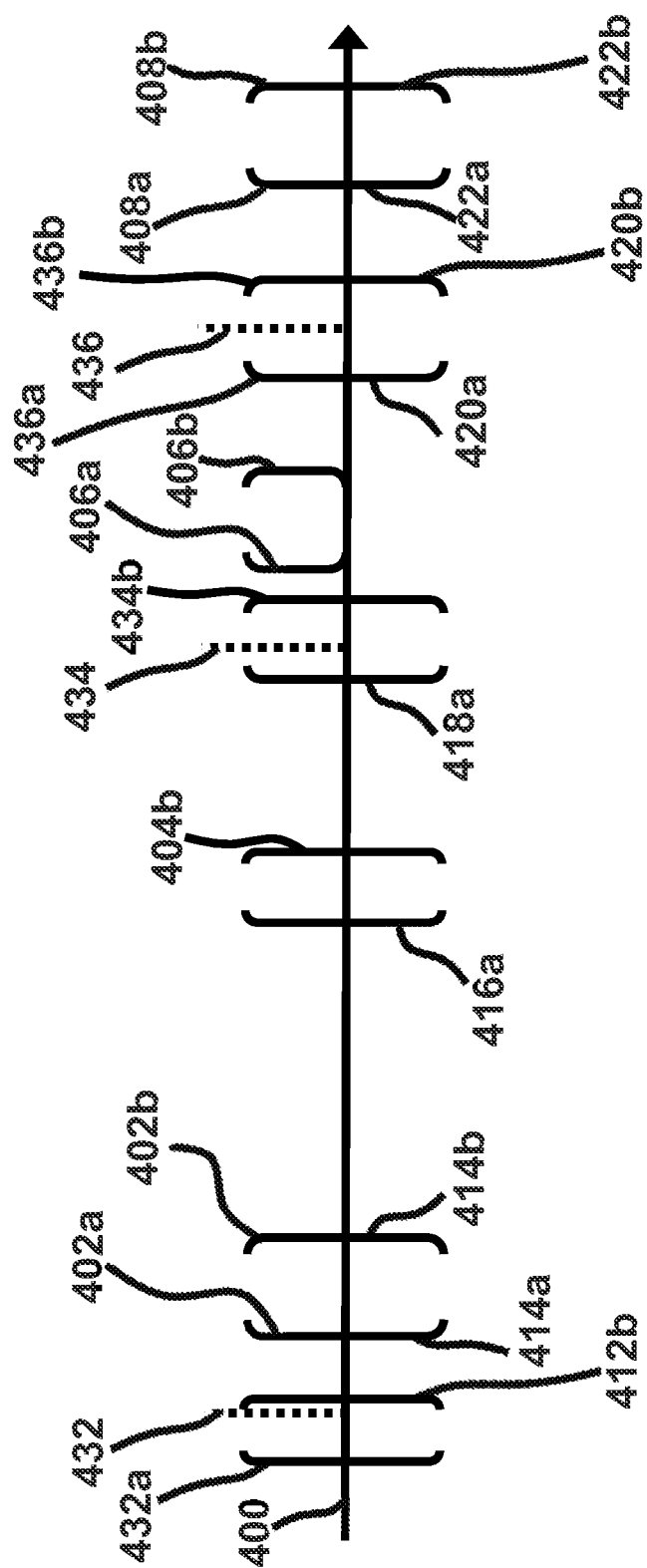

FIGS. 11F-11G show how these neighborhoods around the third submitted markings 432, 434, 436 might be reconciled with the other neighborhoods around the other submitted markings. For example, the neighborhood around third submitted marking 432 overlaps with the neighborhood around the second submitted marking 412. If the neighborhood operator 340 performs an intersection operation on these neighborhoods, one can have a reconciled neighborhood with a left boundary 432a (which is the left boundary of the neighborhood around the third submitted marking 432) and a right boundary 412b (which is the right boundary of the neighborhood around the second submitted marking 412). Similarly, the neighborhood operator 340 can perform an intersection operation to generate a new reconciled neighborhood with a left boundary 418a and a right boundary 434b, and another reconciled neighborhood with a left boundary 436a (which has the same frame number as left boundary 420a, as shown in FIG. 4G), and a right boundary 436b (which has the same frame number as right boundary 420b).

It should be understood that there are many other ways in which reconciled neighborhoods might be generated around one or more submitted markings. For example, a listener might submit markings corresponding to boundaries of measure groupings that the listener perceives while listening to the song. The markings might be analyzed by some kind of automated error checking system, which perhaps uses information about the song (e.g., beats-per-minute count, artist, genre, etc.) in order to determine, perhaps probabilistically, whether the submitted markings have errors. Based on such an error checking system, the markings may be accepted or rejected for purposes of generating the cuepoints 40 for mixing.

FIG. 12A-12D

Exemplary Embodiments for Determining Cuepoints

Figure 12A:
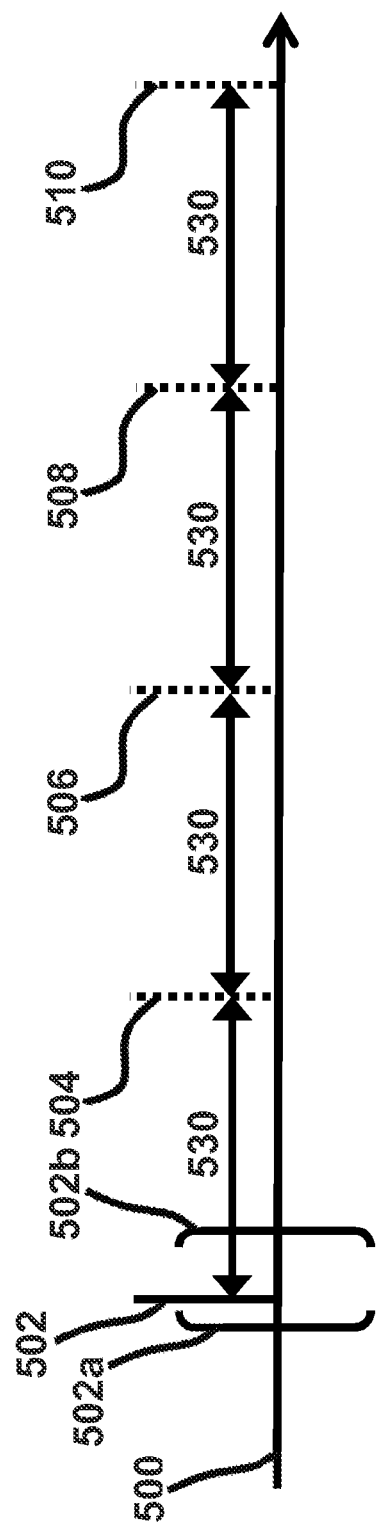
FIGS. 12A-12D are time diagrams showing exemplary embodiments for determining cuepoints.

Having identified one or more reconciled neighborhoods and other neighborhoods that could not be reconciled, we now turn to FIGS. 12A-12D, which show an exemplary way how the system 300 might generate the cuepoints 40 based on these neighborhoods. FIG. 12A shows a time diagram for a song 500. The diagram shows a reconciled neighborhood with frames between a left boundary 502a and a right boundary 502b.

Within this reconciled neighborhood, the system 300 might choose a candidate cuepoint. FIG. 12A shows one such possible candidate cuepoint 502, chosen from among the frames in the reconciled neighborhood. In an exemplary embodiment, this candidate cuepoint 502 might be a submitted marking from a listener, such as one of the first submitted markings 402, 404, 406, 408 discussed above (or the first submitted marking 370 in FIG. 10B).

The system 300 might then add to the candidate cuepoint 502 one or more multiples of a standard frame count 530 in order to find other candidate cuepoints in other neighborhoods. This standard frame count 530 might be any number of frames in the song, and its value might depend on a variety of factors. For example, the count 530 might be based on the number of frames in a measure, in a group of measures, or in between beats in a song. Or the count 530 might be determined algorithmically based on another song characteristic, such as the genre or pitch of the song, or a speed metric of the song. Such a speed metric might be any kind of measurement of the tempo of the song, such as a beats-per-measure count, a measures-per-minute count, and so on. It should also be understood that a multiple might be negative; hence adding a multiple of the standard frame count 530 might actually entail subtracting the absolute value of the multiple of the standard frame count 530. A multiple may also be greater or less than one.

In the exemplary embodiment shown in FIG. 12A, the standard frame count 530 comprises eight measures of the song. FIG. 12A also shows that one, two, three and four multiples of the standard frame count 530 (corresponding to 8, 16, 24, and 32 measures, respectively) have been added to the candidate cuepoint 502 in order to determine candidate cuepoints 504, 506, 508, 510.

In an exemplary embodiment, the system 300 may apply a cost function (which will be described shortly), to determine whether to use the candidate cuepoint 502 in the reconciled neighborhood and the candidate cuepoints 504, 506, 508, 510 as cuepoints 40 for the song. If the system 300 chooses these cuepoints, then they may be referred to as reconciled cuepoint 502 (chosen from the reconciled neighborhood) and interpolated cuepoints 504, 506, 508, 510 (chosen from outside a reconciled neighborhood). The reconciled cuepoint 502 and interpolated cuepoints 504, 506, 508, 510 might then be used for mixing the song 500 with another song.

Figure 12B:
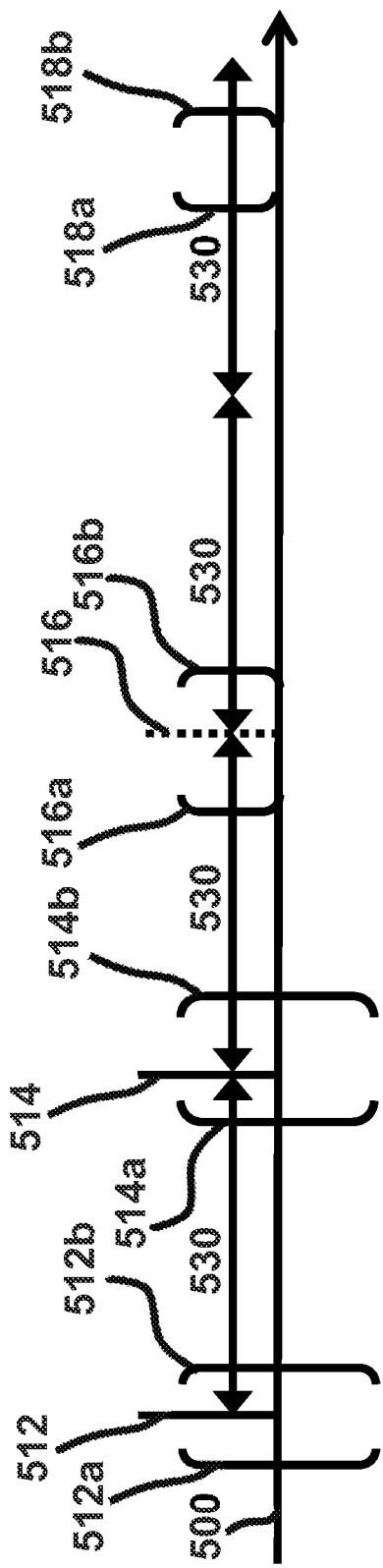

FIG. 12A is just one of many exemplary embodiments for determining reconciled and interpolated cuepoints. FIG. 12B shows another embodiment, in which there are two reconciled neighborhoods, each of which has one reconciled cuepoint. The first neighborhood has a left boundary 512a and a right boundary 512b, with a reconciled cuepoint 512. The second neighborhood has a left boundary 514a and a right boundary 514b, with a reconciled cuepoint 514. These reconciled neighborhoods might have been generated using the techniques discussed in connection with FIGS. 11A-11G.

The reconciled cuepoints 512, 514 might be chosen such that they lie within the reconciled neighborhoods and are separated by the standard measure count 530, which again may be any arbitrary length of frames. It should be understood that other reconciled cuepoints might have been chosen in other embodiments. Moreover, multiples of the standard measure count may again be added to (or subtracted from) the reconciled cuepoints 512, 514, in order to determine additional, interpolated cuepoints.

In FIG. 12B, we see that adding multiples of the standard measure count 530 to the reconciled cuepoints 512, 514 yields an interpolated cuepoint 516 (represented by a dotted line in the figure). In this embodiment, the interpolated cuepoint 516 is chosen because it falls within a neighborhood with a left boundary 516a and a right boundary 516b. This neighborhood may have been determined based on a submitted marking from a listener. Other interpolated cuepoints are not chosen in the present embodiment since the multiples of the standard measure count do not fall within other neighborhoods.

Figure 12C:
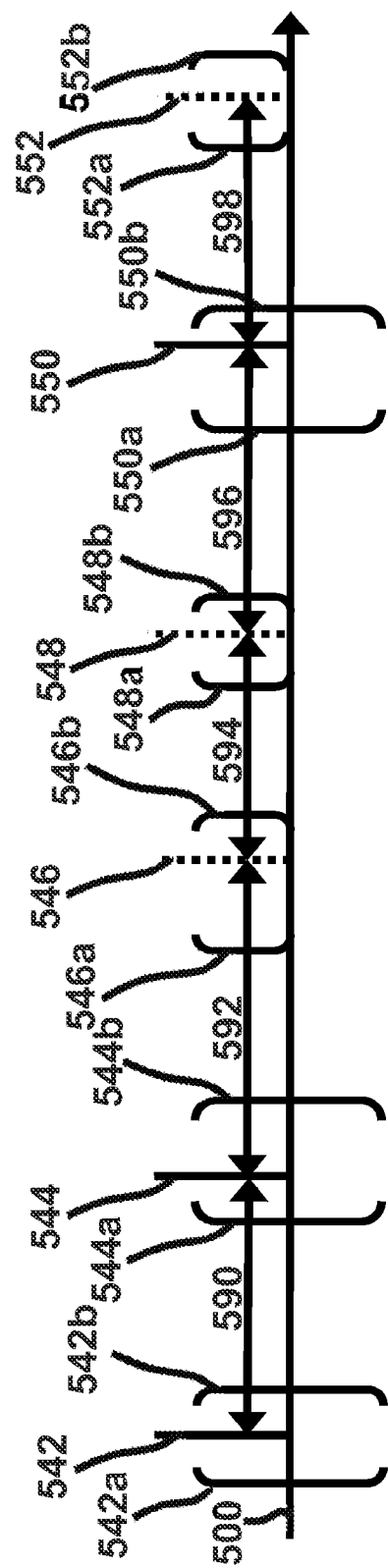

FIG. 12C shows another exemplary embodiment with three reconciled neighborhoods—one with a left boundary 542a and a right boundary 542b, a second with a left boundary 544a and a right boundary of 544b, and a third with a left boundary 550a and a right boundary of 550b. FIG. 12C also shows three non-reconciled neighborhoods—one with a left boundary 546a and a right boundary 546b, a second with a left boundary 548a and a right boundary of 548b, and a third with a left boundary 552a and a right boundary of 552b.

As the diagram shows, within each of these reconciled and non-reconciled neighborhoods, a number of frames (e.g., candidate cuepoints) might be chosen as the cuepoints 40. Different combinations of candidate cuepoints, which collectively could be referred to as cuepoint collections, might be chosen from both reconciled neighborhoods and non-reconciled neighborhoods. FIG. 12C shows one such possible cuepoint collection, with candidate cuepoints 542, 544, 550 in the reconciled neighborhoods, and candidate cuepoints 546, 548, 552 in the non-reconciled neighborhoods.

Since there are a number of potential cuepoint collections, one or more components in the system 300 (such as the selector 350 and/or the ranker 360) may evaluate these different cuepoint collections and rank them according to desirability for mixing. In doing this, the system 300 may apply a cost function to each cuepoint collection. The function might take into account any number of characteristics of the potential cuepoints and rank highest the cuepoint collection that has the lowest cost. Such a cuepoint collection may be referred to as an optimal cuepoint collection. (In some embodiments, more than one cuepoint collection may be optimal). It should be understood that a cost function should be construed broadly here; for example, a function that assigns higher values to better combinations rather than lower values may be considered a cost function as well.

A cost function might determine its values based on a number of characteristics of the cuepoint collections. For example, given that many songs have some kind of regularity in their sounds and/or beats, the cost function might give higher rank to cuepoint collections that are made up of candidate cuepoints that capture this regularity. One way to capture this regularity would be through some kind of regularity metric. In some embodiments, such a metric might be the frame distance, time, etc., between the candidate cuepoints in a cuepoint collection. The cost function might then calculate a dispersion measure (e.g., standard deviation, variance, interquartile range, median absolute deviation, range, average deviation, etc.) for this regularity metric, giving higher rank to cuepoint collections that have lower dispersion. Applied to the embodiment in FIG. 12C, the cost function might give a high rank to the collection of candidate cuepoints 542, 544, 546, 548, 550, 552, if the distances separating them 590, 592, 594, 596, 598, are relatively similar.

Moreover, candidate cuepoints that are separated by an amount that is substantially similar to a standard measure count (such as standard measure count 530) might be good choices. For example, if most songs by a particular artist involve measure groupings of eight measures, it might be a good guess that the measure groupings in this song 500 are eight measures in length. Hence, it might be good if the distances 590, 592, 594, 596, 598 in FIG. 12C were substantially similar to eight measures in length.

The cost function may also give higher weight to frames corresponding to submitted markings that match among different listeners. For example, if two listeners submit the same marking for a particular song, the cost function may determine that this marking should be part of any candidate cuepoint set it considers.

Figure 12D:
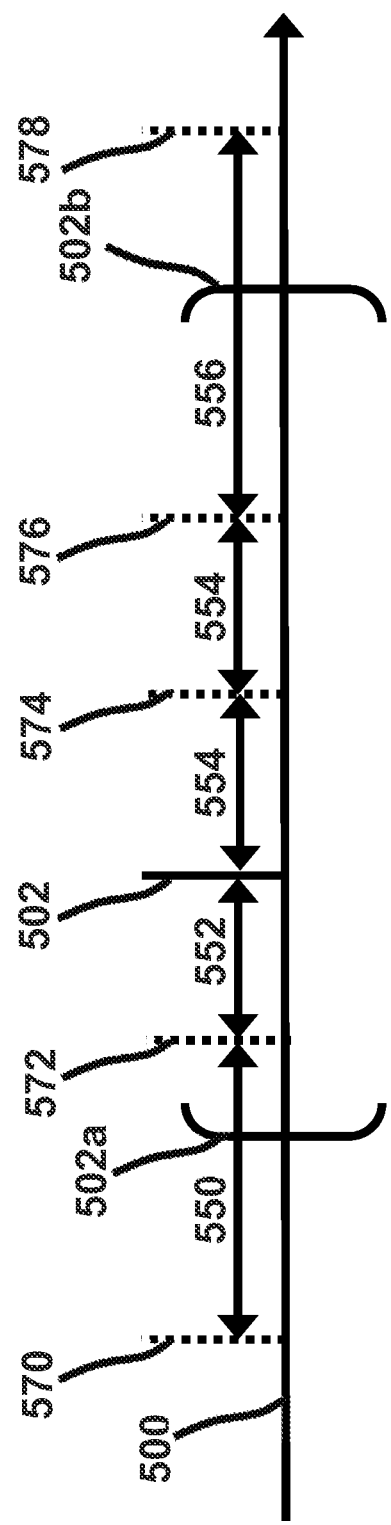

Additionally, a cost function might give a better ranking to cuepoints that are selected from among beats in the song 500. FIG. 12D zooms in on the reconciled neighborhood shown in FIG. 12A, with left boundary 502a, right boundary 502b, and first submitted marking 502. The diagram shows beats 570, 572, 574, 576, 578 (shown by a dotted line) for the song 500. The cost function may assign the highest weight to candidate cuepoints that coincide with beats 572, 574, 576, since they match with beats and are also within the neighborhood surrounding the first submitted marking.

Having ranked the potential cuepoint collections, the system 300 may choose a set of cuepoints 40, which may be the cuepoints in an optimal cuepoint collection as measured by the cost function. As noted, these cuepoints 40 might comprise one or more reconciled cuepoints chosen from reconciled neighborhoods and one or more interpolated cuepoints chosen from non-reconciled neighborhoods.

It should be understood that the techniques described here are general ones for choosing cuepoints and as such, many variants of the present embodiments are possible. For example, the system 300 might determine that markings from certain listeners are generally of such high quality that no reconciliation is needed. Alternatively, the system 300 might determine that certain listeners make different kinds of mistakes. So comparing markings submitted by these listeners with one another might be especially good, since one person's error will likely be caught by the other. Moreover, the system 300 may determine that some listeners are better at identifying measure groupings and cuepoints in some types of songs rather than others, so the system 300 can assign songs in a more intelligent manner to minimize errors.

Additionally, one should note that the choice of songs for which the cuepoints 40 are identified might depend on the popularity of songs. For example, the system 300 might select songs that should receive cuepoints based on lists that indicate music popularity, such as a Top 40 list. Alternatively, the system 300 might determine cuepoints based on which songs people choose to upload to a cloud-based player system. If a certain song, for example, is uploaded more than a certain number of times and/or is uploaded by more than a certain number of users (these particular thresholds might be fine-tuned over time), then these songs might be identified (either automatically or by manual selection) as songs that should have cuepoints.

In determining what these thresholds are and in modeling song popularity, one might use some sort of discrete distribution, such as a Dirichlet distribution, that is defined over a finite state space and which can be changed using Bayesian updating. Such demand-driven cuepointing may ensure that the most popular songs are mixable in a smooth beat-matched manner using the present embodiments.

FIGS. 13A-13C

Exemplary Embodiments for Altering Cuepoints

Figure 13A:
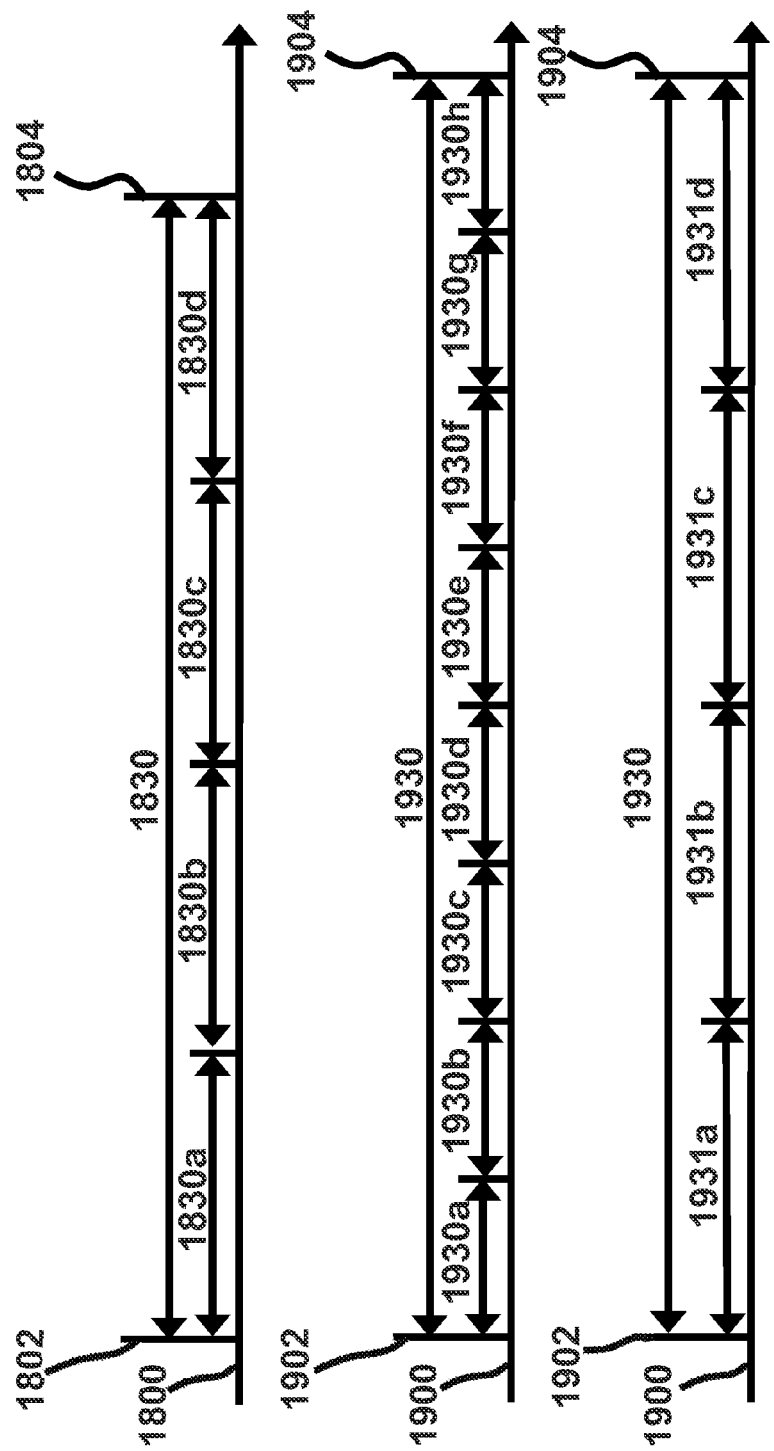
FIGS. 13A-13C are time diagrams showing exemplary embodiments for altering cuepoints.
Figure 13B:
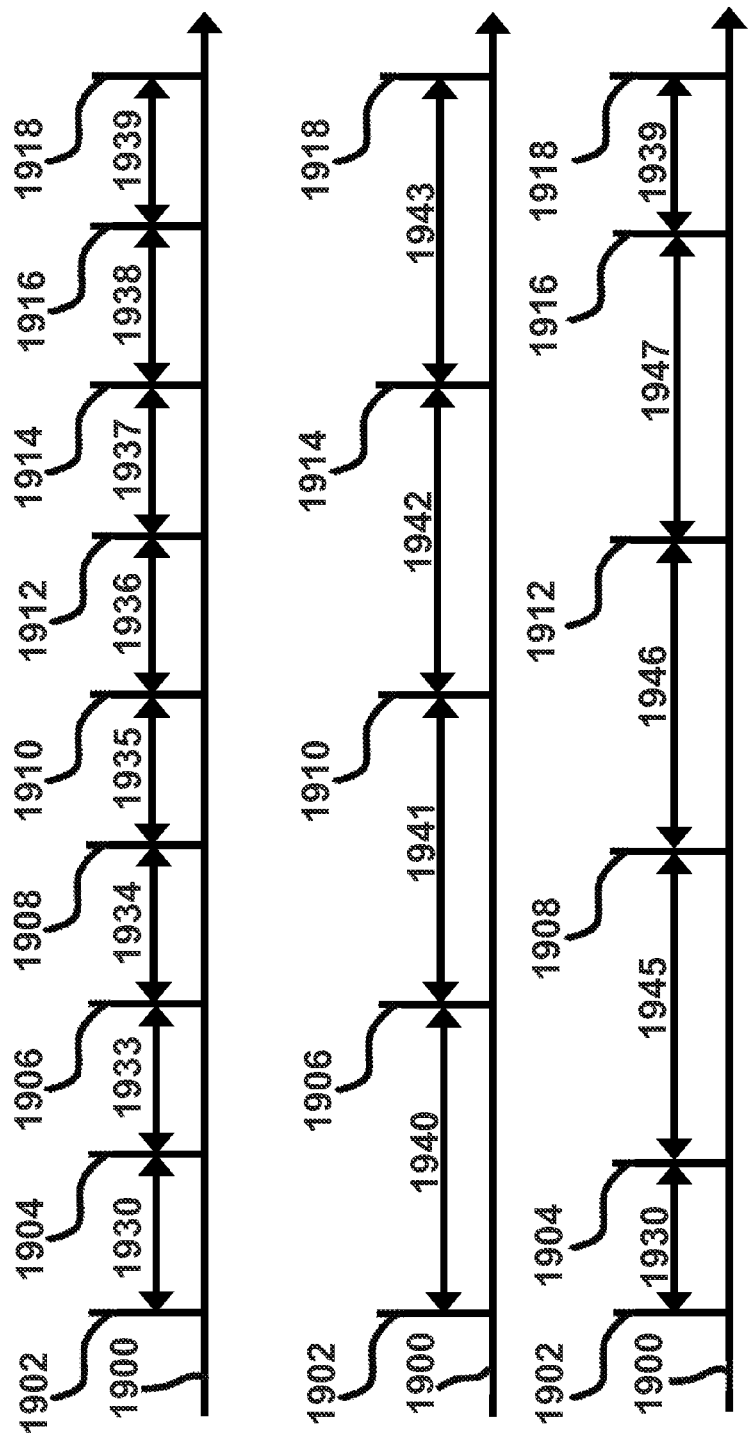
Figure 13C:
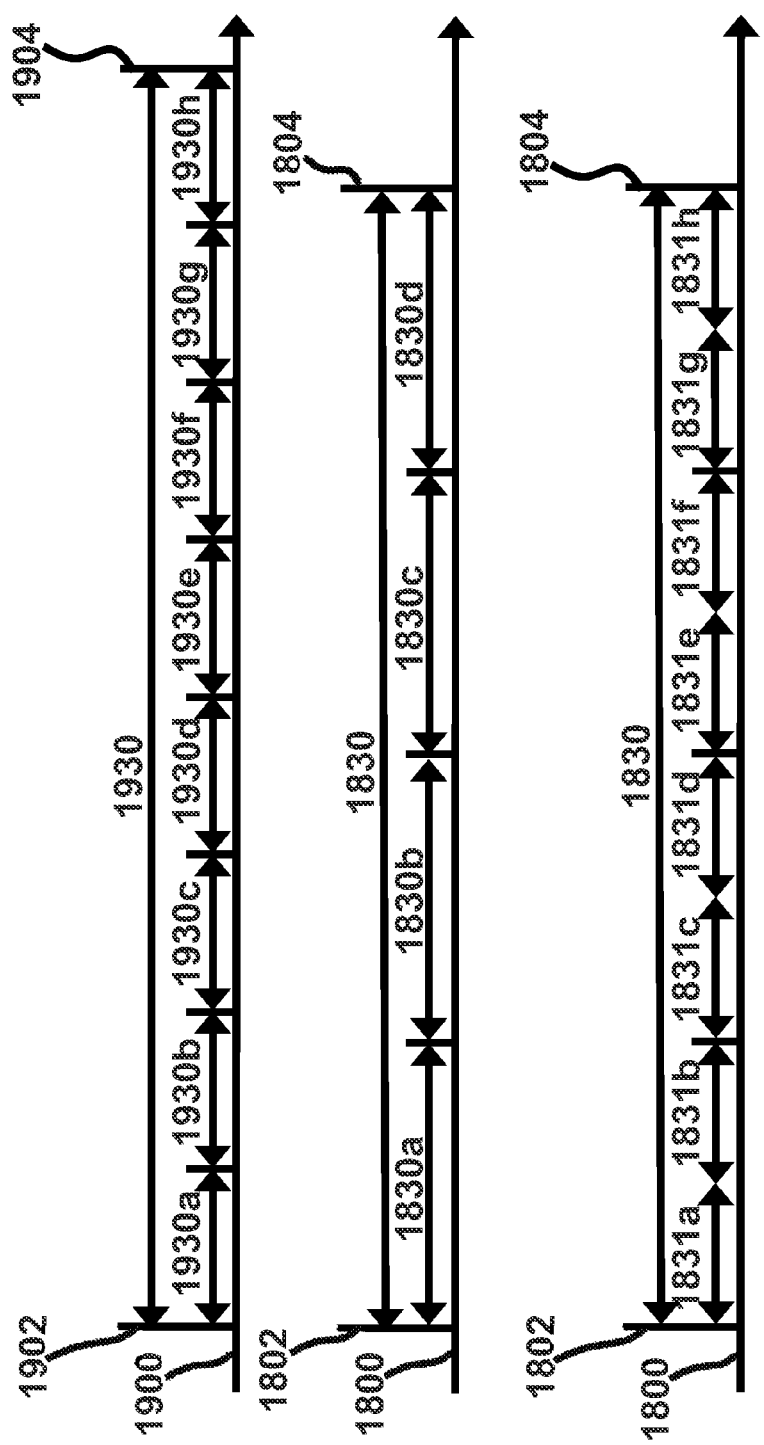

Turning to FIGS. 13A-13C, we see some exemplary ways of altering cuepoints 40. In some situations, the system 300 may receive information that two songs in the song data 30, which might be mixed, have greatly different tempos. This tempo differential might exist for a few reasons.

First, it is possible the songs are actually very different speeds. Additionally, it is possible that differences in how humans have counted the number of measure groupings might affect the tempo of the song. For example, for measure groupings of a particular length, if a first set of people count the groupings as four measures in length and a second set of people count the groupings as eight measures in length, it might appear that the tempo as counted by the second set of people is faster.

Alternatively, perceived differences in tempo in songs might be because automated software that determines beats in the song has found some multiple of what a human would perceive when hearing a song. For example, in some embodiments, the software might double or half what a human would perceive when hearing a song. This may be due to frequency issues regarding sinusoidal fit of a sound wave or excess sensitivity to minor beats or sounds in the song. Of course it should be understood that there are many other ways that such software might misread the tempo of a song as compared to a human.

In such embodiments, the large difference in tempos in the songs might result in issues when mixing these songs together. If a song that is to be mixed in has a much faster or slower tempo than the current song (e.g., the difference in tempos exceeds some threshold), then the transition (e.g., transition 50) that is generated may speed up or slow down too much, resulting in a disruption in the flow of sound and unnatural acceleration or deceleration of tempo, outside the bounds of what many humans will enjoy. Moreover, there may be audio artifacts (e.g., issues with echoes) in the transition 50 when performing time-stretching operations that require dramatic shifts in one or both songs.

To address this situation, in some embodiments, the system 300 and/or remote device 380 that receives the cuepoints 40 may adjust the cuepoints for songs to be mixed. This might be done, for example, when a speed metric (e.g., beats-per-minute count) for one or both songs, or a combination of speed metrics for the songs (e.g., a ratio or difference of speed metrics), exceeds some threshold. An exemplary embodiment is shown in a time diagram in FIG. 13A, which shows a measure grouping 1830 for a first song 1800 and a measure grouping 1930 for a second song 1900. These two measure groupings 1830, 1930, whose boundaries are determined by cuepoints 1802, 1804, and 1902, 1904, respectively, are to be mixed together.

As is apparent from the diagram, there are four measures 1830*a*, 1830*b*, 1830*c*, 1830*d*, in the measure grouping 1830. Each of these measures 1830*a*, 1830*b*, 1830*c*, 1830*d* is longer than each of eight measures 1930*a*, 1930*b*, 1930*c*, 1930*d*, 1930*e*, 1930*f*, 1930*g*, 1930*h*, in the measure grouping 1930. This difference in measure length corresponds to a significant difference in tempos (whether actual or perceived, as discussed above) and might result in issues when mixing.

Accordingly, in an exemplary embodiment, the system 300 and/or remote device 380 might regroup measure grouping 1930 at the level of the measure. Instead of having eight measures, the system 300 and/or remote device 380 may combine consecutive measures together, resulting in four measures 1931*a*, 1931*b*, 1931*c*, 1931*d*, as shown in the bottom timeline. These new measures 1931*a*, 1931*b*, 1931*c*, 1931*d*, are much closer in length to the measures 1830*a*, 1830*b*, 1830*c*, 1830*d*. By altering these measure lengths, one might have a smoother mix when these measure groupings 1830, 1930 are combined.

It should be understood that this is merely one way in which measures and/or measure groupings might be reorganized. For example, in FIG. 13B, we see another exemplary embodiment, again involving the song 1900. The top time diagram shows a series of measure groupings 1930, 1933, 1934, 1935, 1936, 1937, 1938, 1939, separated by cuepoints 1902, 1904, 1906, 1908, 1910, 1912, 1914, 1916, 1918. The middle time diagram shows how these measure groupings might be combined, by removing alternating (e.g., every other) cuepoints, to produce new measure groupings 1940, 1941, 1942, 1943 and a reduced set of cuepoints 1902, 1906, 1910, 1914, 1918. As shown in FIG. 13A, combining measure groupings in this manner may be useful if the song 1900 is being combined with a much slower song, such as song 1800.

The bottom time diagram shows another way in which measure groupings in the song 1900 might be combined. Here, measure grouping 1930 and measure grouping 1939 are retained as they were, but measure groupings 1933, 1934 are combined to form new measure grouping 1945, measure groupings 1935, 1936 are combined to form new measure grouping 1946, and measure groupings 1937, 1938 are combined to form new measure grouping 1947. This results in a reduced set of cuepoints 1902, 1904, 1908, 1912, 1916, 1918, which are a subset of the original cuepoints, 1902, 1904, 1906, 1908, 1910, 1912, 1914, 1916, 1918.

In FIG. 13C, we see an alternate embodiment, where measure groupings are halved instead of doubled. Again the measure groupings 1830, 1930 are to be combined, but instead of combining measures in measure grouping 1930, this time the system 300 and/or remote device 380 might partition the measure grouping 1830 into smaller measures. In particular, measure 1830*a* may be broken into two measures 1831*a*, 1831*b*; measure 1830*b* may be broken into two measures 1831*c*, 1831 *d*; measure 1830*c* may be broken into two measures 1831*e*, 1831 *f*, and measure 1830*d* may be broken into two measures 1831*g*, 1831*h*. By splitting the measures, the effective speed metric for the measure grouping 1830 may be doubled, making it seem faster for purposes of mixing and making mixing with measure grouping 1930 easier.

It should be apparent that this method of halving measures may result in more cuepoints, particular if it is done across multiple measure groupings. These new cuepoints might be considered part of a supplemental set of cuepoints. (Supplemental sets of cuepoints and reduced sets of cuepoints may both be thought of as revised sets of cuepoints). In such an embodiment, the original cuepoints might be a subset of the supplemental set, with the new cuepoints as additional cuepoints in the supplemental set.

It should be understood that a wide variety of additions and modifications may be made to the exemplary embodiments described within the present application. For example, other speed metrics (e.g., measures-per-minute, measure groupings-per-song, etc.) may be used in the embodiments described in FIGS. 13A-13C. Moreover, measures need not be divided into halves or combined into double length; any other alteration of measure or measure grouping length (e.g., tripling measure length, dividing measures into quarters, etc.) may be done in alternate embodiments. Additionally, the alteration of cuepoints may be done by any number of components at any time, whether it be the system 300 at the time the cuepoints 40 are generated (e.g., the system pre-generates different versions of cuepoints 40 for each song, so that it can be mixed with much faster or slower songs) or right before run-time by the remote device 380, when it knows which songs will be mixed together.

Additionally, in alternate embodiments, the user interface 28 may give users the ability to purchase songs they hear on the Internet radio or via preview clips. Moreover, the order of steps 804, 806, and 808 in FIG. 8 can be shuffled in any way—for example, the program 20 can see whether a transition is ready at any point prior to determining whether it should advance to the next song.

Many more other additions and modifications to the exemplary embodiments are possible. Furthermore, it should be noted that the section headings in the description were provided as a mere convenience for the reader, and they should not be understood as limiting the embodiments or scope of the invention in any way.

It is therefore intended that the foregoing description illustrates rather than limits this invention and that it is the following claims, including all of the equivalents, that define this invention:

What is claimed is:

1. A method for generating cuepoints from submitted markings comprising:
    obtaining first submitted markings for a song, wherein each of the first submitted markings maps to a first measure grouping in the song and identifies a boundary of at least one of the first measure groupings; and
    reconciling the first submitted markings into a set of cuepoints.

2. The method of claim 1, wherein the step of reconciling the first submitted markings into a set of cuepoints comprises:
    using the first submitted markings to generate test cuepoints;
    generating a transition using the test cuepoints; and
    assessing quality of the first submitted markings based on the transition.

3. The method of claim 2, wherein the step of assessing quality of the first submitted markings based on the transition comprises listening to the transition to determine the quality of the first submitted markings.

4. The method of claim 1, wherein the step of obtaining first submitted markings for a song comprises:
    generating the first submitted markings; and
    receiving the first submitted markings from a remote data source over a network.

5. The method of claim 4, wherein the step of generating the first submitted markings comprises playing the song such that a first listener selects the first submitted markings.

6. The method of claim 5, wherein the step of reconciling the first submitted markings into a set of cuepoints comprises:
    playing the song such that a second listener different from the first listener selects second submitted markings; and
    reconciling the first submitted markings and the second submitted markings into the set of cuepoints.

7. The method of claim 1, wherein the step of reconciling the first submitted markings into a set of cuepoints comprises:
    obtaining second submitted markings for the song, wherein each of the second submitted markings maps to a second measure grouping in the song; and
    reconciling the first submitted markings and the second submitted markings into the set of cuepoints.

8. The method of claim 7, wherein the step of reconciling the first submitted markings and the second submitted markings into a set of cuepoints comprises making the set of cuepoints equal to a subset of an intersection of the first submitted markings and the second submitted markings.

9. The method of claim 7 further comprising determining beats for the song, wherein the first submitted markings comprise a first subset of the beats and the second submitted markings comprise a second subset of the beats.

10. The method of claim 9, wherein the step of reconciling the first submitted markings and the second submitted markings into a set of cuepoints comprises:
    determining an intersection of the first subset of the beats and the second subset of the beats; and
    selecting cuepoints in the set of cuepoints from the beats in the intersection.

11. The method of claim 9 further comprising shifting at least one of the first submitted markings to at least one of the beats in the song.

12. The method of claim 9 wherein the step of determining beats for the song comprises using an automated software program to identify the beats.

13. The method of claim 9 further comprising:
    displaying a visual representation of the beats; and
    selecting at least one of the first submitted markings from among the beats based on the visual representation.

14. The method of claim 7, wherein reconciling the first submitted markings and the second submitted markings into a set of cuepoints comprises:
    playing the song such that a third listener selects third submitted markings, each of which maps to a third measure grouping in the song; and
    choosing the cuepoints from a union of the first submitted markings, the second submitted markings, and the third submitted markings.

15. The method of claim 7, wherein reconciling the first submitted markings and the second submitted markings into a set of cuepoints comprises:
    playing the song such that a third listener selects third submitted markings, each of which maps to a third measure grouping in the song; and
    choosing the cuepoints by intersecting the third submitted markings with a union of the first submitted markings and the second submitted markings.

16. The method of claim 1, wherein at least one of the first measure groupings comprises eight measures of the song.

17. A computer readable medium comprising computer executable instructions adapted to perform the method of claim 1.

18. The method of claim 1 further comprising delivering the set of cuepoints to a remote device, wherein the remote device generates a transition from the song to a second song using at least one cuepoint in the set of cuepoints.

19. The method of claim 18, wherein the remote device uses the set of cuepoints to generate new cuepoints that the remote device uses to generate the transition.

20. The method of claim 1, wherein the step of obtaining first submitted markings for the song does not involve user feedback.

21. The method of claim 1 further comprising generating a supplemental set of cuepoints by adding new cuepoints to the set of cuepoints.

22. The method of claim 21, wherein the new cuepoints have frame values in between frame values for cuepoints in the set of cuepoints.

23. The method of claim 21 further comprising using the supplemental set of cuepoints to generate a transition from the song to a second song.

24. The method of claim 23, wherein the second song has a speed metric that exceeds a speed metric for the song.

25. The method of claim 1 further comprising generating a reduced set of cuepoints by removing cuepoints from the set of cuepoints.

26. The method of claim 25, wherein the step of generating a reduced set of cuepoints by removing cuepoints from the set of cuepoints comprises removing alternating cuepoints from the set of cuepoints.

27. The method of claim 25 further comprising using the reduced set of cuepoints to generate a transition from the song to a second song.

28. The method of claim 27, wherein the song has a speed metric that exceeds a speed metric for the second song.

29. A method for generating cuepoints from submitted markings comprising:
identifying a first submitted marking for a song and a second submitted marking for the song, wherein the second submitted marking is located within a first frame distance of the first submitted marking;
assigning a first set of frames based on the first submitted marking and the second submitted marking; and
choosing a first reconciled cuepoint from the first set of frames.

30. The method of claim 29 further comprising selecting at least one interpolated cuepoint based on the first reconciled cuepoint.

31. The method of claim 30, wherein selecting at least one interpolated cuepoint based on the first reconciled cuepoint comprises:
determining a standard frame count for the song; and
adding at least one multiple of the standard frame count to the first reconciled cuepoint to determine the at least one interpolated cuepoint.

32. The method of claim 31, wherein the standard frame count comprises a frame count of a measure of the song.

33. The method of claim 31, wherein the standard frame count is determined based on a speed metric for the song.

34. The method of claim 30, wherein selecting at least one interpolated cuepoint based on the first reconciled cuepoint comprises:
determining at least one candidate cuepoint different from the first reconciled cuepoint;
determining a ranking of the at least one candidate cuepoint; and
selecting at least one interpolated cuepoint from the at least one candidate cuepoint based on the ranking.

35. The method of claim 29 further comprising selecting a plurality of other cuepoints, each of which is separated by eight measures from one another.

36. The method of claim 29 further comprising selecting beats for the song, wherein the first submitted marking and the second submitted marking comprise a subset of the beats.

37. The method of claim 29 further comprising:
identifying a third submitted marking for the song and a fourth submitted marking for the song, wherein the fourth submitted marking is located within a second frame distance of the third submitted marking;
assigning a second set of frames based on the third submitted marking and the fourth submitted marking; and
choosing a second reconciled cuepoint from the second set of frames.

38. The method of claim 37, wherein the second frame distance is substantially the same as the first frame distance.

39. The method of claim 37, wherein at least one of the first reconciled cuepoint and the second reconciled cuepoint is delivered to a remote device, which uses at least one of the first reconciled cuepoint and the second reconciled cuepoint to mix the song with a second song.

40. The method of claim 37, wherein the first submitted marking and the third submitted marking were determined by a first listener and the second submitted marking and the fourth submitted marking were determined by a second listener different from the first listener.

41. The method of claim 37 further comprising:
determining at least one candidate cuepoint different from the first reconciled cuepoint and the second reconciled cuepoint;
determining a ranking of the at least one candidate cuepoint; and
selecting at least one other cuepoint from the at least one candidate cuepoint based on the ranking.

42. The method of claim 41, wherein the at least one other cuepoint is delivered to a remote device, which uses the at least one other cuepoint to mix the song with a second song.

43. The method of claim 41, wherein determining at least one candidate cuepoint different from the first reconciled cuepoint and the second reconciled cuepoint comprises:
determining a reconciled frame distance between the first reconciled cuepoint and the second reconciled cuepoint; and
adding at least one multiple of the reconciled frame distance to at least one of the first reconciled cuepoint and the second reconciled cuepoint to obtain at least one candidate cuepoint.

44. The method of claim 43, wherein the reconciled frame distance is substantially the same as a frame count in eight measures of the song.

45. The method of claim 37 further comprising:
determining a fifth submitted marking for the song and a sixth submitted marking for the song that is located outside of the second frame distance from the fifth submitted marking;
assigning a third set of frames comprising the fifth submitted marking and the sixth submitted marking; and
choosing at least one candidate cuepoint from the third set of frames.

46. The method of claim 45, wherein choosing at least one candidate cuepoint from the third set of frames comprises:
determining a reconciled frame distance between the first reconciled cuepoint and the second reconciled cuepoint;
determining a cuepoint frame distance for each of the at least one candidate cuepoint from the third set of frames and at least one of the first reconciled cuepoint and the second reconciled cuepoint; and
choosing the at least one candidate cuepoint from the third set of frames having a frame distance that is substantially the same as the reconciled frame distance.

47. The method of claim 46, wherein the at least one candidate cuepoint comprises at least one beat in the song.

48. A computer readable medium comprising computer executable instructions adapted to perform the method of claim 29.

49. A method for generating cuepoints comprising:
identifying first submitted markings for a song;
identifying second submitted markings for the song;
determining pairs of agreed markings, wherein each pair of agreed markings comprises one of the first submitted markings and one of the second submitted markings within a number of frames of the one of the first submitted markings;
choosing at least one reconciled frame set based on at least one of the pairs of agreed markings; and
choosing candidate cuepoints from the at least one reconciled frame set.

50. The method of claim 49, wherein the first submitted markings are determined by a first listener and the second submitted markings are submitted by a second listener different from the first listener.

51. The method of claim 49 further comprising selecting beats for the song, wherein the first submitted markings comprise a first subset of the beats and the second submitted markings comprise a second subset of the beats.

52. The method of claim 49 further comprising:
determining a ranking of the candidate cuepoints from the at least one reconciled frame set; and
selecting as reconciled cuepoints the candidate cuepoints with the highest ranking.

53. The method of claim 52, wherein the reconciled cuepoints are sent to a remote device, which uses a subset of the reconciled cuepoints to mix the song with a second song.

54. The method of claim 49 further comprising:
determining at least one disagreed marking, wherein the at least one disagreed marking comprises at least one of the first submitted markings not within a second number of frames of the second submitted markings;
choosing at least one non-reconciled frame set based on the at least one disagreed marking; and
choosing at least one candidate cuepoint from the at least one non-reconciled frame set.

55. The method of claim 54, wherein the at least one non-reconciled frame set comprises at least one of a plurality of beats in the song.

56. The method of claim 54, wherein the at least one candidate cuepoint from the at least one non-reconciled frame set comprises a subset of beats in the song.

57. The method of claim 54 further comprising selecting at least one other cuepoint from the at least one candidate cuepoint in the at least one non-reconciled frame set based on a ranking.

58. The method of claim 57, wherein the at least one other cuepoint is sent to a remote device, which uses a subset of the at least one other cuepoint to mix the song with a second song.

59. The method of claim 49 further comprising:
determining cuepoint collections, wherein each cuepoint collection comprises a subset of the at least one candidate cuepoint in the reconciled frame set and a subset of the at least one candidate cuepoint in the non-reconciled frame set;
determining a ranking of the cuepoint collections; and
choosing an optimal cuepoint collection from among the cuepoint collections based on the ranking.

60. The method of claim 59, wherein determining a ranking of the cuepoint collections comprises applying a cost function to each cuepoint collection to obtain a ranking of the cuepoint collections.

61. The method of claim 59, wherein each of the cuepoint collection defines measure groupings in the song.

62. The method of claim 59, wherein determining a ranking of the cuepoint collections comprises:
determining, for each cuepoint collection, regularity metrics for the measure groupings defined by that cuepoint collection;
calculating, for each cuepoint collection, a deviation of the regularity metrics for that cuepoint collection; and
determining a ranking of the cuepoint collections based on their deviations.

63. The method of claim 62, wherein the optimal cuepoint collection is a cuepoint collection with the smallest deviation.

64. The method of claim 63, wherein each of the regularity metrics is calculated based on at least one of a frame count and a measure count.

65. A computer readable medium comprising computer executable instructions adapted to perform the method of claim 49.

66. A system for generating cuepoints from submitted markings comprising:
a network interface that receives first submitted markings for a song and second submitted markings for the song;
a neighborhood generator that assigns a first set of frames for each first submitted marking and a second set of frames for each second submitted marking;
a neighborhood operator that generates reconciled sets of frames based on the first sets of frames and the second sets of frames; and
a selector that chooses first candidate cuepoints in the reconciled sets of frames.

67. The system of claim 66 wherein the first submitted markings are generated by a first listener and the second submitted markings are generated by a second listener different from the first listener.

68. The system of claim 66 further comprising a beat map generator that determines beats for the song, wherein the first submitted markings comprise a first subset of the beats and the second submitted markings comprise a second subset of the beats.

69. The system of claim 66, wherein the neighborhood operator generates the reconciled sets of frames by taking at least one of a union, an intersection, a complement, and a relative complement of frames in the first sets of frames and frames in the second sets of frames.

70. The system of claim 66, wherein the selector comprises a ranker that generates a ranking of the first candidate cuepoints.

71. The system of claim 66, wherein the reconciled sets of frames comprise discrete sets of frames.

72. The system of claim 71, wherein the selector chooses at least one of the first candidate cuepoints from each discrete set of frames.

73. The system of claim 66, wherein the selector chooses second candidate cuepoints from a subset of the first sets of frames that are disjoint with the second sets of frames.

74. The system of claim 73, wherein the second candidate cuepoints comprise a subset of beats in the song.

75. The system of claim 73, wherein the selector determines a ranking of cuepoint collections, wherein each cuepoint collection comprises at least one of the first candidate cuepoints and at least one of the second candidate cuepoints.

76. The system of claim 75, wherein the selector uses the ranking to select an optimal cuepoint collection from among the cuepoint collections.

77. The system of claim 76, wherein the optimal cuepoint collection is sent to a remote device, which uses cuepoints in the optimal cuepoint collection to mix the song with a second song.

78. The system of claim 77, wherein the remote device adds new cuepoints to the optimal cuepoint collection and uses the new cuepoints when mixing the song with the second song.

79. The system of claim 76, wherein the selector applies a cost function to each cuepoint collection to obtain the ranking of the cuepoint collections.

80. The system of claim 76, wherein each cuepoint collection defines measure groupings in the song.

81. The system of claim 80, wherein the selector determines, for each cuepoint collection, metrics that measure regularity in that cuepoint collection.

82. The system of claim 81, wherein the selector calculates, for each cuepoint collection, a deviation of the metrics that measure regularity in that cuepoint collection.

83. The system of claim 82, wherein the selector determines a ranking of the cuepoint collections based on their deviations.

84. The system of claim 81, wherein the metrics that measure regularity are calculated based on at least one of a frame count and a measure count.

85. The system of claim 76, wherein the selector alters the optimal cuepoint collection to generate a revised optimal cuepoint collection.

86. The system of claim 85, wherein the revised optimal cuepoint collection comprises new cuepoints in addition to cuepoints in the optimal cuepoint collection.

87. The system of claim 86, wherein the new cuepoints have frame values in between frame values for cuepoints in the optimal cuepoint collection.

88. The system of claim 85, wherein the revised optimal cuepoint collection is a subset of the optimal cuepoint collection.

89. The system of claim 88, wherein the revised optimal cuepoint collection comprises alternating cuepoints from the optimal cuepoint collection.

90. A method for generating cuepoints for mixing songs comprising:
    identifying a set of cuepoints for a song, wherein each cuepoint in the set of cuepoints maps to a measure grouping in the song; and
    altering the set of cuepoints to generate a revised set of cuepoints.

91. The method of claim 90, wherein the step of altering the set of cuepoints to generate a revised set of cuepoints comprises adding new cuepoints to the set of cuepoints to generate the revised set of cuepoints.

92. The method of claim 91, wherein the new cuepoints have frame values in between frame values for cuepoints in the set of cuepoints.

93. The method of claim 91 further comprising delivering the set of revised cuepoints to a remote device to generate a transition from the song to a second song.

94. The method of claim 93, wherein the second song has a tempo that exceeds a tempo for the song.

95. The method of claim 94, wherein at least one of the tempo for the song and the tempo for the second song comprises a beats-per-minute count.

96. The method of claim 90, wherein the step of altering the set of cuepoints to generate a revised set of cuepoints comprises removing cuepoints from the set of cuepoints to generate the revised set of cuepoints.

97. The method of claim 96, wherein the step of removing cuepoints from the set of cuepoints to generate the revised set of cuepoints comprises removing alternating cuepoints from the set of cuepoints to generate the revised set of cuepoints.

98. The method of claim 96 further comprising delivering the set of revised cuepoints to a remote device to generate a transition from the song to a second song.

99. The method of claim 98, wherein the song has a tempo that exceeds a tempo for the second song.

100. The method of claim 99, wherein at least one of the tempo for the song and the tempo for the second song comprises a beats-per-minute count.

101. A computer readable medium comprising computer executable instructions adapted to perform the method of claim 90.

* * * * *